United States Patent
Chiang et al.

(10) Patent No.: US 12,252,442 B2
(45) Date of Patent: *Mar. 18, 2025

(54) REACTION SCHEMES INVOLVING ACIDS AND BASES; REACTORS COMPRISING SPATIALLY VARYING CHEMICAL COMPOSITION GRADIENTS; AND ASSOCIATED SYSTEMS AND METHODS

(71) Applicant: Massachusetts Institute of Technology, Cambridge, MA (US)

(72) Inventors: Yet-Ming Chiang, Weston, MA (US); Leah Ellis, Nova Scotia (CA); Andres Badel, Deerfield Beach, FL (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/395,376

(22) Filed: Dec. 22, 2023

(65) Prior Publication Data

US 2024/0132400 A1 Apr. 25, 2024

Related U.S. Application Data

(63) Continuation of application No. 17/423,467, filed as application No. PCT/US2020/013837 on Jan. 16, 2020.

(Continued)

(51) Int. Cl.
*B01J 19/00* (2006.01)
*C04B 2/08* (2006.01)
*C04B 7/06* (2006.01)

(52) U.S. Cl.
CPC ............. *C04B 2/08* (2013.01); *B01J 19/0033* (2013.01); *C04B 7/06* (2013.01);
(Continued)

(58) Field of Classification Search
CPC ......... C04B 2/08; C04B 2290/20; C04B 7/02; C04B 7/36; C04B 7/364; C04B 7/367;
(Continued)

(56) References Cited

U.S. PATENT DOCUMENTS

| 2,669,542 A | 2/1954 | Dooley |
| 3,074,860 A | 1/1963 | Shinzoh |

(Continued)

FOREIGN PATENT DOCUMENTS

| CN | 1137575 A | 12/1996 |
| CN | 1210153 A | 3/1999 |

(Continued)

OTHER PUBLICATIONS

S Alonso, A Palomo, Alkaline activation of metakaolin and calcium hydroxide mixtures: influence of temperature, activator concentration and solids ratio, Materials Letters, vol. 47, Is. 1-2, pp. 55-62. DOI:10.1016/S0167-577X(00)00212-3. (Year: 2001).*

(Continued)

*Primary Examiner* — Anthony J Green
*Assistant Examiner* — Marites A Guino-O Uzzle
(74) *Attorney, Agent, or Firm* — Wolf, Greenfield & Sacks, P.C.

(57) ABSTRACT

Reaction schemes involving acids and bases; reactors comprising spatially varying chemical composition gradients (e.g., spatially varying pH gradients), and associated systems and methods, are generally described. For example, methods comprising producing an acid and a base via electrolysis; dissolving a material comprising calcium using the acid to produce ions comprising calcium in a region of a reactor with a pH of 6 or less; precipitating solid calcium hydroxide from the ions comprising calcium using the base (Continued)

in a region of a reactor with a pH of 10 or higher; and utilizing the calcium hydroxide in a downstream process to form a cement are described.

20 Claims, 25 Drawing Sheets

Related U.S. Application Data

(60) Provisional application No. 62/887,143, filed on Aug. 15, 2019, provisional application No. 62/818,604, filed on Mar. 14, 2019, provisional application No. 62/800,220, filed on Feb. 1, 2019, provisional application No. 62/793,294, filed on Jan. 16, 2019.

(52) U.S. Cl.
CPC .............. *B01J 2219/00029* (2013.01); *B01J 2219/00033* (2013.01); *C04B 2290/20* (2013.01); *Y02P 40/121* (2015.11); *Y02P 40/18* (2015.11)

(58) Field of Classification Search
CPC ... C04B 7/42; C04B 7/424; C04B 7/06; B01J 19/0033; B01J 2219/00029
See application file for complete search history.

(56) References Cited

U.S. PATENT DOCUMENTS

| | | | |
|---|---|---|---|
| 3,861,928 A | 1/1975 | Slater | |
| 4,110,399 A | 8/1978 | Gaudernack et al. | |
| 4,196,068 A | 4/1980 | Scoville | |
| 4,367,215 A | 1/1983 | Gjelsvik et al. | |
| 4,654,135 A | 3/1987 | Yamamoto et al. | |
| 4,749,453 A | 6/1988 | Harris | |
| 5,572,938 A | 11/1996 | Leger | |
| 5,853,685 A | 12/1998 | Erickson | |
| 6,284,207 B1 | 9/2001 | McCauley | |
| 7,534,411 B2 | 5/2009 | Shapira et al. | |
| 7,993,500 B2 | 8/2011 | Gilliam et al. | |
| 8,357,270 B2 | 1/2013 | Gilliam et al. | |
| 9,200,375 B2 | 12/2015 | Gilliam et al. | |
| 9,297,082 B2 | 3/2016 | Licht | |
| 9,718,731 B2 | 8/2017 | Bullerjahn et al. | |
| 11,718,558 B2 | 8/2023 | Finke et al. | |
| 2008/0124269 A1 | 5/2008 | Daudey et al. | |
| 2008/0245660 A1 | 10/2008 | Little et al. | |
| 2010/0101955 A1 | 4/2010 | Nocera et al. | |
| 2010/0154593 A1 | 6/2010 | Ratchev et al. | |
| 2011/0044882 A1 | 2/2011 | Buckley et al. | |
| 2011/0182786 A1 | 7/2011 | Burba, III et al. | |
| 2011/0233055 A1 | 9/2011 | Cerezo | |
| 2012/0121491 A1* | 5/2012 | Rau .................. H01M 8/0656 205/508 |
| 2014/0010743 A1 | 1/2014 | Kosmoski et al. | |
| 2015/0343373 A1 | 12/2015 | Balfe et al. | |
| 2016/0137551 A1 | 5/2016 | Le Gouil et al. | |
| 2017/0022110 A1 | 1/2017 | Ulrike et al. | |
| 2018/0037501 A1* | 2/2018 | Guynn .................. C04B 18/08 |
| 2019/0040347 A1 | 2/2019 | Kim et al. | |
| 2019/0078170 A1 | 3/2019 | Fukui et al. | |
| 2021/0179492 A1 | 6/2021 | Hoffmann | |
| 2022/0064063 A1 | 3/2022 | Chiang et al. | |
| 2022/0145477 A1 | 5/2022 | Chiang et al. | |
| 2023/0036470 A1 | 2/2023 | Finke et al. | |
| 2023/0174396 A1 | 6/2023 | Chiang et al. | |
| 2023/0295046 A1 | 9/2023 | Benck et al. | |
| 2023/0313386 A1 | 10/2023 | Ellis et al. | |
| 2023/0330724 A1 | 10/2023 | Chiang et al. | |
| 2024/0083819 A1 | 3/2024 | Benck et al. | |
| 2024/0124987 A1 | 4/2024 | Chiang et al. | |
| 2024/0133054 A1 | 4/2024 | Chiang et al. | |
| 2024/0150235 A1 | 5/2024 | Chiang et al. | |

FOREIGN PATENT DOCUMENTS

| | | |
|---|---|---|
| CN | 1805196 A | 7/2006 |
| CN | 101624181 A | 1/2010 |
| CN | 101981744 A | 2/2011 |
| CN | 102016123 A | 4/2011 |
| CN | 102149852 A | 8/2011 |
| CN | 102149854 A | 8/2011 |
| CN | 102730734 A | 10/2012 |
| CN | 103882468 A | 6/2014 |
| CN | 105263872 A | 11/2014 |
| CN | 104261449 A | 1/2015 |
| CN | 105126599 A | 12/2015 |
| CN | 109970373 A | 7/2019 |
| EP | 2816140 A1 | 12/2014 |
| FR | 2748755 A | 11/1997 |
| GB | 1008196 A | 10/1965 |
| GB | 1488339 A | 10/1977 |
| JP | 2001-058170 A | 3/2001 |
| JP | 2010-055951 A | 3/2010 |
| JP | 3192728 U | 8/2014 |
| JP | 2015-074575 A | 4/2015 |
| JP | 2016-020296 A | 2/2016 |
| JP | 2002-018395 A | 1/2022 |
| JP | 2002-018396 A | 1/2022 |
| KR | 10-2017-0077777 A | 7/2017 |
| WO | WO 02/090605 A1 | 11/2002 |
| WO | WO 2007/074360 A2 | 7/2007 |
| WO | WO 2008/124538 A1 | 10/2008 |
| WO | WO 2013/153692 A1 | 10/2013 |
| WO | WO 2014/092667 A1 | 6/2014 |
| WO | WO 2015/082585 A1 | 6/2015 |
| WO | WO 2018/087697 A1 | 5/2018 |
| WO | WO 2019/133702 A1 | 7/2019 |
| WO | WO 2020/186178 A1 | 9/2020 |
| WO | WO 2021/030529 A1 | 2/2021 |
| WO | WO 2021/222585 A1 | 11/2021 |
| WO | WO 2022/020470 A1 | 1/2022 |
| WO | WO 2022/020572 A1 | 1/2022 |
| WO | WO 2022/204059 A1 | 9/2022 |
| WO | WO 2012/142547 A1 | 10/2022 |
| WO | WO 2022/216741 A1 | 10/2022 |
| WO | WO 2022/221334 A1 | 10/2022 |
| WO | WO 2023/108054 A1 | 6/2023 |
| WO | WO 2023/150796 A1 | 8/2023 |

OTHER PUBLICATIONS

Z Mirghiasi, F Bakhtiari, E Darezereshki, E Esmaeilzadeh, Preparation and characterization of CaO nanoparticles from Ca(OH)2 by direct thermal decomposition method, Journal of Industrial and Engineering Chemistry, 2014, vol. 24, is. 1, pp. 113-117, DOI:10. 1016/j.jiec.2013.04.018 (Year: 2014).*

Rau. Electrochemical CO2 capture and storage with hydrogen generation, Energy Procedia, vol. 1, is 1, 2009, pp. 823-828. DOI:10.1016/j.egypro.2009.01.109. (Year: 2009).*

Ibrahim et al. (2018) Metakaolin as an Active Pozzolan for Cement That Improves Its Properties and Reduces Its Pollution Hazard. Journal of Minerals and Materials Characterization and Engineering, 6, 86-104. doi: 10.4236/jmmce.2018.61008. (Year: 2018).*

Sano Y, Hao Y, Kuwahara F. Development of an electrolysis based system to continuously recover magnesium from seawater. Heliyon. Nov. 17, 2018;4(11):e00923. doi: 10.1016/j.heliyon.2018.e00923. (Year: 2018).*

Angel Irabien, Javier R. Viguri, and Inmaculada Ortiz. Thermal dehydration of calcium hydroxide. 1. Kinetic model and parameters. Industrial & Engineering Chemistry Research 1990 29 (8), 1599-1606 DOI: 10.1021/ie00104a004 (Year: 1990).*

Brazilian Office Action for BR 112021013144.2, mailed Nov. 7, 2023.

Chinese Office Action for CN 202080009144.7 mailed Feb. 23, 2022.

Chinese Office Action for CN 202080009144.7, mailed Oct. 8, 2022.

Chinese Office Action for CN 202080009144.7 mailed Apr. 23, 2023.

(56) References Cited

OTHER PUBLICATIONS

Eurasian Office Action for EA202191980, mailed Oct. 27, 2022.
European Office Action for EP20706886.7, mailed Feb. 22, 2023.
Indian Office Action for IN202117028021 mailed Oct. 9, 2023.
International Search Report and Written Opinion for International Patent Application No. PCT/US2020/013837, mailed May 25, 2020.
International Preliminary Report on Patentability for International Patent Application No. PCT/US2020/013837, mailed Jul. 29, 2021.
Chinese Office Action for CN 202080028904.9 mailed Mar. 30, 2022.
Chinese Office Action for CN 202080028904.9 mailed Sep. 16, 2022.
Chinese Office Action for CN 202080028904.9 mailed Mar. 8, 2023.
Eurasian Office Action for EA202192509 mailed Sep. 19, 2022.
European Office Action for EP20716365.0, mailed Feb. 21, 2023.
Indian Office Action for IN202117046712 mailed May 15, 2023.
International Search Report and Written Opinion for International Patent Application No. PCT/US2020/022672, mailed Aug. 17, 2020.
International Preliminary Report on Patentability for International Patent Application No. PCT/US2020/022672, mailed Sep. 23, 2021.
[No Author Listed], Around 2.5 billion more people will be living in cities by 2050, projects new UN report. United Nations. May 16, 2018. Accessed Oct. 6, 2021 from <https://www.un.org/development/desa/en/news/population/2018-world-urbanization-prospects.html>. 4 pages.
[No Author Listed], Breaking down the factors behind scrap glass prices. Recycling Product News. Dec. 7, 2017. Accessed Oct. 6, 2021 from <https://www.recyclingproductnews.com/article/27088/breaking-down-the-factors-behind-scrap-glass-prices>. 5 pages.
[No Author Listed], Cement prices in the United States from 2010 to 2020 (in U.S. Dollars per metric ton). Statista. Hamburg, Germany. Feb. 2021:8 pages.
[No Author Listed], Chemistry vol. 2. Chemistry Compiling Group of the Mathematics, Physics and Chemistry Self-Study Series Editorial Committee. Shanghai People's Publishing House. Apr. 1965; 235-7.
[No Author Listed], Climate Change 2014: Mitigation of Climate Change: Working Group III Contribution to the Fifth Assessment Report of the Intergovernmental Panel on Climate Change. O. Edenhofer et al., Eds. Cambridge University Press. New York, NY. 2014. 1454 pages.
[No Author Listed], Concrete $CO_2$ Fact Sheet. National Ready Mixed Concrete Association. Silver, Spring, MD. Feb. 2012. 13 pages.
[No Author Listed], Development of State of the Art-Techniques in Cement Manufacturing: Trying to Look Ahead, Revision 2017. European Cement Research Academy. Dusseldorf, Geneva. Mar. 20, 2017. 190 pages.
[No Author Listed], Geochemistry in mineral exploration. Eds. Chen et al. Geological Publishing House. Mar. 2014; p. 26.
[No Author Listed], Inorganic chemistry. Chemistry Textbook Compiling Group for Vocational and Technical Colleges. Higher Education Press. Aug. 2000; 298-300.
[*No Author Listed*], *Lime Prices In The United States, By Type.* IndexMundi. Accessed Oct. 1, 20215 as available Sep. 8, 2017 from <https://web.archive.org/web/20170908194700/https://www.indexmundi.com/en/commodities/minerals/lime/lime_t5.html>. 1 page.
[No Author Listed], LumiShield Chemistry. LumiShield Technologies, Inc. Pittsburgh, PA. Accessed Oct. 15, 2021 as available Jan. 31, 2019 from <https://web.archive.org/web/20190131025944/http://lumishieldtech.com/chemistry.html>. 1 page.
[No Author Listed], Mineral Commodity Summaries. U.S. Department of the Interior, U.S. Geological Survey. Jan. 2018. 204 pages.
[No Author Listed], Mini Chlor Alkali Plant. SkidPlant. Chenai, India. Accessed Oct. 15, 2021 as available Jan. 10, 2019 from <https://web.archive.org/web/20190110233048/http://www.skidplant.com/mini-chlor-alkali-plant>. 3 pages.
[No Author Listed], Recycling Markets—Gambling or Good Business. Northeast Resource Recovery Association. Epsom, NH. Apr. 2014. 137 pages.
[No Author Listed], Renewable Power Generation Costs in 2017. International Renewable Energy Agency (IRENA), Abu Dhabi. 2018. 160 pages.
[No Author Listed], Table 31. Average Sales Price of Coal by State and Coal Rank, 2017. U.S. Energy Information Administration Annual Coal Report 2017. Accessed Oct. 15, 2021 as available Jan. 8, 2019 from <https://web.archive.org/web/20190108234119/https://www.eia.gov/coal/annual/pdf/table31.pdf>. 1 page.
[No Author Listed], Technology Roadmap; Low-Carbon Transition in the Cement Industry. International Energy Agency, Paris, France. World Council for Sustainable Development, Geneva, Switzerland. 2018. 66 pages.
[No Author Listed], U.S. Labor-Energy Input Survey. Portland Cement Association. Skoki, IL. Accessed Oct. 15, 2021 as available Sep. 23, 2019 from <https://web.archive.org/web/20190923015840/https://www.cement.org/docs/default-source/market-economics-pdfs/more-reports/labor-energy-sample-2.pdf?sfvrsn=6&sfvrsn=6>. 36 pages.
Abdykirova et al., Production of Electrolytic Manganese Dioxide from Purified Solutions after the Leaching of Manganese-Bearing Slurry. Steel Transl. Aug. 25, 2016;46(5):319-321.
Abergel et al., Global Status Report 2017. International Energy Agency. Paris, France. 2017. 48 pages.
Åhman et al., Global climate policy and deep decarbonization of energy-intensive industries. Climate Policy. Jun. 13, 2016;17(5):634-49. doi: 10.1080/14693062.2016.1167009.
Ali et al., A review on emission analysis in cement industries. Renewable and Sustainable Energy Reviews. 2011;15(5):2252-61. Epub Mar. 17, 2011.
Allanore A., Contribution of Electricity to Materials Processing: Historical and Current Perspectives. JOM. 2012;65(2):130-135. doi: 10.1007/s11837-012-0538-3. Author manuscript provided. 20 pages.
Allegrini et al., Quantification of the resource recovery potential of municipal solid waste incineration bottom ashes. Waste Manag. Sep. 2014;34(9):1627-36. doi: 10.1016/j.wasman.2014.05.003. Epub Jun. 2, 2014.
Aromaa, J., Aqueous Processing of Metals. In: Encyclopedia of Electrochemistry. 2007. A.J. Bard et al., Eds. Wiley-Vch. Chapter 4.1:161-223.
Barker et al., $CO_2$ Capture in the Cement Industry. IEA Greenhouse Gas R&D Programme. Cheltenham, Glos., UK. Jul. 2008;1-221.
Belevi et al., Factors Determining the Element Behavior in Municipal Solid Waste Incinerators. 1. Field Studies. Environ. Sci. Technol. May 12, 2000;34(12):2501-2506.
Benson et al., Advancing Enhanced Oil Recovery as a Sequestration Asset. Joule. Aug. 15, 2018;2(8):1386-9.
Bjerge et al., $CO_2$ Capture in the Cement Industry, Norcem $CO_2$ Capture Project (Norway). Energy Procedia. 2014;63:6455-63.
Blunt et al., Carbon Dioxide in Enhanced Oil Recovery. Energy Convers. Mgmt. 1993;34(9-11):1197-1204.
Carrasco-Maldonado et al., Oxy-fuel combustion technology for cement production—State of the art research and technology development. International Journal of Greenhouse Gas Control. 2016;45:189-99. Epub Jan. 4, 2016.
Chen et al., Environmental impact of cement production: detail of the different processes and cement plant variability evaluation. Journal of Cleaner Production. 2010;18(5):478-485. Epub Jan. 4, 2010.
Davis et al., Net-zero emissions energy systems. Science. Jun. 29, 2018;360(6396):eaas9793. 9 pages. Supplementary Material included. 27 pages total.
Delgado et al., $CO_2$ Balance in a Compression and Purification Unit (CPU). Energy Procedia. 2014;63:322-31.
Dowling et al., Lime in the limelight. Journal of Cleaner Production. 2015;92:13-22. Epub Dec. 20, 2014.
Dubois et al., Study of the post-combustion $CO_2$ capture applied to conventional and partial oxy-fuel cement plants. Energy Procedia. 2017;114:6181-96.
Ellis et al. Toward electrochemical synthesis of cement—An electrolyzer-based process for decarbonating $CaCO3$ while produc-

(56) References Cited

OTHER PUBLICATIONS ing useful gas streams. Proc Natl Acad Sci U S A. Jun. 9, 2020;117(23):12584-12591. doi: 10.1073/pnas.1821673116. Epub Sep. 16, 2019.
Free, M.L., Hydrometallurgy—Fundamentals and Applications. 2013. John Wiley & Sons, Inc. 451 pages.
Funari et al., Solid residues from Italian municipal solid waste incinerators: A source for "critical" raw materials. Waste Manag. Nov. 2015;45:206-16. Epub Dec. 12, 2014. Prepublicaion version provided. 11 pages.
Gardarsdottir et al., Comparison of Technologies for $CO_2$ Capture from Cement Production—Part 2: Cost Analysis. Energies. Feb. 10, 2019;12(3):1-20.
Geels et al., Sociotechnical transitions for deep decarbonization. Science. Sep. 22, 2017;357(6357):1242-1244.
Gray, H.B., Powering the planet with solar fuel. Nature Chemistry. Mar. 19, 2009;1:7. Erratum included. 2 pages total.
Haruta et al., Catalytic Combustion of Hydrogen I—Its Role in Hydrogen Utilization System and Screening of Catalyst Materials. Int. J. Hydrogen Energy. 1981;6(6):601-8.
Hasanbeigi et al., Emerging energy-efficiency and $CO_2$ emission-reduction technologies for cement and concrete production: A technical review. Renewable and Sustainable Energy Reviews. Aug. 30, 2012;16(8):6220-38.
Imbabi et al., Trends and developments in green cement and concrete technology. International Journal of Sustainable Built Environment. 2012;1:194-216.
Janssen, G.J.M., Modelling study of $CO_2$ poisoning on PEMFC anodes. Journal of Power Sources. Jul. 3, 2004;136:45-54.
Joseph et al., The Use of Municipal Solid Waste Incineration Ash in Various Building Materials: A Belgian Point of View. Materials. Jan. 16, 2018;11(141):1-30.
Keith et al., A Process for Capturing $CO_2$ from the Atmosphere. Joule. Aug. 15, 2018;2(8):1573-94.
Kelly et al., Historical Statistics for Mineral and Material Commodities in the United States, US Geological Survey. Reston, VA. Accessed Jan. 7, 2009 as updated Apr. 17, 2008 from <http://minerals.usga.gov/ds/2005/140/>. 8 pages.
Körner, A., Technology Roadmap Hydrogen and Fuel Cells: Technical Annex. International Energy Agency. Jun. 29, 2015. 30 pages.
Lammel et al., Greenhouse Effect of $NO_x$. Environ. Sci. & Pollut. Res. 1995;2(1):40-45.
Larscheid et al., Potential of new business models for grid integrated water electrolysis. Renewable Energy. Feb. 23, 2018;125:599-608.
Lassagne et al., Techno-economic study of $CO_2$ capture for aluminum primary production for different electrolytic cell ventilation rates. Chemical Engineering Journal. Jun. 26, 2013;230:338-50.
Lau et al., "Optimization and Characterization of the Solar Thermal Electrochemical Conversion of Calcium Carbonate into Calcium Oxide for STEP Cement," Abstract from the 227th Meeting of the Electrochemical Society, 2015.
Lawal et al., Dynamic modelling and analysis of post-combustion $CO_2$ chemical absorption process for coal-fired power plants. Fuel. Jun. 2, 2010;89(10):2791-2801.
Lehne et al., Making Concrete Change; Innovation in Low-carbon Cement and Concrete. Chatham House, London, UK. Jun. 2018. 138 pages.
Li et al., Greenhouse Gas Emissions, Energy Efficiency, and Cost of Synthetic Fuel Production Using Electrochemical $CO_2$ Conversion and the Fischer-Tropsch Process. Energy Fuels. Jun. 1, 2016;30(7):5980-9.
Li et al., Impacts of exhaust gas recirculation (EGR) on the natural gas combined cycle integrated with chemical absorption CO2 capture technology. Energy Procedia. 2011;4:1411-8.
Licht et al., STEP Cement: Solar Thermal Electrochemical Production of CaO without $CO_2$ emission. Chem. Commun. 2012;48:6019-6021.

Licht, "Co-Production of Cement and Carbon Nanotubes with a Carbon Negative Footprint," Journal of CO2 Utilization, Aug. 2016. Accessed online at https://arxiv.org/ftp/arxiv/papers/1608/1608.00946.pdf on Jan. 14, 2019.
Liu et al., Experimental study on improving cement quality with oxygen enriched combustion technology. IOP Conf. Series: Materials Science and Engineering. 2015;103:1-7.
Madrid et al., Synthesis and morphological examination of high-purity $Ca(OH)_2$ nanoparticles suitable to consolidate porous surfaces. Applied Surface Science. 2017;424:2-8. Epub Mar. 27, 2017.
Majumdar et al., Research Opportunities for $CO_2$ Utilization and Negative Emissions at the Gigatonne Scale. Joule. May 16, 2018;2(5):805-809.
Marin et al., Simulating the Impact of Oxygen Enrichment in a Cement Rotary Kiln Using Advanced Computational Methods. Combust. Sci. and Tech. 2001;164:193-207.
Mascolo et al., Influence of Polymorphism and Stabilizing Ions on the Strength of Alite. Journal of the American Ceramic Society—Discussion and Notes. Apr. 1973;56(4):222-3.
Mitlitsky et al., Regenerative Fuel Cell Systems. Energy & Fuels. Jan. 12, 1998;12(1):56-71.
Morf et al., Precious metals and rare earth elements in municipal solid waste—sources and fate in a Swiss incineration plant. Waste Manag. Mar. 2013;33(3):634-44. Epub Oct. 22, 2012. Erratum in: Waste Manag. Jun. 2013;33(6):1573.
Mujumdar et al., Rotary Cement Kiln Simulator (RoCKS): Integrated modeling of pre-heater, calciner, kiln and clinker cooler. Chemical Engineering Science. 2007;62(9):2590-607. Epub Feb. 14, 2007.
Odler et al., Polymorphism and Hydration of Picalcium Silicate Doped With ZnO. Journal of the American Ceramic Society. Jan. 1983;66(1):1-4.
Orella et al., Emerging opportunities for electrochemical processing to enable sustainable chemical manufacturing. Current Opinion in Chemical Engineering. Jun. 2018;20:159-167. doi: 10.1016/j.coche.2018.05.002.
Paidar et al., Membrane electrolysis-History, current status and perspective. Electrochimica Acta. 2016;209:737-756. Epub Jun. 2, 2016.
Pierpont et al., Flexibility: The path to low-carbon, low cost electricity grids. Climate Policy Initiative. Apr. 2017. 74 pages.
Rau et al., Electrochemical CO2 capture and storage with hydrogen generation. Energy Procedia. Feb. 1, 2009; 1(1): 823-8.
Rau et al., Enhanced carbonate dissolution: a means of sequestering waste $CO_2$ as ocean bicarbonate. Energy Conversion & Management. 1999;40:1803-1813.
Rau et al., The global potential for converting renewable electricity to negative-$CO_2$-emissions hydrogen. Nature Climate Change. Jul. 2018;8(7):621-5. Methods included. 6 pages total.
Rau, $CO_2$ Mitigation via Capture and Chemical Conversion in Seawater. Environ. Sci. Technol. 2011;45(3):1088-1092.
Rau, Electrochemical Splitting of Calcium Carbonate to Increase Solution Alkalinity: Implications for Mitigation of Carbon Dioxide and Ocean Acidity. Environ. Sci. Technol. 2008; 42: 8935-40.
Schmidt et al., Future cost and performance of water electrolysis: An expert elicitation study. International Journal of Hydrogen Energy. Nov. 22, 2017;42(52):30470-92.
Shah et al., Near Zero Emissions Oxy-Combustion $CO_2$ Purification Technology. Energy Procedia. 2011;4:988-95.
Snellings, Assessing, Understanding and Unlocking Supplementary Cementitious Materials. RILEM Technical Letters. Aug. 16, 2016;1:50-55.
Števula et al., Hydration of Polymorphic Modification $C_3S$. Cement and Concrete Research. 1981;11(2):183-190.
Šyc et al., Metal recovery from incineration bottom ash: State-of-the-art and recent developments. J Hazard Mater. Jul. 5, 2020;393:1-17. Epub Feb. 29, 2020.
Taylor, Cement chemistry, $2^{nd}$ edition. 1997. Thomas Telford Publishing. London, UK. 470 pages.
Topham et al., Carbon Dioxide. Ullmann's Encyclopedia of Industrial Chemistry. Wiley-VCH. May 2014:1-43.

(56) References Cited

OTHER PUBLICATIONS

Traynor et al., Dissolution of olivines from steel and copper slags in basic solution. Cement and Concrete Research. Jul. 2020; 133:106065. Author manuscript provided. 33 pages.

Vogt et al., The renaissance of the Sabatier reaction and its applications on Earth and in space. Nature Catalysis. Mar. 2019;2(3):188-97.

Voldsund et al., Comparison of Technologies for $CO_2$ Capture from Cement Production—Part 1: Technical Evaluation. Energies. Feb. 12, 2019;12:559. 33 pages.

Wei et al., Electrodepositing Pt by Modulated Pulse Current on a Nafion-Bonded Carbon Substrate as an Electrode for PEMFC. J. Phys. Chem. Oct. 2, 2007;111(42):15456-15463.

Worrell et al., Energy Efficiency Improvement and Cost Saving Opportunities for Cement Making; An Energy Star® Guide for Energy and Plant Managers. Energy Analysis Department, Environmental Energy Technologies Division, Ernest Orlando Lawrence Berkeley National Laboratory. University of California. Berkeley, CA. Mar. 2008. 75 pages.

Yan et al., Degradation of proton exchange membrane fuel cells due to CO and $CO_2$ poisoning. Journal of Power Sources. 2009;188:141-7.

Yao et al., Mobility of heavy metals and rare earth elements in incineration bottom ash through particle size reduction. Chemical Engineering Science. Oct. 18, 2014;18:214-220.

Zeman et al., The Reduced Emission Oxygen Kiln: A White Paper Report for the Cement Sustainability Initiative of the World Business Council on Sustainable Development. Lenfest Center for Sustainable Energy. Columbia University. New York, NY. Jul. 31, 2008. 77 pages.

Zeman, Oxygen combustion in cement production. Energy Procedia. 2009;1:187-94.

Zhang et al., Extraction of metals from municipal solid waste incinerator fly ash by hydrothermal process. J Hazard Mater. Aug. 25, 2006;136(3):663-70. doi: 10.1016/j.jhazmat.2005.12.052. Epub Mar. 6, 2006.

Zheng et al., Phase evolution, characterisation, and performance of cement prepared in an oxy-fuel atmosphere. Faraday Discuss. 2016;192:113-24.

Chinese Office Action mailed Feb. 6, 2024, for Application No. CN202080028904.9.

Japanese Notice of Reasons for Rejection for JP2021-554694, mailed Apr. 15, 2024.

Brazilian Office Action for BR 112021017931.3, mailed May 6, 2024.

[No Author Listed], Bioworld (Safety Data Sheet, Calcium chloride dihydrate). 2015. Accessed from <https://www.bio-world.com/site/accounts/masterfiles-/MSDS/MS-40300016.pdf>. 8 pages.

[No Author Listed], Azo materials (Silica-Silicon Dioxide (SiO2)). 2001. Accessed from: <https://www.azom.com/article/aspx?ArticleID=1114>. 5 pages.

[No Author Listed], Sedimentary rock. Encyclopedia Britannica. 2016. Accessed from <https://www.britannica.com/science/sedimentary-rock/Limestones-and-dolomites> and <https://web.archive.org/web/20160420201820/https://www.britan-nica.com/science/sedimentary-rock/Limestones-and-dolomites>. 1 page.

[No Author Listed], Chapter 3: Fly ash, slag, silica fume, and natural pozzolans. Design and Control of Concrete Mixtures EB001. 2010. Accessed from <http://www.ce.memphis.edu/1101/notes/concrete/PCA_manual/Chap03.pdf> and <https://web.archive.org/web/20100629003343/http://www.ce.memphis.edu/1101/notes/concrete/PCA_manual/Chap03.pdf.>. 16 pages.

Chaubey, Practical Concrete Mix Design. CRC Press. Taylor & Francis. 2020. Entire Textbook. 185 pages.

Chen et al., Incorporation of waste materials into portland cement clinker synthesized from natural raw materials. J Mater Sci. 2009; 44: 2617-27.

Irabien et al., Thermal dehydration of calcium hydroxide. 1. kinetic model and parameters. Ind Eng Chem Res 1990; 29(8): 1599-606.

Sutkovic, Ionic chemical equations. Oct. 3, 2014. Accessed from: <https://www.ius.edu.ba/common/2014SpringChemistryProblemSample1.pdf>. 3 pages.

Japanese Notice of Reasons for Rejection for JP2021-540832, mailed Feb. 29, 2024.

Shriver et al., Redox chemistry. Chapter 5. Inorganic Chemistry. 4th Edition. 2006; 165.

Japanese Notice of Reasons for Rejection for JP2021-554694, mailed Oct. 21, 2024.

Final Office Action mailed Oct. 28, 2024, for U.S. Appl. No. 18/395,402.

Office Action mailed Dec. 19, 2024, for U.S. Appl. No. 18/395,403.

\* cited by examiner

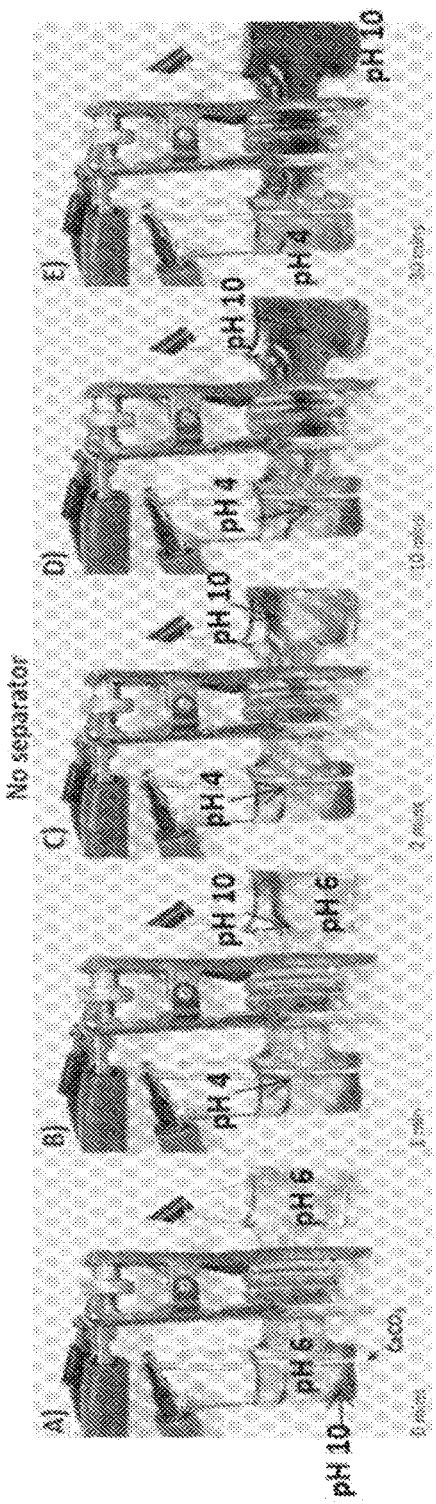
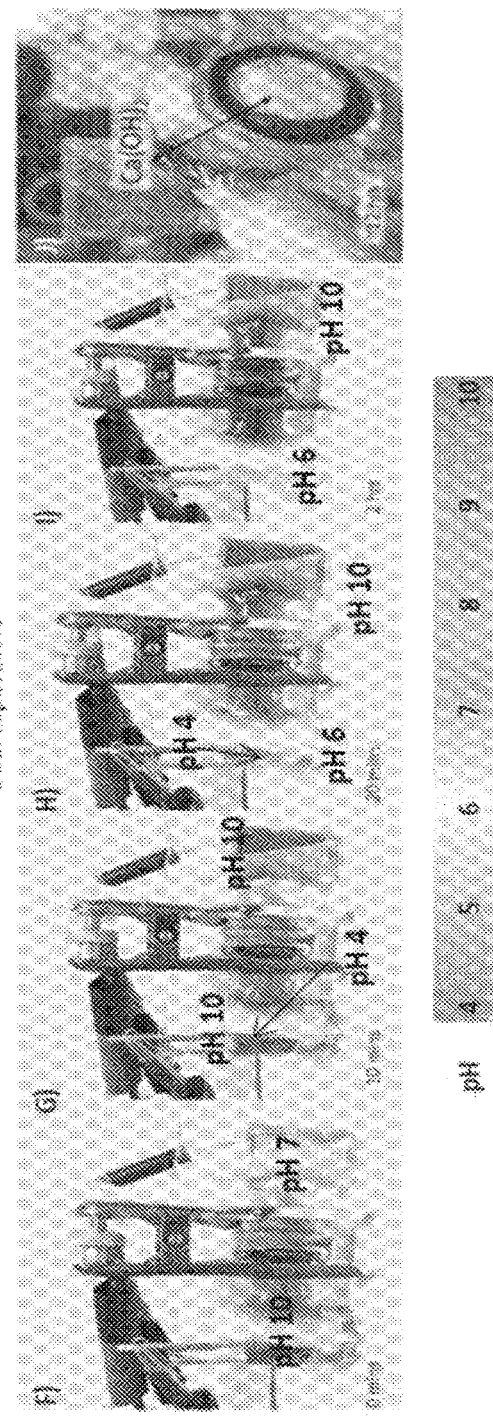
FIG. 14A FIG. 14B FIG. 14C FIG. 14D FIG. 14E
FIG. 14F FIG. 14G FIG. 14H FIG. 14I FIG. 14J FIG. 18A 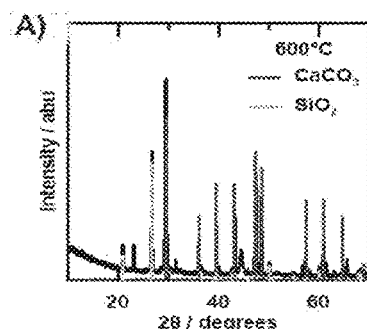 FIG. 18B
FIG. 18C 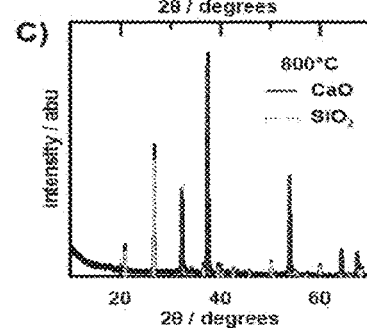 FIG. 18D
FIG. 18E 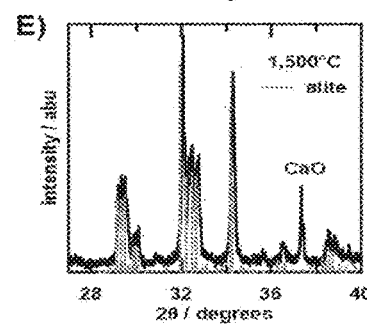 FIG. 18F

REACTION SCHEMES INVOLVING ACIDS AND BASES; REACTORS COMPRISING SPATIALLY VARYING CHEMICAL COMPOSITION GRADIENTS; AND ASSOCIATED SYSTEMS AND METHODS

RELATED APPLICATIONS

This application is a continuation of U.S. application Ser. No. 17/423,467, filed Jul. 15, 2021, which is a national stage filing under 35 U.S.C. § 371 of International Patent Application Serial No. PCT/US2020/013837, filed Jan. 16, 2020, which claims priority under 35 U.S.C. § 119(e) to U.S. Provisional Patent Application No. 62/793,294, filed Jan. 16, 2019; U.S. Provisional Patent Application No. 62/800,220, filed Feb. 1, 2019; U.S. Provisional Patent Application No. 62/818,604, filed Mar. 14, 2019; and U.S. Provisional Patent Application No. 62/887,143, filed Aug. 15, 2019; all of which are hereby incorporated by reference in their entireties.

TECHNICAL FIELD

Reaction schemes involving acids and bases; reactors comprising spatially varying chemical composition gradients (e.g., spatially varying pH gradients), and associated systems and methods, are generally described.

SUMMARY

Reaction schemes involving acids and bases; reactors comprising spatially varying chemical composition gradients (e.g., spatially varying pH gradients), and associated systems and methods, are generally described. Inventive systems and methods for formation of precipitates in a spatially varying chemical composition gradient (e.g., spatially varying pH gradient) are also described. Formation of precipitates in a spatially varying chemical composition gradient (e.g., spatially varying pH gradient) can be achieved, for example, by dissolving a chemical compound (e.g., a metal salt) in a first region (e.g., an acidic region) of the spatially varying chemical composition gradient (e.g., the spatially varying pH gradient) and collecting a precipitate comprising one or more elements (e.g., metal) from the chemical compound (e.g., the metal salt) in a second region (e.g., an alkaline region) of the spatially varying chemical composition gradient (e.g., spatially varying pH gradient). In certain embodiments, the spatially varying chemical composition gradient (e.g., spatially varying pH gradient) is in an electrochemical cell and is established and/or maintained by electrolysis (e.g., electrolysis of water). According to some embodiments, after the precipitate is collected, the precipitate is heated within a kiln to make cement, including Portland cement. The subject matter of the present invention involves, in some cases, interrelated products, alternative solutions to a particular problem, and/or a plurality of different uses of one or more systems and/or articles.

In one aspect, a reactor is provided. The reactor comprises, according to certain embodiments, a first electrode; a second electrode; a spatially varying chemical composition gradient between the first electrode and the second electrode; an inlet connected to a first region of the spatially varying pH gradient; an outlet connected to a second region of the spatially varying pH gradient; and wherein the outlet is configured such that solids can be expelled from the reactor.

In some embodiments, the reactor comprises, a first electrode; a second electrode; a spatially varying pH gradient between the first electrode and the second electrode; an inlet connected to an acidic region of the spatially varying pH gradient; and an outlet connected to an alkaline region of the spatially varying pH gradient.

In another aspect, a system is provided. In accordance with some embodiments, the system comprises a reactor comprising a region comprising a spatially varying chemical composition gradient (e.g., a spatially varying pH gradient), the reactor comprising a reactor inlet configured to receive calcium carbonate and a reactor outlet configured to output solid calcium hydroxide; and a kiln comprising a kiln inlet, wherein: the kiln is downstream from the reactor outlet, the kiln inlet is configured to receive at least a portion of the solid calcium hydroxide and/or solid calcium oxide derived from at least a portion of the solid calcium hydroxide; and the kiln is configured to heat the solid calcium hydroxide and/or solid calcium oxide as part of a cement-production process.

In another aspect, a method is provided. In accordance with certain embodiments, the method comprises producing an acid and a base via electrolysis; dissolving a metal salt in the acid; and precipitating a metal hydroxide in the base. In some such embodiments, the metal of the metal salt is the same metal as the metal of the metal hydroxide. In some such embodiments, the electrolysis comprises hydrolysis. In some such embodiments, the electrolysis produces a spatially varying chemical composition gradient within a reactor. In some such embodiments, the electrolysis produces a spatially varying pH gradient within a reactor. In some such embodiments, the method further comprises collecting the precipitate. In some such embodiments, the metal salt comprises a metal carbonate. In some such embodiments, the metal salt comprises calcium carbonate, magnesium carbonate, and/or nickel carbonate. In some such embodiments, the metal hydroxide comprises calcium hydroxide, magnesium hydroxide, and/or nickel hydroxide. In some such embodiments, the metal hydroxide comprises calcium hydroxide.

In some embodiments, the method comprises, according to some embodiments, establishing and/or maintaining a region comprising a spatially varying chemical composition gradient; transporting a chemical compound to a first region of the spatially varying chemical composition gradient such that the chemical compound is dissolved and/or reacted in a liquid within the spatially varying chemical composition gradient; collecting a precipitate from a second region of the spatially varying chemical composition gradient, wherein the precipitate comprises one or more elements from the chemical compound dissolved and/or reacted within the spatially varying chemical composition gradient.

In some embodiments, the method comprises, establishing and/or maintaining a region comprising a spatially varying pH gradient; transporting a metal salt to an acidic region of the spatially varying pH gradient such that the metal salt is dissolved and/or reacted in a liquid within the spatially varying pH gradient; collecting a precipitate from an alkaline region of the spatially varying pH gradient, wherein the precipitate comprises metal from the metal salt dissolved and/or reacted within the spatially varying pH gradient.

In another aspect, a method of making cement is provided. Herein, the term "cement" includes but is not limited to mixtures comprising calcium oxide and clay minerals, and optionally gypsum, that are generally known as Portland cement, or clinker, as well as mixtures of Portland cement and aggregates that are generally known as concrete.

According to some embodiments, the method comprises establishing and/or maintaining a region comprising a spatially varying pH gradient; transporting calcium carbonate to an acidic region of the spatially varying pH gradient such that the calcium carbonate is dissolved and/or reacted in a liquid within the spatially varying pH gradient; collecting solid calcium hydroxide from an alkaline region of the spatially varying pH gradient, wherein the solid calcium hydroxide comprises calcium from the calcium carbonate dissolved and/or reacted within the spatially varying pH gradient; and heating the solid calcium hydroxide and/or solid calcium oxide derived from at least a portion of the solid calcium hydroxide within a kiln to make cement.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIGS. 14A-14J are timelapse images of decarbonation H-cells using platinum electrodes and 1M $NaNO_3$ in deionized water as electrolyte, in accordance with certain embodiments.

FIGS. 18A-18F show synthesis of alite using $CaCO_3$ and $SiO_2$.

DETAILED DESCRIPTION

Figure 1A:
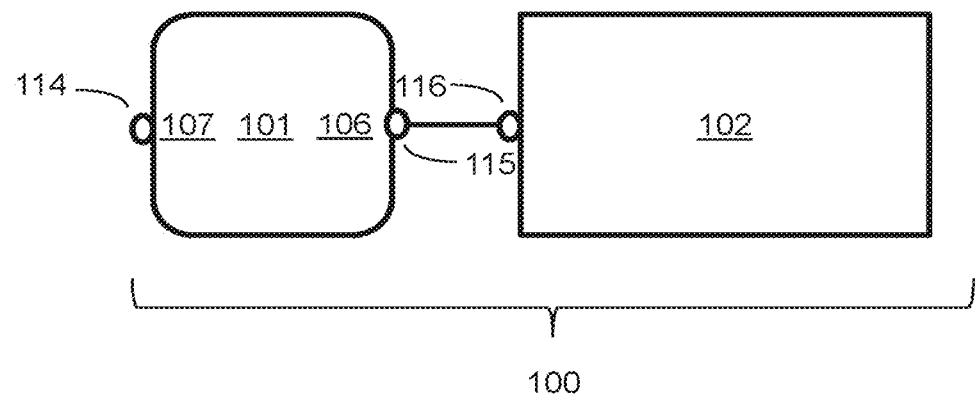
FIG. 1A is, in accordance with certain embodiments, a cross-sectional schematic illustration of a system comprising a reactor and a kiln.
Figure 1B:
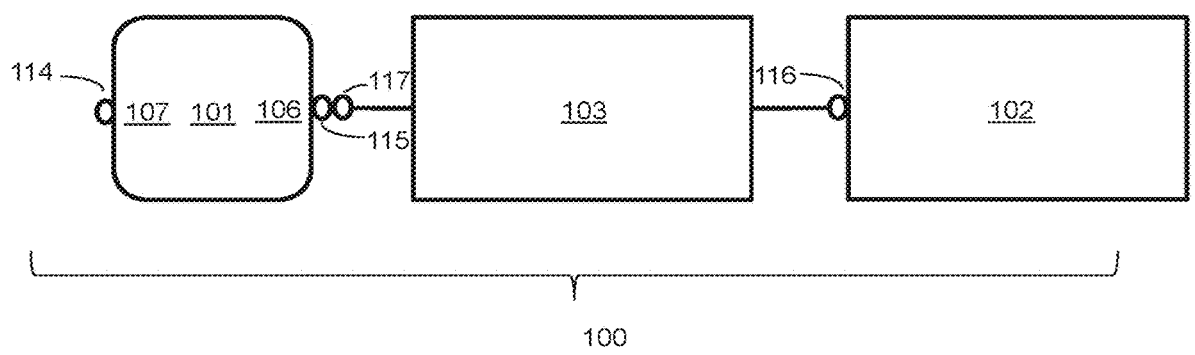
FIG. 1B is, in accordance with certain embodiments, a cross-sectional schematic illustration of a system comprising a reactor, heater, and kiln.
Figure 1C:
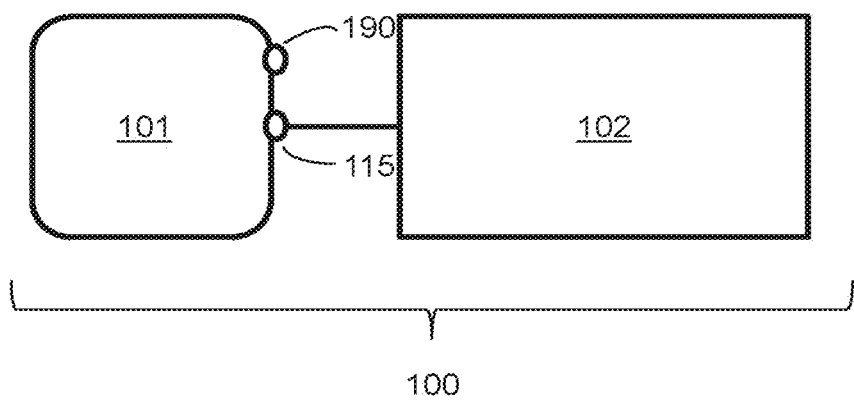
FIG. 1C is, in accordance with certain embodiments, a cross-sectional schematic illustration of a system comprising a reactor and a kiln.
Figure 1D:
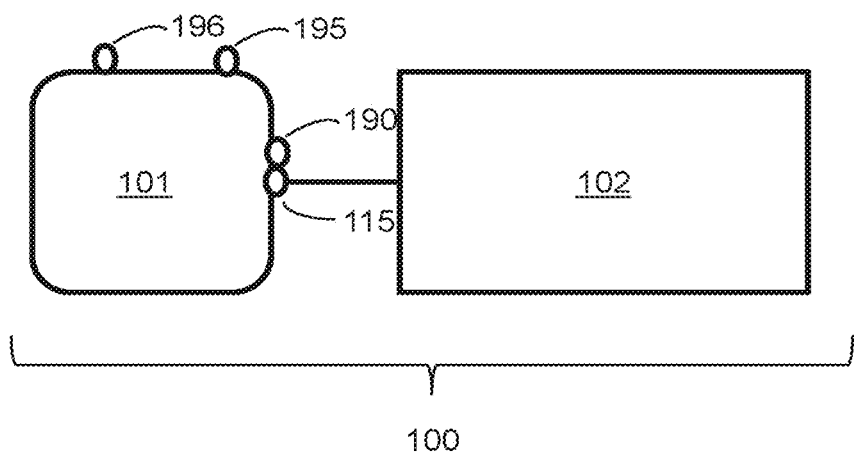
FIG. 1D is, in accordance with certain embodiments, a cross-sectional schematic illustration of a system comprising a reactor and a kiln.
Figure 2A:
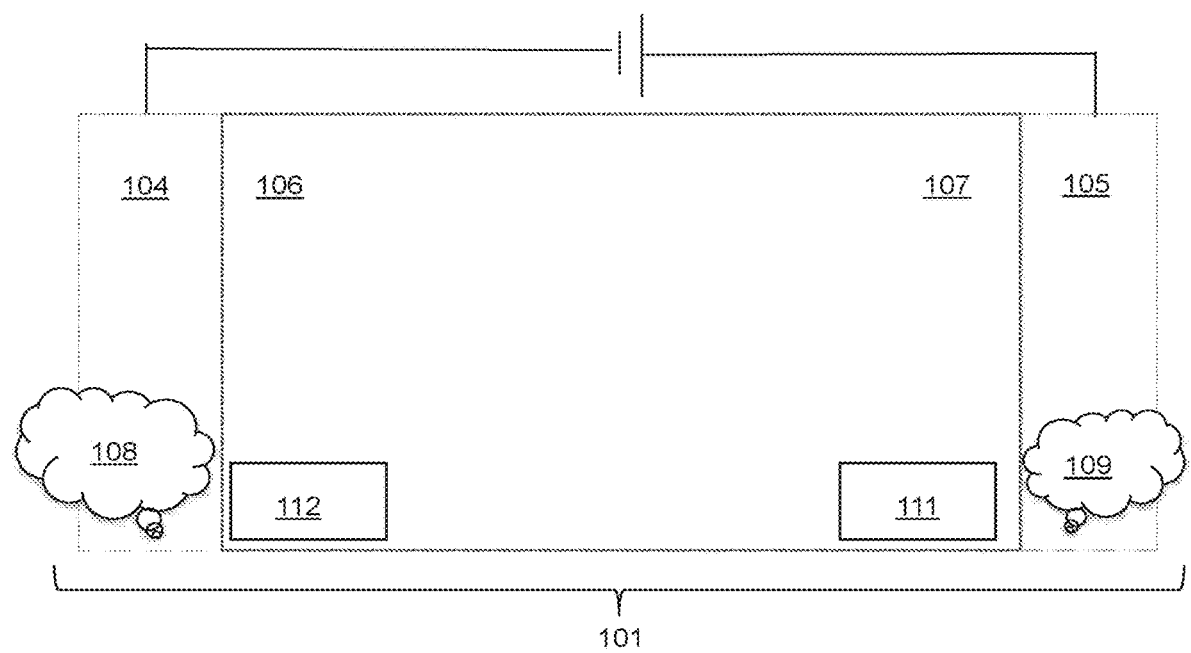
FIG. 2A is, in accordance with certain embodiments, a cross-sectional schematic illustration of a reactor.
Figure 2B:
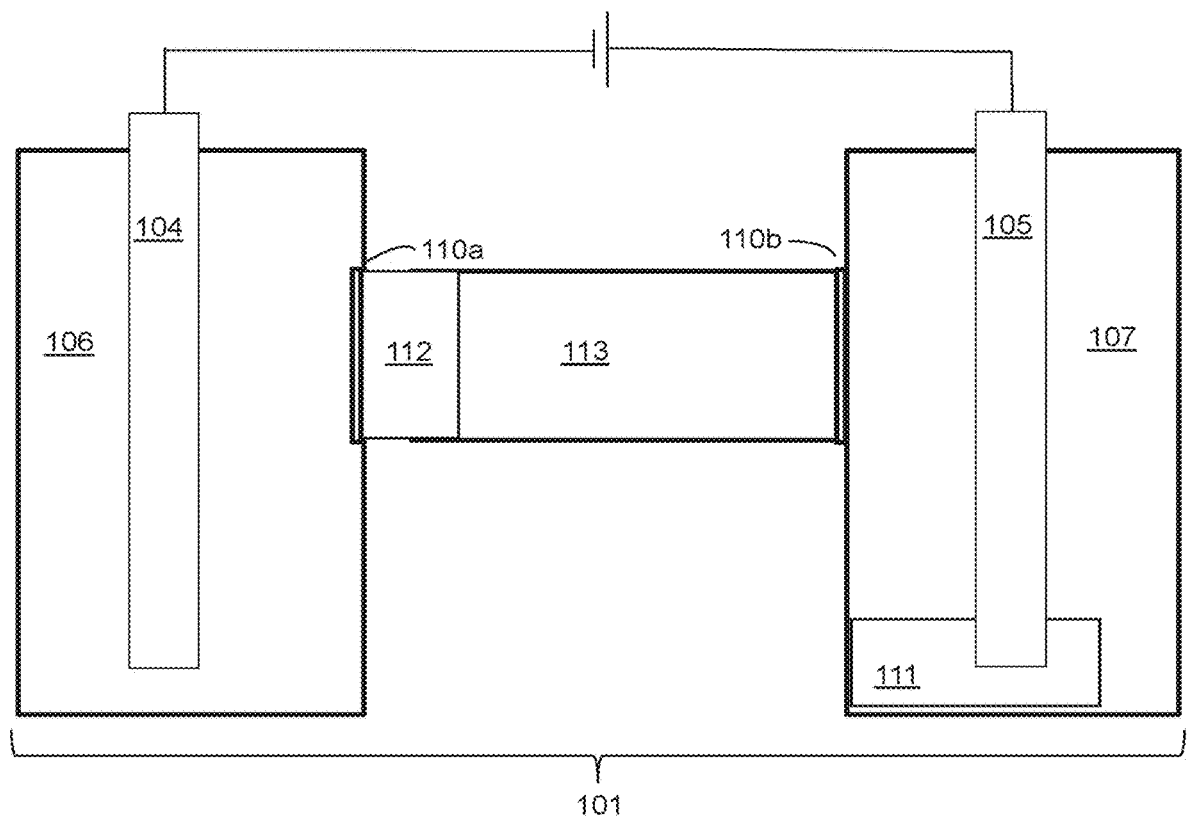
FIG. 2B is, in accordance with certain embodiments, a cross-sectional schematic illustration of a reactor in an H-cell, comprising a separate chamber between two membranes selectively permeable to ions.

Reaction schemes involving acids and bases; reactors comprising spatially varying chemical composition gradients (e.g., spatially varying pH gradients), and associated systems and methods, are generally described. In some embodiments, the method comprises producing an acid and a base via electrolysis (e.g., hydrolysis). In certain embodiments, the method comprises dissolving a metal salt (e.g., a metal carbonate, such as calcium carbonate, magnesium carbonate, and/or nickel carbonate) in the acid. In some cases, the method comprises precipitating a metal hydroxide (e.g., calcium hydroxide, magnesium hydroxide, and/or nickel hydroxide) in the base. In some embodiments, the method comprises collecting the precipitated metal hydroxide. In certain such embodiments, the electrolysis produces a spatially varying chemical composition gradient within a reactor (e.g., a spatially varying pH gradient within a reactor).

In some embodiments, electrochemical reactors comprise spatially varying chemical composition gradients (e.g., spatially varying pH gradients). In certain embodiments, precipitates are formed using a spatially varying chemical composition gradient (e.g., spatially varying pH gradient). In some embodiments, a chemical compound (e.g., a metal salt) is dissolved in a first region (e.g., an acidic region) of the spatially varying chemical composition gradient (e.g., the spatially varying pH gradient) and a precipitate comprising one or more elements (e.g., metal) from the chemical compound (e.g., the metal salt) is formed in a second region (e.g., an alkaline region) of the spatially varying chemical composition gradient (e.g., the spatially varying pH gradient).

Some embodiments concern compositions, methods, and reactor designs in which an electrolytic reaction is used to produce a chemical composition gradient between the positive and negative electrodes of an electrochemical cell. Said electrolytically produced composition gradient is then employed, in some embodiments, to conduct a desired chemical reaction by feeding a reactant to the chemical environment near one electrode, and using the electrolytically produced chemical gradient to produce a product from said reactant as the reactant or its components diffuse toward the other electrode. In one embodiment, such a reactor is directed towards the production of a decomposed, mineral or metal salt through electrochemical and chemical means. In one embodiment, the use of fossil fuels for production of thermal energy, and the associated production of greenhouse gases or gases that are atmospheric pollutants, is reduced or avoided through the use of such a reactor in place of traditional thermal calcination that involves heating of the mineral or metal salt to decompose it. In some embodiments, the mineral or metal salt comprises a metal carbonate, and the greenhouse gases produced are at least in part carbon dioxide. In another embodiment, the electrolytically driven chemical reactor is powered by electricity from renewable sources such as solar photovoltaics or wind energy, and thereby reduces the use of greenhouse-gas-producing energy sources in carrying out the calcination or decomposition reaction.

Some embodiments are related to a process for the production of cement, such as Portland cement. Concrete is today the most widely used man-made material in the world. Cement production is also the second largest industrial emitter of $CO_2$ in the world, accounting for about 8% of global $CO_2$ emissions. Traditional methods for industrial production of cement include the calcination of $CaCO_3$ by thermal means. In current manufacturing of cement, about 60% of the $CO_2$ emissions result from the calcination of $CaCO_3$, and about 40% of the $CO_2$ emissions result from the burning of fossil fuels to carry out the calcination and sintering processes. Thus, there exists a great need for cement production processes that emit less $CO_2$. Some embodiments are related to a cement production process in which thermal calcination is replaced by herein described electrochemical processes that produce less $CO_2$ per quantity of cement produced than current manufacturing.

Cement production systems comprising electrochemical reactors, and related methods, are generally described. Certain embodiments are related to inventive systems for producing cement comprising an electrochemical reactor and a kiln. In certain embodiments, the electrochemical reactor is configured to receive $CaCO_3$. In some embodiments, the electrochemical reactor comprises a first outlet configured to discharge $Ca(OH)_2$ and/or lime. In certain cases, the electrochemical reactor comprises a second outlet configured to discharge $CO_2$, $O_2$, and/or $H_2$ gas. In accordance with certain embodiments, the kiln is configured to heat the $Ca(OH)_2$ and/or lime (and/or a reaction product thereof) as part of a cement-making process.

In some embodiments, the system is powered at least in part (e.g., at least 10%, at least 25%, at least 50%, at least 75%, at least 90%, or 100%) by renewable electricity (e.g., solar energy and/or wind energy). In certain cases, the system has lower net carbon emissions (e.g., at least 10% lower, at least 25% lower, at least 50% lower, at least 75% lower, or at least 90% lower) than substantially similar systems that use traditional thermal calcination instead of the electrochemical reactor. In some instances, the system has net-zero carbon emissions.

Certain embodiments are related to inventive methods in which $Ca(OH)_2$ and/or lime is produced in an electrochemical reactor. In some embodiments, the $Ca(OH)_2$ and/or lime from the electrochemical reactor is then transported to a kiln, which heats the $Ca(OH)_2$ and/or lime (and/or a reaction product thereof) as part of a cement-making process. In some embodiments, the electrochemical reactor also produces $CO_2$, $O_2$, and/or $H_2$ gas. According to certain embodiments, the $CO_2$ is sequestered, used in liquid fuel, used in oxyfuel, used in enhanced oil recovery, used to produce dry ice, and/or used as an ingredient in a beverage. In some cases, the $O_2$ can be sequestered, used in oxyfuel, used in a CCS application, and/or used in enhanced oil recovery. In certain instances, the $H_2$ can be sequestered and/or used as a fuel (e.g., in a fuel cell and/or to heat the system). In some embodiments, at least a portion (e.g., at least 10%, at least 25%, at least 50%, at least 75%, at least 90%, or all) of the $CO_2$, $O_2$, and/or $H_2$ discharged from the system is fed into the kiln.

As noted above, certain aspects are related to reactors. Non-limiting examples of such reactors are shown in FIGS. 1A-3B and 5-10.

In some embodiments, the reactor comprises a pair of opposing electrodes. According to some embodiments, the reactor comprises a concentric electrode design. In accordance with some embodiments, the reactor comprises an H-cell (such as that shown in FIGS. 3A, 3B, and 10). In certain embodiments, the reactor comprises a first electrode. In some embodiments, the first electrode comprises a cathode. For example, in FIG. 2B, reactor 101 comprises cathode 104. In certain embodiments, the first electrode is selected to be an electronic conductor that is stable under relatively alkaline conditions. In certain embodiments, the first electrode comprises a metallic electrode, such as platinum, gold, nickel, iridium, copper, iron, steel, stainless steel, manganese, and zinc, or a carbon, such as graphite or disordered carbons, or a metal carbide, such as silicon carbide, titanium carbide, or tungsten carbide. In certain embodiments, the first electrode comprises a metal alloy (e.g. a nickel-chromium-iron alloy, nickel-molybdenum-cadmium alloy), a metal oxide (e.g. iridium oxide, nickel iron cobalt oxide, nickel cobalt oxide, lithium cobalt oxide, lanthanum strontium cobalt oxide, barium strontium ferrous oxide, manganese molybdenum oxide, ruthenium dioxide, iridium ruthenium tantalum oxide), a metal organic framework, or a metal sulfide (e.g. molybdenum sulfide). In certain embodiments, the electrocatalyst or electrode material is dispersed or coated onto a conductive support.

In some embodiments, the reactor comprises a second electrode. In some embodiments, the second electrode comprises an anode. For example, in FIG. 2B, reactor 101 comprises anode 105. In certain embodiments, the second electrode is selected to be an electronic conductor that is stable under relatively acidic conditions. In certain embodiments, the second electrode comprises a metallic electrode, such as platinum, palladium, lead, or tin, or a metal oxide, such as a transition metal oxide. In certain embodiments, the first electrode and/or the second electrode comprise catalysts. In some embodiments the cathode catalyst is selected to be stable under alkaline conditions, such as nickel, iron, a transition metal sulfide, such as molybdenum sulfide, or a transition metal oxide, such as $MnO_2$, $Mn_2O_3$, $Mn_3O_4$, nickel oxide, nickel hydroxide, iron oxide, iron hydroxide, cobalt oxide, a mixed transition metal spinel oxide such as $MnCo_2O_4$, $CoMn_2O_4$, $MnFe_2O_4$, $ZnCoMnO_4$, and the like. In some embodiments the anode catalyst is selected to be stable under acidic conditions, such as platinum or iridium or their oxides.

According to certain embodiments, the reactor comprises a spatially varying chemical composition gradient between the first electrode and the second electrode. In some embodiments, the spatially varying chemical composition gradient comprises a spatially varying pH gradient. For example, in FIG. 2B, reactor 101 comprises second region (e.g., alkaline region) 106 near cathode 104 and first region (e.g., acidic region) 107 near anode 105; thus, reactor 101 comprises a spatially varying chemical composition gradient (e.g., spatially varying pH gradient) between the first electrode and the second electrode. In some embodiments, the first region comprises an acidic region. In certain embodiments, the second region comprises an alkaline region. In other embodiments, the first region comprises an alkaline region and the second region comprises an acidic region.

In some embodiments, the reactor is configured such that the spatially varying chemical composition gradient (e.g., the spatially varying pH gradient) is established and/or maintained, at least in part, by electrolysis. For example, in FIG. 2B, reactor 101 comprises a spatially varying chemical composition gradient (e.g., a spatially varying pH gradient) comprising second region (e.g., alkaline region) 106 and first region (e.g., acidic region) 107. In some such embodiments, this spatially varying chemical composition gradient (e.g., spatially varying pH gradient) is established and/or maintained by electrolysis. Electrolysis of a neutral electrolyte can produce, in accordance with some embodiments, a spatially varying chemical composition gradient (e.g., spatially varying pH gradient) between electrodes, such as cathode 104 and anode 105. In some embodiments, an electrolysis reaction is used to produce a chemical composition gradient between the positive and negative electrodes of an electrochemical cell. In accordance with certain embodiments, the electrolytically produced chemical composition gradient can be employed to conduct a desired chemical reaction by feeding a reactant to the chemical environment near one electrode, and using the electrolytically produced chemical composition gradient to produce a product from said reactant as the reactant or its components diffuse towards the other electrode.

In some embodiments, the electrolysis comprises hydrolysis. As used herein, hydrolysis refers to the electrolysis of water. For example, in some embodiments, the reaction taking place in the cathode converts 2 $H_2O$ molecules and 2 electrons to $H_2$ and 2$OH^-$, while the reaction taking place in the anode converts 2 $H_2O$ molecules to 4 electrons, $O_2$, and 4 protons. In some embodiments, the generation of hydroxide ions at or near cathode 104 establishes and/or maintains an alkaline pH at or near cathode 104, establishing and/or maintaining second region (e.g., alkaline region) 106, while the generation of protons at or near anode 105 establishes an acidic pH at or near anode 105, establishing and/or maintaining first region (e.g., acidic region) 107. Thus, in certain embodiments, the reactor is configured such that the spatially varying chemical composition gradient (e.g., spatially varying pH gradient) is established and/or maintained, at least in part, by hydrolysis.

In accordance with certain embodiments, the reactor comprises an inlet connected to a first region (e.g., an acidic region) of the spatially varying chemical composition gradient (e.g., spatially varying pH gradient). For example, in FIG. 1B, reactor 101 comprises reactor inlet 114 connected to first region (e.g., acidic region) 107 of the spatially varying chemical composition gradient (e.g., spatially varying pH gradient).

According to certain embodiments, the acidic region has a pH of 6 or less, 5 or less, 4 or less, 3 or less, or 2 or less. In some embodiments, the acidic region has a pH of at least 0, at least 1, at least 2, at least 3, or at least 4. Combinations of these ranges are also possible (e.g., a pH of from 0 to 6 inclusive).

In certain embodiments, the electrochemical reactor is configured to receive $CaCO_3$.

In some embodiments, the reactor comprises an outlet connected to a second region (e.g., an alkaline region) of the spatially varying chemical composition gradient (e.g., spatially varying pH gradient). For example, in FIG. 1B, reactor 101 comprises reactor outlet 115 connected to second region (e.g., alkaline region) 106 of the spatially varying chemical composition gradient (e.g., the spatially varying pH gradient).

In accordance with some embodiments, the alkaline region has a pH of 8 or higher, 9 or higher, 10 or higher, 11 or higher, or 12 or higher. In accordance with some embodiments, the alkaline region has a pH of 14 or less, 13 or less, 12 or less, 11 or less, or 10 or less. Combinations of these ranges are also possible (e.g., a pH of from 8 to 14 inclusive).

In certain embodiments, the outlet is configured such that solids can be expelled from the reactor. For example, in FIG. 1A, reactor 101 comprises reactor outlet 115 which is configured such that solids can be expelled from reactor 101. In some embodiments, the reactor comprises a solids handling apparatus associated with the outlet and configured to remove solid from the reactor. For example, in some embodiments, solids handling apparatus 117 is configured to remove solids (such as solid metal hydroxides, such as solid nickel hydroxide, solid calcium hydroxide, or solid magnesium hydroxide) from reactor 101. Examples of solids handling apparatuses include, but are not limited to, conveyor belts, augers, pumps, chutes, or any other device capable of transporting solids away from the reactor. In some embodiments the solids handling apparatus separates the solid from the liquid using one or a combination of fluid flow, filtering, sedimentation, centrifugal force, electrophoresis, dielectrophoresis, or magnetic separation.

In some embodiments, the reactor comprises a reactor outlet. For example, in FIG. 1C, system 100 comprises reactor 101, which comprises reactor outlet 115. In some embodiments, the reactor outlet is configured to discharge $Ca(OH)_2$ (e.g., solid calcium hydroxide) and/or lime.

In some embodiments, the reactor comprises more than one reactor outlet (e.g., at least 1, at least 2, at least 3, at least 4, less than or equal to 5, less than or equal to 4, less than or equal to 3, or less than or equal to 2; combinations of these ranges are also possible). In certain embodiments, the reactor comprises a second outlet. For example, in FIG. 1C, reactor 101 comprises second outlet 190.

In certain embodiments, the second outlet is configured to discharge $CO_2$, $O_2$, and/or $H_2$. In some instances, the $CO_2$ is to be sequestered, used in a liquid fuel, used in an oxyfuel, used in enhanced oil recovery, used to produce dry ice, and/or used as an ingredient in a beverage. In some embodiments, the $O_2$ is to be sequestered, used as oxyfuel, used in a CCS application, and/or used in enhanced oil recovery. In certain cases, the $H_2$ is to be sequestered and/or used as a fuel (e.g., in a fuel cell and/or to heat the system). In some embodiments, at least a portion (e.g., at least 10%, at least 25%, at least 50%, at least 75%, at least 90%, or all) of the $CO_2$, $O_2$, and/or $H_2$ discharged from the system is fed into a kiln.

In some embodiments, the reactor comprises a third outlet and/or a fourth outlet. For example, in FIG. 1D, reactor 100 comprises third outlet 195 and fourth outlet 196. In some cases, the second outlet, third outlet, and/or fourth outlet is configured to discharge $CO_2$, $O_2$, and/or $H_2$. For example, in some cases, the second outlet is configured to discharge $CO_2$ and $O_2$ while the third outlet is configured to discharge $H_2$. In certain instances, the second outlet is configured to discharge $CO_2$, the third outlet is configured to discharge $O_2$, and the fourth outlet is configured to discharge $H_2$.

According to some embodiments, the reactor further comprises one or more membranes selectively permeable to ions between the first electrode and the second electrode. In certain embodiments, the one or more membranes selectively permeable to ions comprises two membranes selectively permeable to ions. For example, in FIG. 2B, reactor 101 comprises two membranes selectively permeable to ions (membrane 110a and membrane 110b) between cathode 104 and anode 105, with separate chamber 113 formed between membranes selectively permeable to ions (membrane 110a and membrane 110b). In some embodiments, the two membranes selectively permeable to ions are the same as each other. In certain embodiments, the two membranes selectively permeable to ions are different from each other.

In some embodiments, the one or more membranes selectively permeable to ions is configured to prevent solid from precipitating on the first electrode, prevent solid from passivating the first electrode, and/or prevent two different solids from contaminating each other.

According to certain embodiments, a membrane selectively permeable to ions allows ions to pass through while restricting (or eliminating) the passage of solids. For example, in FIGS. 3A and 3B, membranes selectively permeable to ions (membrane 110a and membrane 110b) can comprise a porous fibrous material such as filter paper, which allows ions to pass through while restricting (or eliminating) the passage of solids. For example, in some embodiments, a metal ion (e.g., $Ca^{2+}$) may pass through while a solid metal salt (e.g., a solid metal carbonate, such as solid $CaCO_3$) or a precipitate (e.g., solid metal hydroxide, such as solid $Ca(OH)_2$) is restricted (or does not pass through at all).

In some embodiments, the membrane selectively permeable to ions allows ions to pass through but restricts (or eliminates) the passage of non-ionic compounds. In certain embodiments, the membrane selectively permeable to ions allows ions to pass through at a first rate and allows non-ionic compounds to pass through at a second rate, which is slower than the first rate. In some embodiments, the membrane selectively permeable to ions allows certain ions to pass through but restricts (or eliminates) the passage of other ions. In certain embodiments, the membrane selectively permeable to ions allows certain ions to pass through at a first rate and allows other ions to pass through at a second rate, which is slower than the first rate. In some embodiments, membranes selectively permeable to ions may allow certain metal ions to pass through but restricts (or eliminates) the passage of others (or allows certain metal ions to pass through faster than others), may allow $H^+$ to pass through but restricts (or eliminates) the passage of $OH^-$ (or allows $H^+$ to pass through faster than $OH^-$) may allow $OH^-$ to pass through but restricts (or eliminates) the passage of $H^+$ (or allows $OH^-$ to pass through faster than $H^+$), may allow metal ions to pass through but restricts (or eliminates) the passage of $H^+$ and/or $OH^-$ (or allows metal ions to pass through faster than $H^+$ and/or $OH^-$), and/or may allow $H^+$ and/or $OH^-$ ions to pass through but restricts (or eliminates) the passage of metal ions (or allows $H^+$ and/or $OH^-$ ions to pass through faster than metal ions).

For example, in some embodiments, membrane 110a is selectively permeable to ions, for example, membrane 110a can be permeable to $OH^-$ ions but relatively less permeable to $Ca^{2+}$ ions, while membrane 110b is also selectively permeable to ions, but, for example, may be permeable to $Ca^{2+}$ ions but relatively less permeable to $OH^-$ ions. In this example, $Ca^{2+}$ from first region (e.g., acidic region) 107 could diffuse through membrane 110b, which is selectively permeable to ions, into separate chamber 113, but could not diffuse through membrane 110a, which is selectively permeable to different ions, into second region (e.g., alkaline region) 106. Additionally, in this example, $OH^-$ ions from second region (e.g., alkaline region) 106 could diffuse through membrane 110a, which is selectively permeable to ions, into separate chamber 113, but could not diffuse through membrane 110b, which is selectively permeable to different ions. Thus, in this example, $Ca^{2+}$ and $OH^-$ would only be able to react, forming solid $Ca(OH)_2$, in separate chamber 113, preventing solid $Ca(OH)_2$ from forming on cathode 104 or anode 105. Accordingly, in some embodiments, the one or more membranes selectively permeable to ions could prevent solid (e.g., solid metal hydroxide, such as solid $Ca(OH)_2$) from precipitating on the first electrode (e.g., cathode), prevent solid (e.g., solid metal hydroxide, such as solid $Ca(OH)_2$) from passivating the first electrode (e.g., cathode); and/or prevent two different solids—the chemical compound (e.g., a metal salt, such as a solid metal carbonate, such as solid calcium carbonate) and the precipitate (e.g., a solid hydroxide, such as a solid metal hydroxide, such as solid $Ca(OH)_2$) from contaminating each other.

In certain embodiments, the reactor is directed toward the production of a calcined, or decomposed, mineral or metal salt (e.g., metal carbonate) through electrochemical and chemical means. In some embodiments, the use of fossil fuels for production of thermal energy, and the associated production of greenhouse gases (e.g., $CO_2$) or gases that are atmospheric pollutants, is reduced or avoided through the use of such a reactor in place of traditional thermal calcination that involves heating of the mineral or metal salt to decompose it.

Certain aspects are related to systems for producing cement. Non-limiting examples of such systems are shown in FIGS. 1A-D.

In some embodiments, the system comprises a reactor. For example, in FIG. 1C, system 100 comprises reactor 101.

In certain embodiments, the reactor comprises any of the reactor embodiments disclosed above or elsewhere herein, or combinations thereof.

According to certain embodiments, the reactor comprises a region comprising a spatially varying chemical composition gradient (e.g., a spatially varying pH gradient). In some embodiments, the spatially varying chemical composition gradient (e.g., the spatially varying pH gradient) comprises a first region (e.g., an acidic region) and a second region (e.g., an alkaline region). For example, in FIG. 1A, system 100 comprises reactor 101, which comprises a spatially varying chemical composition gradient (e.g., a spatially varying pH gradient) comprising second region (e.g., alkaline region) 106 and first region (e.g., acidic region) 107.

According to certain embodiments, the acidic region has a pH of 6 or less, 5 or less, 4 or less, 3 or less, or 2 or less. In some embodiments, the acidic region has a pH of at least 0, at least 1, at least 2, at least 3, or at least 4. Combinations of these ranges are also possible (e.g., a pH of from 0 to 6 inclusive).

In accordance with some embodiments, the alkaline region has a pH of 8 or higher, 9 or higher, 10 or higher, 11 or higher, or 12 or higher. In accordance with some embodiments, the alkaline region has a pH of 14 or less, 13 or less, 12 or less, 11 or less, or 10 or less. Combinations of these ranges are also possible (e.g., a pH of from 8 to 14 inclusive).

According to some embodiments, the reactor is configured such that the spatially varying chemical composition gradient (e.g., the spatially varying pH gradient) is established and/or maintained, at least in part, by electrolysis. For example, in FIG. 2A, reactor 101 comprises a spatially varying chemical composition gradient (e.g., a spatially varying pH gradient) comprising second region (e.g., alkaline region) 106 and first region (e.g., acidic region) 107, and this spatially varying chemical composition gradient (e.g., spatially varying pH gradient) was established and/or maintained by electrolysis. Electrolysis of a neutral electrolyte, in accordance with some embodiments, causes a spatially varying chemical composition gradient (e.g., spatially varying pH gradient) between electrodes, such as cathode 104 and anode 105. In some embodiments, the electrolysis comprises hydrolysis. As used herein, hydrolysis refers to the electrolysis of water. For example, in some embodiments, the reaction taking place in the cathode is $2 H_2O + 2e^- \rightarrow H_2 + 2OH^-$, while the reaction taking place in the anode is $2H_2O \rightarrow O_2 + 4H^+ + 4e^-$. In some embodiments, the generation of hydroxide ions at or near cathode 104 establishes and/or maintains an alkaline pH at or near cathode 104, establishing and/or maintaining second region (e.g., alkaline region) 106, while the generation of protons at or near anode 105 establishes an acidic pH at or near anode 105, establishing and/or maintaining first region (e.g., acidic region) 107.

In certain embodiments, the reactor comprises a reactor inlet configured to receive calcium carbonate. For example, in FIG. 1A, system 100 comprises reactor 101, which comprises reactor inlet 114, and reactor inlet 114 is configured to receive calcium carbonate.

In some embodiments, the reactor comprises a reactor outlet. For example, in FIG. 1C, system 100 comprises reactor 101, which comprises reactor outlet 115. In some embodiments, the reactor outlet is configured to discharge $Ca(OH)_2$ (e.g., solid calcium hydroxide) and/or lime.

In some embodiments, the reactor comprises more than one reactor outlet (e.g., at least 1, at least 2, at least 3, at least 4, less than or equal to 5, less than or equal to 4, less than or equal to 3, or less than or equal to 2; combinations of these ranges are also possible). In certain embodiments, the reactor comprises a second outlet. For example, in FIG. 1C, reactor 101 comprises second outlet 190.

In certain embodiments, the second outlet is configured to discharge $CO_2$, $O_2$, and/or $H_2$. In some instances, the $CO_2$ is to be sequestered, used in a liquid fuel, used in an oxyfuel, used in enhanced oil recovery, used to produce dry ice, and/or used as an ingredient in a beverage. In some embodiments, the $O_2$ is to be sequestered, used as oxyfuel, used in a CCS application, and/or used in enhanced oil recovery. In certain cases, the $H_2$ is to be sequestered and/or used as a fuel (e.g., in a fuel cell and/or to heat the system). In some embodiments, at least a portion (e.g., at least 10%, at least 25%, at least 50%, at least 75%, at least 90%, or all) of the $CO_2$, $O_2$, and/or $H_2$ discharged from the system is fed into the kiln.

In some embodiments, the reactor comprises a third outlet and/or a fourth outlet. For example, in FIG. 1D, reactor 100 comprises third outlet 195 and fourth outlet 196. In some cases, the second outlet, third outlet, and/or fourth outlet is configured to discharge $CO_2$, $O_2$, and/or $H_2$. For example, in some cases, the second outlet is configured to discharge $CO_2$ and $O_2$ while the third outlet is configured to discharge $H_2$. In certain instances, the second outlet is configured to discharge $CO_2$, the third outlet is configured to discharge $O_2$, and the fourth outlet is configured to discharge $H_2$.

According to some embodiments, the system is configured for collection of a byproduct different from the solid calcium hydroxide and/or solid calcium oxide. In some embodiments, the byproduct comprises $CO_2$, $O_2$, and/or $H_2$. For example, in FIG. 2A, byproduct 108 is generated at cathode 104 and byproduct 109 is generated at anode 105. In some embodiments, byproduct 108 comprises $H_2$ (g). In some embodiments, byproduct 109 comprises $O_2$ (g) and/or $CO_2$ (g). For example, in some embodiments, hydrolysis is performed in reactor 101, and the reaction taking place in the cathode converts 2 $H_2O$ molecules and 2 electrons to $H_2$ (g) (byproduct 108) and 2 $OH^-$, while the reaction taking place in the anode converts two $H_2O$ molecules to $O_2$ (g) (byproduct 109), 4 electrons, and 4 protons. In certain embodiments, chemical compound (e.g., metal salt) 111 (e.g., a metal carbonate, such as calcium carbonate) is added to first region (e.g., acidic region) 107, and chemical compound (e.g., metal salt) 111 reacts with the protons in first region (e.g., acidic region) 107, such that chemical compound (e.g., metal salt) 111 is dissolved, forming one or more elements (e.g., metal, such as $Ca^{2+}$). For example, in some embodiments, the net reaction between $CaCO_3$ and two protons results in the formation of $H_2O$, $Ca^{2+}$, and $CO_2$ (g) (byproduct 109).

In some embodiments, collection of the byproduct comprises collection of any of the byproducts. For example, in some embodiments, collection of the byproduct comprises collection of each of $CO_2$, $O_2$, and $H_2$; collection of only the $CO_2$; collection of only the $O_2$; collection of only the $H_2$; collection of $CO_2$ and $O_2$; collection of $CO_2$ and $H_2$, or collection of $O_2$ and $H_2$. For example, in some embodiments, the byproduct comprises $CO_2$ and the collection of the byproduct comprises sequestration of the $CO_2$.

In certain embodiments, the system comprises a kiln. For example, in FIG. 1C, system 100 comprises kiln 102. In some embodiments, the kiln comprises a kiln inlet. For example, in FIG. 1A, kiln 102 comprises kiln inlet 116. According to some embodiments, the kiln is downstream from the reactor outlet. For example, in FIG. 1A, kiln 102 is downstream from reactor outlet 115.

According to certain embodiments, the system further comprises a heater between the reactor outlet and the kiln inlet. For example, in FIG. 1B, heater 103 is between reactor outlet 115 and kiln inlet 116. Examples of heaters include devices that heat or dehydrate the substance placed inside it. For example, heater 103 could heat or dehydrate a precipitate (e.g., a metal precipitate, such as a metal hydroxide, such as Ca(OH)$_2$ to its oxide (e.g., CaO), in part or in full. In some embodiments, the reactor outlet is attached directly to the kiln inlet. For example, in FIG. 1A, reactor outlet 115 is attached directly to kiln inlet 116.

As used herein, a direct attachment exists between a first unit and a second unit (and the two units are said to be "attached directly to" each other) when they are connected to each other and the composition of the material being transferred between the units does not substantially change (i.e., no component changes in relative abundance by more than 5%) as it is transported from the first unit to the second unit. As an illustrative example, a conduit that connects first and second units, and in which the pressure and temperature of the contents of the conduit are adjusted but the composition of the contents is not altered, would be said to directly attach the first and second units. If, on the other hand, a separation step is performed and/or a chemical reaction is performed that substantially alters the composition of the contents of the conduit during passage from the first unit to the second unit, the conduit would not be said to directly connect the first and second units. In some embodiments, two units that are attached directly to each other are configured such that there is no phase change of the material as it is transported from the first unit to the second unit.

In certain embodiments, the kiln inlet is configured to receive at least a portion of the solid calcium hydroxide and/or solid calcium oxide derived from at least a portion of the solid calcium hydroxide. For example, in some embodiments, calcium hydroxide is collected from reactor outlet 115, and reactor outlet 115 is attached directly to kiln inlet 116, such that kiln inlet 116 is configured to receive at least a portion of the solid calcium hydroxide. In certain embodiments, calcium hydroxide is collected from reactor outlet 115, and is transported to heater 103. In some embodiments, heater 103 converts the calcium hydroxide to calcium oxide, in full or in part. In some embodiments, kiln inlet 116 is configured to receive at least a portion of the solid calcium hydroxide and/or solid calcium oxide derived from at least a portion of the solid calcium hydroxide from heater 103.

In accordance with some embodiments, the kiln is configured to heat the Ca(OH)$_2$ (e.g., solid calcium hydroxide) and/or lime (e.g., solid calcium oxide) and/or a reaction product thereof as part of a cement-making process. In some embodiments, heating the Ca(OH)$_2$ and/or lime as part of a cement-making process comprises heating the Ca(OH)$_2$ and/or lime in the kiln with other compounds. For example, the Ca(OH)$_2$ and/or lime could be heated in the kiln with SiO$_2$ or other minerals.

In certain cases, the system has lower net carbon emissions (e.g., at least 10% lower, at least 25% lower, at least 50% lower, at least 75% lower, or at least 90% lower) than substantially similar systems that use traditional thermal calcination instead of the electrochemical reactor. In some instances, the system has net-zero carbon emissions.

Certain aspects are related to methods. Certain aspects are related to methods of producing acid and base via electrolysis. A non-limiting example of one such method can be described in relation to the embodiments shown in FIG. 1A.

In some embodiments, the method comprises producing an acid and a base via electrolysis (e.g., hydrolysis). For example, in certain embodiments, acid is produced in first region (e.g., acidic region) 107 and base is produced in second region (e.g., alkaline region) 106 of FIG. 1A. In certain embodiments, the method comprises dissolving a metal salt (e.g., a metal carbonate, such as calcium carbonate, magnesium carbonate, and/or nickel carbonate) in the acid. For example, in some instances, a metal salt can be added through reactor inlet 114 in FIG. 1A to first region (e.g., acidic region) 107, where it is dissolved in the acid. In some cases, the method comprises precipitating a metal hydroxide (e.g., calcium hydroxide, magnesium hydroxide, and/or nickel hydroxide) in the base. For example, in certain cases, a metal hydroxide can be precipitated in second region (e.g., alkaline region) 106 in FIG. 1A. In some embodiments, the method comprises collecting the precipitated metal hydroxide. For example, in certain embodiments, the precipitated metal hydroxide can be collected from reactor outlet 115 of FIG. 1A. In some instances, the electrolysis produces a spatially varying chemical composition gradient within a reactor (e.g., a spatially varying pH gradient within a reactor). For example, in certain cases, the electrolysis produces a spatially varying chemical composition gradient (e.g., a spatially varying pH gradient) comprising second region (e.g., alkaline region) 106 and first region (e.g., acidic region) 107 within reactor 101 of FIG. 1A.

Certain aspects are related to methods of forming precipitates in a spatially varying chemical composition gradient (e.g., spatially varying pH gradient). A non-limiting example of one such method can be described in relation to the embodiments shown in FIGS. 2A and 2B.

According to some embodiments, the method is performed in a reactor and/or system as described in association with any of the embodiments disclosed above or elsewhere herein, or combinations thereof.

In certain embodiments, the method comprises establishing and/or maintaining a region comprising a spatially varying chemical composition gradient. In some embodiments, the spatially varying chemical composition gradient comprises a spatially varying pH gradient. For example, in FIG. 2A, reactor 101 comprises a spatially varying chemical composition gradient (e.g., a spatially varying pH gradient) comprising second region (e.g., alkaline region) 106 and first region (e.g., acidic region) 107. In certain embodiments, the first region comprises an acidic region. In some embodiments, the second region comprises an alkaline region.

In accordance with some embodiments, the establishing and/or maintaining the region comprising the spatially varying chemical composition gradient (e.g., spatially varying pH gradient) comprises performing electrolysis. For example, in FIG. 2A, reactor 101 comprises a spatially varying chemical composition gradient (e.g., a spatially varying pH gradient) comprising second region (e.g., alkaline region) 106 and first region (e.g., acidic region) 107, and this spatially varying chemical composition gradient (e.g., spatially varying pH gradient) was established and/or maintained by electrolysis. Electrolysis of a neutral electrolyte can produce, in accordance with some embodiments, a spatially varying chemical composition gradient (e.g., a spatially varying pH gradient) between electrodes, such as cathode 104 and anode 105. In some embodiments, the electrolysis comprises hydrolysis. As used herein, hydrolysis refers to the electrolysis of water. For example, in some embodiments, the reaction taking place in the cathode converts 2 H$_2$O molecules and 2 electrons to H$_2$ and 2 OH$^-$, while the reaction taking place in the anode converts 2 H$_2$O molecules to O$_2$, 4 electrons, and 4 protons. In some embodiments, the generation of hydroxide ions at or near cathode 104 establishes and/or maintains an alkaline pH at or near cathode 104, establishing and/or maintaining second region (e.g., alkaline region) 106, while the generation of protons at or near anode 105 establishes an acidic pH at or near anode 105, establishing and/or maintaining first region (e.g., acidic region) 107.

In accordance with some embodiments, the method comprises transporting a chemical compound (e.g., a metal salt) to a first region (e.g., an acidic region) of the spatially varying chemical composition gradient (e.g., the spatially varying pH gradient). In certain embodiments, the metal salt comprises metal carbonate. According to some embodiments, the metal carbonate comprises calcium carbonate, magnesium carbonate, and/or nickel carbonate. For example, in accordance with some embodiments, the method comprises transporting calcium carbonate to a first region (e.g., an acidic region) of the spatially varying pH gradient. For example, in FIG. 2A, chemical compound (e.g., metal salt) 111 (e.g., calcium carbonate) is added to first region (e.g., acidic region) 107 of the spatially varying pH gradient.

According to certain embodiments, the acidic region has a pH of 6 or less, 5 or less, 4 or less, 3 or less, or 2 or less. In some embodiments, the acidic region has a pH of at least 0, at least 1, at least 2, at least 3, or at least 4. Combinations of these ranges are also possible (e.g., a pH of from 0 to 6 inclusive).

In accordance with certain embodiments, the chemical compound (e.g., the metal salt) is dissolved and/or reacted in a liquid within the spatially varying chemical composition gradient (e.g., spatially varying pH gradient). Non-limiting examples of liquids include non-aqueous or aqueous solutions. Examples of non-aqueous solutions include solutions comprising a non-aqueous solvent and an electrolyte salt and/or solutions comprising an ionic liquid. Examples of aqueous solutions include solutions comprising water and an electrolyte salt. Examples of electrolyte salts include $NaSO_4$ and $NaClO_4$. In some embodiments, the chemical compound (e.g., the metal salt) is dissolved and reacted within the liquid within the spatially varying chemical composition gradient (e.g., the spatially varying pH gradient). For example, in some embodiments, calcium carbonate is dissolved and/or reacted in a liquid within the spatially varying chemical composition gradient (e.g., the spatially varying pH gradient). In some embodiments, calcium carbonate is dissolved and reacted within the liquid within the spatially varying chemical composition gradient (e.g., the spatially varying pH gradient). For example, in FIG. 2A, chemical compound (e.g., metal salt) 111 (e.g., calcium carbonate) is added to first region (e.g., acidic region) 107, and chemical compound (e.g., metal salt) 111 (e.g., calcium carbonate) reacts with the protons in first region (e.g., acidic region) 107, such that chemical compound (e.g., metal salt) 111 (e.g., calcium carbonate) is dissolved, forming one or more elements, such as a metal (e.g., forming $Ca^{2+}$ and $HCO_3^-$, or $Ca^{2+}$ and $H_2CO_3$). In some embodiments, the one or more elements (e.g., a metal, such as $Ca^{2+}$) moves to second region (e.g., alkaline region) 106, where it reacts with the hydroxide ions in second region (e.g., alkaline region) 106, forming precipitate 112 (e.g., a metal precipitate, such as $Ca(OH)_2$). In some embodiments, the first region comprises an acidic region. In certain embodiments, the second region comprises an alkaline region. According to some embodiments, the chemical compound (e.g., metal salt) is dissolved in the acidic region and the one or more elements (e.g., a metal, such as $Ca^{2+}$) reacts in the alkaline region. In other embodiments, the first region comprises an alkaline region. In some embodiments, the second region comprises an acidic region. In accordance with certain embodiments, the chemical compound (e.g., metal salt) is dissolved in the alkaline region and the one or more elements (e.g., a metal, such as $Ca^{2+}$) reacts in the acidic region.

According to some embodiments, the method comprises collecting a precipitate from a second region (e.g., an alkaline region) of the spatially varying chemical composition gradient (e.g., spatially varying pH gradient). In certain embodiments, the precipitate comprises a metal precipitate, such as a metal hydroxide. Non-limiting examples of metal hydroxides include nickel hydroxide, calcium hydroxide, and magnesium hydroxide. For example, in the example given above, the one or more elements (e.g., a metal, such as $Ca^{2+}$) moves to second region (e.g., alkaline region) 106, where it reacts with the hydroxide ions in second region (e.g., alkaline region) 106, forming precipitate 112 (e.g., a metal precipitate, such as $Ca(OH)_2$). Accordingly, in some embodiments, the method comprises collecting solid calcium hydroxide from an alkaline region of the spatially varying chemical composition gradient (e.g., spatially varying pH gradient). Non-limiting examples of ways in which the one or more elements (e.g., the metal) can move to second region (e.g., alkaline region) 106 include diffusion, transportation by convection, and/or transportation by flow.

In accordance with some embodiments, the alkaline region has a pH of 8 or higher, 9 or higher, 10 or higher, 11 or higher, or 12 or higher. In accordance with some embodiments, the alkaline region has a pH of 14 or less, 13 or less, 12 or less, 11 or less, or 10 or less. Combinations of these ranges are also possible (e.g., a pH of from 8 to 14 inclusive).

In accordance with certain embodiments, the precipitate comprises one or more elements (e.g., metal) from the chemical compound (e.g., the metal salt) dissolved and/or reacted within the spatially varying chemical composition gradient (e.g., spatially varying pH gradient). In some embodiments, the one or more elements comprises a metal element. Metal, in this context, refers to metallic metal or a metal ion. In some embodiments, the precipitate comprises a metal cation from the metal salt that was dissolved and/or reacted within the spatially varying chemical composition gradient (e.g., spatially varying pH gradient), and that metal cation is ionically bonded to an anion within the precipitate. For example, in certain embodiments, the solid calcium hydroxide comprises calcium from the calcium carbonate dissolved and/or reacted within the spatially varying chemical composition gradient (e.g., spatially varying pH gradient). As a non-limiting example, in FIG. 2A, as discussed above, chemical compound (e.g., metal salt) 111 (e.g., calcium carbonate) is added to first region (e.g., acidic region) 107, and chemical compound (e.g., metal salt) 111 (e.g., calcium carbonate) reacts with the protons in first region (e.g., acidic region) 107, such that chemical compound (e.g., metal salt) 111 (e.g., calcium carbonate) is dissolved forming one or more elements, such as metal (e.g., forming $Ca^{2+}$ and $HCO_3^-$, or $Ca^{2+}$ and $H_2CO_3$). In some embodiments, the one or more elements (e.g., metal, such as $Ca^{2+}$) moves to second region (e.g., alkaline region) 106, where it reacts with the hydroxide ions in second region (e.g., alkaline region) 106, forming precipitate 112 (e.g., a metal precipitate, such as $Ca(OH)_2$). Thus, precipitate 112 (e.g., a metal precipitate, such as $Ca(OH)_2$) comprises one or more elements (e.g., metal) from chemical compound (e.g., metal salt) 111 (e.g., calcium carbonate) dissolved and reacted within the spatially varying chemical composition gradient (e.g., spatially varying pH gradient).

According to certain embodiments, the method is a method of making cement.

According to certain embodiments, the method comprises heating the $Ca(OH)_2$ (e.g., solid calcium hydroxide) and/or lime (e.g., solid calcium oxide) and/or a reactant product thereof within a kiln to make cement. As a non-limiting example, in FIG. 1A, after the calcium hydroxide is collected from reactor 101, the calcium hydroxide can be heated within kiln 102 to make cement. In some embodiments, this comprises taking the calcium hydroxide from the reactor and placing it directly in the kiln. Alternatively, in certain embodiments, there are steps in between collecting the calcium hydroxide and heating in the kiln. For example, in FIG. 1B, after calcium hydroxide is collected from reactor 101 it goes to heater 103. In some embodiments, heater 103 converts the calcium hydroxide to its calcium oxide, and then the calcium hydroxide and/or the oxide calcium oxide are heated in kiln 102. In some embodiments, heater 103 converts 100% (by weight) of the calcium hydroxide to its calcium oxide and only the calcium oxide is heated in kiln 102. In other embodiments, heater 103 converts 10% or more, 20% or more, 30% or more, 40% or more, 50% or more, up to 90%, up to 95%, or up to 99% (by weight) of the calcium hydroxide to calcium oxide. Combinations of these ranges are also possible (e.g., 10% to 100% (by weight) inclusive). In some embodiments, both the calcium hydroxide and calcium oxide are heated in kiln 102. Examples of heaters include devices that heat or dehydrate the substance placed inside it.

In some embodiments, heating the $Ca(OH)_2$ (e.g., solid calcium hydroxide) and/or lime (e.g., solid calcium oxide) and/or a reactant product thereof within a kiln to make cement comprises heating the s $Ca(OH)_2$ (e.g., solid calcium hydroxide) and/or lime (e.g., solid calcium oxide) and/or a reactant product thereof in the kiln with other compounds. For example, the $Ca(OH)_2$ (e.g., solid calcium hydroxide) and/or lime (e.g., solid calcium oxide) and/or a reactant product thereof could be heated in the kiln with $SiO_2$ or other minerals.

In certain embodiments, there are subsequent steps after heating the $Ca(OH)_2$ (e.g., solid calcium hydroxide) and/or lime (e.g., solid calcium oxide) and/or a reactant product thereof within a kiln before the cement is made. For example, in certain embodiments, there is a cooling step after the kiln.

According to some embodiments, the method is part of a batch process. In certain embodiments, the precipitate (e.g., a metal hydroxide, such as $Ca(OH)_2$) is periodically collected from the reactor. According to certain embodiments, the method is performed continuously. In some embodiments, the chemical compound (e.g., a metal salt, such as a metal carbonate, such as $CaCO_3$) is added continuously or periodically at the anode and/or first region (e.g., acidic region). In certain embodiments, the precipitate (e.g., a metal hydroxide, such as $Ca(OH)_2$) is collected continuously or periodically. Non-limiting examples of collecting the precipitate (e.g., a metal hydroxide, such as $Ca(OH)_2$) include collecting it with a flow stream and/or allowing it to deposit on a surface from which it is continuously or periodically collected.

In accordance with some embodiments, the method produces a byproduct different from the precipitate. For example, in some embodiments, the method produces a byproduct different from the solid calcium hydroxide and/or the solid calcium oxide. In some embodiments, the byproduct comprises $CO_2$, $O_2$, and/or $H_2$. For example, in FIG. 2A, byproduct 108 is generated at cathode 104 and byproduct 109 is generated at anode 105. In some embodiments, byproduct 108 comprises $H_2$ (g). In some embodiments, byproduct 109 comprises $O_2$ (g) and/or $CO_2$ (g). For example, in some embodiments, hydrolysis is performed in reactor 101, and the reaction taking place in the cathode converts 2 $H_2O$ molecules and 2 electrons to $H_2$ (g) (byproduct 108) and 2 $OH^-$, while the reaction taking place in the anode converts 2 $H_2O$ molecules to $O_2$ (g) (byproduct 109), 4 electrons, and 4 protons. In certain embodiments, chemical compound (e.g., metal salt) 111 (e.g., a metal carbonate, such calcium carbonate) is added to first region (e.g., acidic region) 107, and chemical compound (e.g., metal salt) 111 (e.g., a metal carbonate, such as calcium carbonate) reacts with the protons in first region (e.g., acidic region) 107, such that chemical compound (e.g., metal salt) 111 (e.g., a metal carbonate, such as calcium carbonate) is dissolved forming one or more elements (e.g., metal). In some embodiments, the net reaction between $CaCO_3$ and two protons results in the formation of $H_2O$, $Ca^{2+}$, and $CO_2$ (g) (byproduct 109).

According to certain embodiments, the method further comprises collecting the byproduct. For example, in some embodiments, the byproduct comprises $CO_2$, $O_2$, and $H_2$. In certain embodiments, collecting the byproduct comprises collecting each of the $CO_2$, $O_2$, and $H_2$; collecting only the $CO_2$; collecting only the $O_2$; collecting only the $H_2$; collecting $CO_2$ and $O_2$; collecting $CO_2$ and $H_2$, or collecting $O_2$ and $H_2$. For example, in certain embodiments, the byproduct comprises $CO_2$ and the collecting the byproduct comprises sequestering the $CO_2$.

In accordance with some embodiments, the byproduct is used as fuel. In some embodiments, the $H_2$ can be used as a fuel. Non-limiting examples include burning the $H_2$ directly or using it with a fuel, such as natural gas. In some embodiments, the $O_2$ and $CO_2$ are used to support combustion of a fuel, such as a fossil fuel. In some embodiments, the byproducts are used as fuel for a kiln. For example, in some embodiments, the $O_2$ and $CO_2$ are fed into the kiln to support combustion of a fuel, such as a fossil fuel. In certain embodiments, the $H_2$, $O_2$, and $CO_2$ are reacted in a fuel cell, such as a solid oxide fuel cell. In certain embodiments, $H_2$ and $O_2$ are reacted in a fuel cell to produce electric power.

According to some embodiments, the reactors, systems, and methods described herein display one or more beneficial properties and have one or more applications. For example, some embodiments of the reactors, systems, and methods described herein may be used for producing cement (e.g., Portland cement). For example, in some embodiments, the reactor is used in place of calcination in a traditional cement production process.

Moreover, certain embodiments of the reactors, systems, and methods described herein may be used for producing cement with reduced production of atmospheric pollutants or greenhouse gases, such as $CO_2$, than traditional cement production processes. Traditional cement production processes include calcination of $CaCO_3$ by thermal means, which accounts for about 60% of the $CO_2$ emissions while about 40% of the $CO_2$ emissions results from the burning of fossil fuels to carry out the calcination and sintering processes.

In some embodiments, $Ca(OH)_2$ produced by the methods, reactors, and/or systems described herein can be used to produce CaO for cement making, instead of traditional calcination of $CaCO_3$ to CaO. The thermal dehydration of $Ca(OH)_2$ to CaO has a 25% lower minimum energy requirement (71.2 kJ/mol) than thermal calcination of $CaCO_3$ to CaO (97.0 kJ/mol).

In accordance with certain embodiments, the reactor and/or system is powered, in part or in full, by renewable electricity (e.g., solar energy, wind energy, and/or hydroelectric power.).

In accordance with certain embodiments, byproducts such as $CO_2$, $H_2$, and/or $O_2$ are generated, which have many possible uses, including for oxy-combustion, improved kiln efficiency, reduced $NO_x$ emissions, and/or as flue gas suitable for carbon capture and sequestration (CCS). Thus, in some embodiments, the byproducts could be sold or used.

Figure 5:
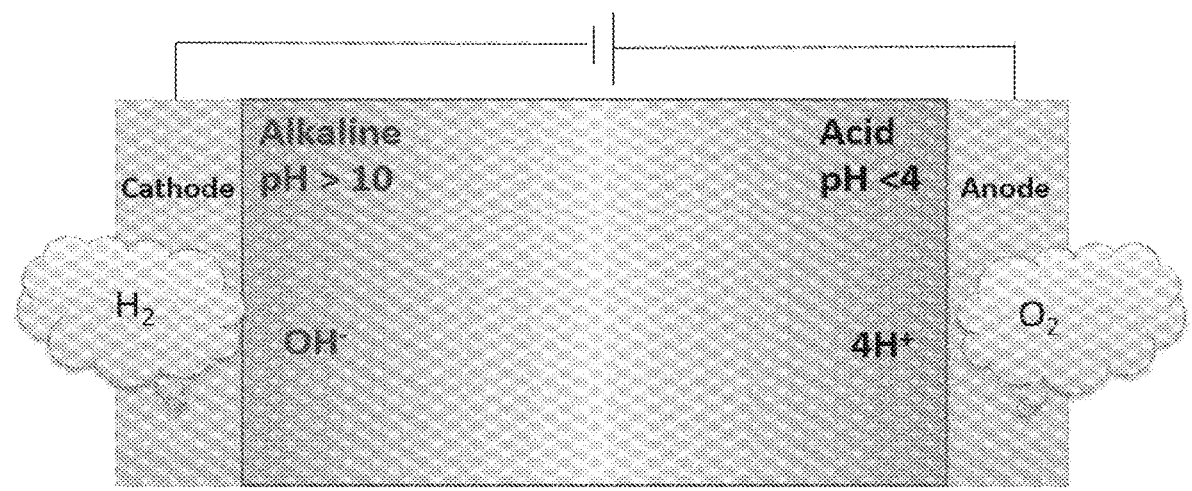
FIG. 5 is, in accordance with certain embodiments, a cross-sectional schematic illustration of a reactor.

In one embodiment, the electrolytically-driven chemical reactor comprises an electrolysis cell for the electrolysis of water. As shown in FIG. 5, such a cell, when performing electrolysis, produces a high pH at the cathode, where a hydrogen evolution reaction (HER) is taking place and producing $OH^-$, and produces a low pH at the anode, where an oxygen evolution reaction (OER) is taking place and producing $H^+$. A gradient in pH is therefore produced, in accordance with certain embodiments, between the cathode and anode. In other such electrolytic cells, a gradient in other species may be produced depending on the nature of the electrolysis reaction.

Figure 6:
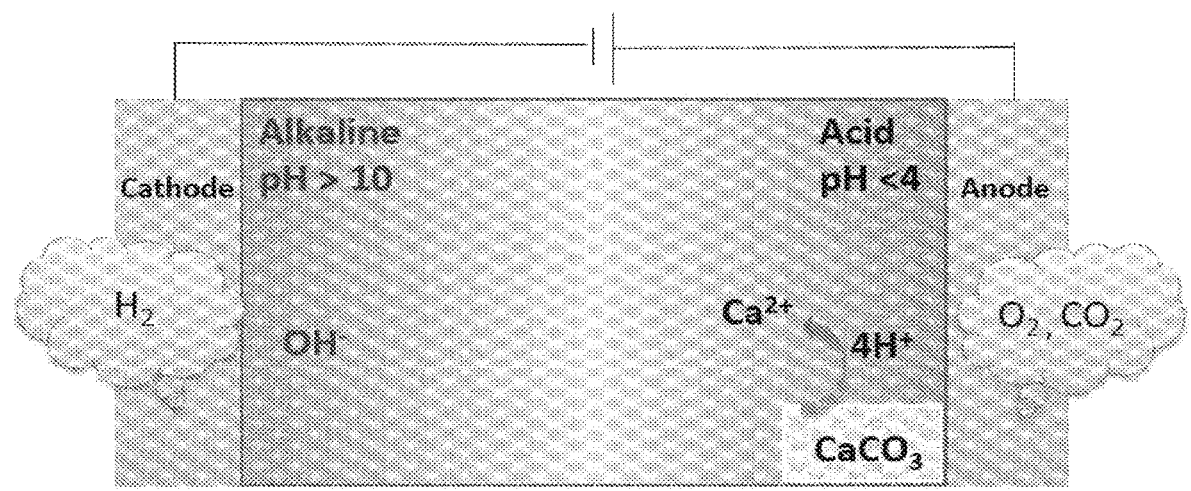
FIG. 6 is, in accordance with certain embodiments, a cross-sectional schematic illustration of a reactor.
Figure 7:
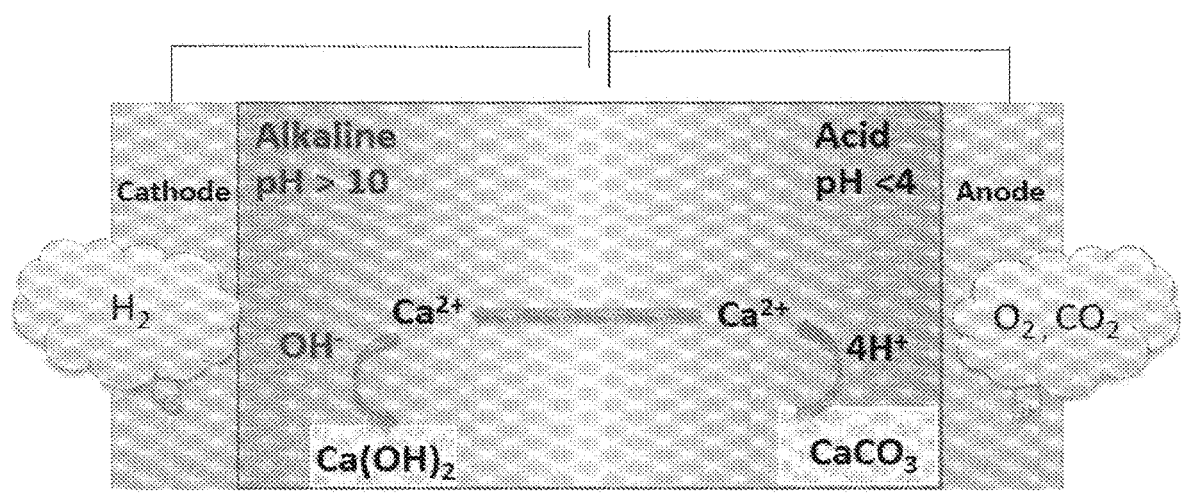
FIG. 7 is, in accordance with certain embodiments, a cross-sectional schematic illustration of a reactor.
Figure 8:
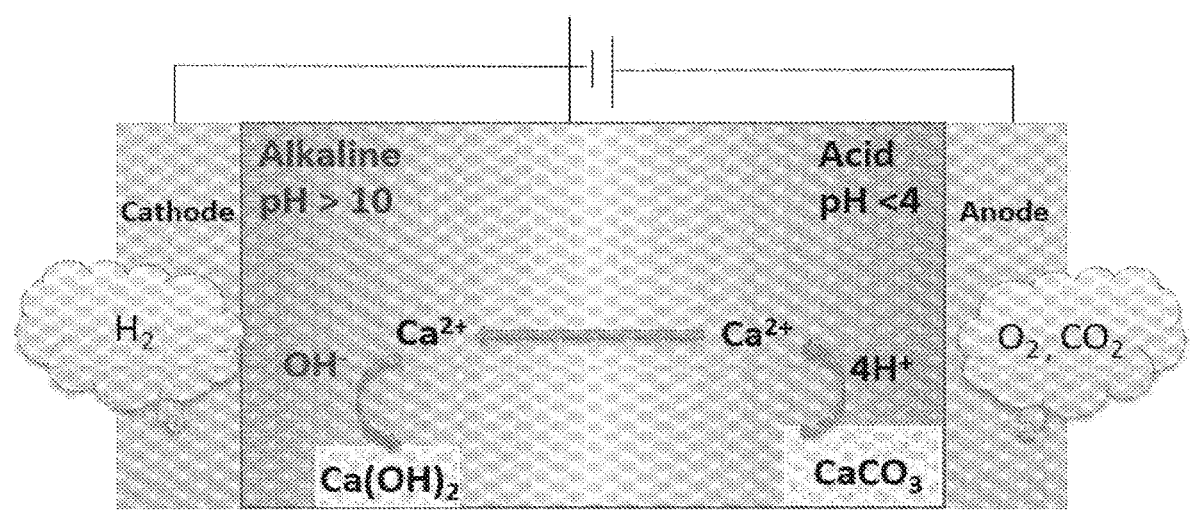
FIG. 8 is, in accordance with certain embodiments, a cross-sectional schematic illustration of a reactor.

In one embodiment, said pH gradient is used to dissolve a metal carbonate at low pH in the vicinity of the anode, and to precipitate a metal hydroxide as the metal ion diffuses towards the higher pH environment at the cathode. In some such embodiments, as the metal carbonate is dissolved near the anode, $CO_2$ gas is produced, as shown in FIG. 6, and metal cations of the carbonate are produced in solution. These then diffuse, in accordance with some such embodiments, or are optionally transported by convection or flow, toward the high pH environment produced by HER at the cathode. As shown in FIG. 7, and in accordance with some embodiments, reaction of the metal ion with $OH^-$ ions produced at the cathode results in the precipitation of the metal hydroxide. The electrochemical and chemical reactions occurring at each electrode, in accordance with some embodiments, and the overall reaction, are shown in FIG. 8. Almost any metal carbonate or mixtures of metal carbonates may be converted to its hydroxide or hydroxides through such a process, with non-limiting examples of metal carbonates including $CaCO_3$, $MgCO_3$, and $NiCO_3$. In some such embodiments, concurrently with the production of the metal hydroxide from the starting metal carbonate, hydrogen gas is liberated at the cathode and a mixture of oxygen gas and carbon dioxide gas is liberated at the anode.

Figure 9:
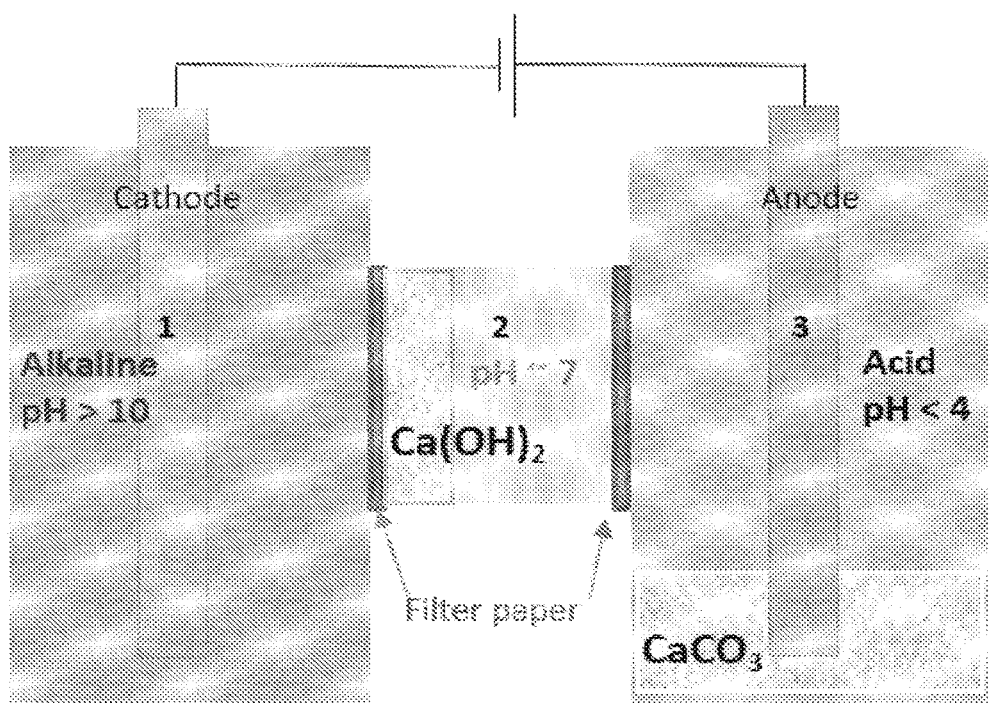
FIG. 9 is, in accordance with certain embodiments, a cross-sectional schematic illustration of a reactor in an H-cell, comprising a separate chamber between two membranes selectively permeable to ions.

In one or more embodiments, the reactor is operated in a batch manner whereby the product metal hydroxide is periodically collected. FIG. 9 illustrates one such collection method whereby a separate chamber is provided between the two electrodes for the purpose of collecting the precipitated metal hydroxide. In one or more embodiments, the reactor is operated in a continuous manner such that additional metal carbonate is added continuously or periodically at the anode, and the precipitated metal hydroxide is continuously or periodically removed from the reaction zone. For example, precipitated metal hydroxide may be removed from the reaction zone using a flow stream and collected, or the precipitate may be allowed to deposit on a surface such as in FIG. 9, from which it is continuously or periodically removed while the reactor continues to operate.

Figure 3A:
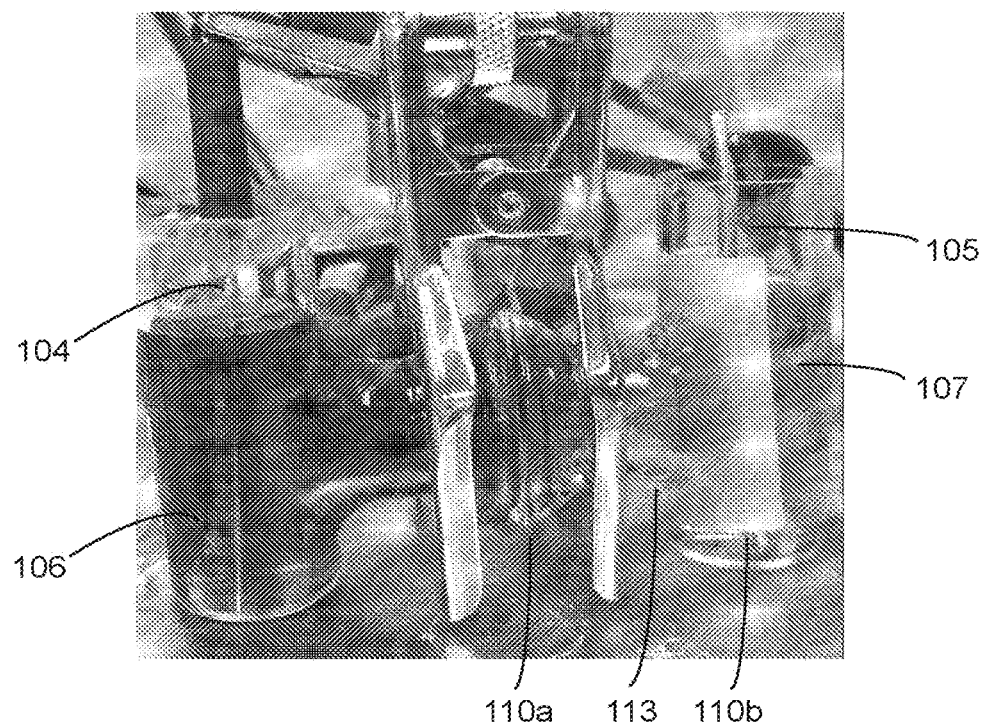
FIG. 3A is, in accordance with certain embodiments, a photograph of a reactor after electrolysis of water but before a chemical compound has been added.
Figure 3B:
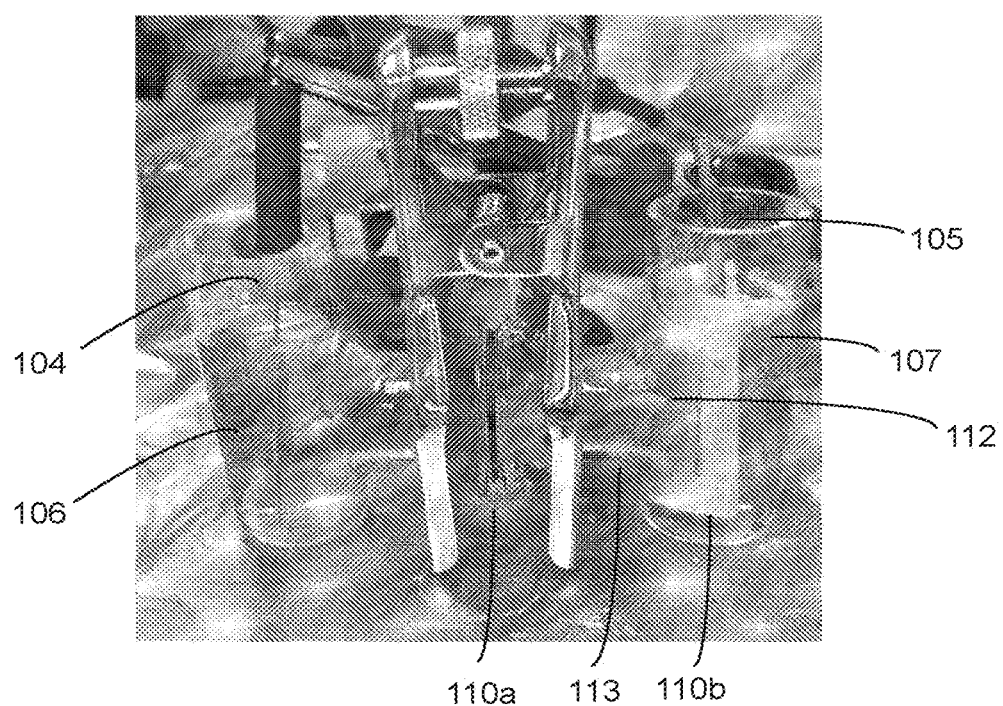
FIG. 3B is, in accordance with certain embodiments, a photograph of the reactor from FIG. 3A ten hours after a chemical compound (nickel carbonate, in this instance) has been added.
Figure 10:
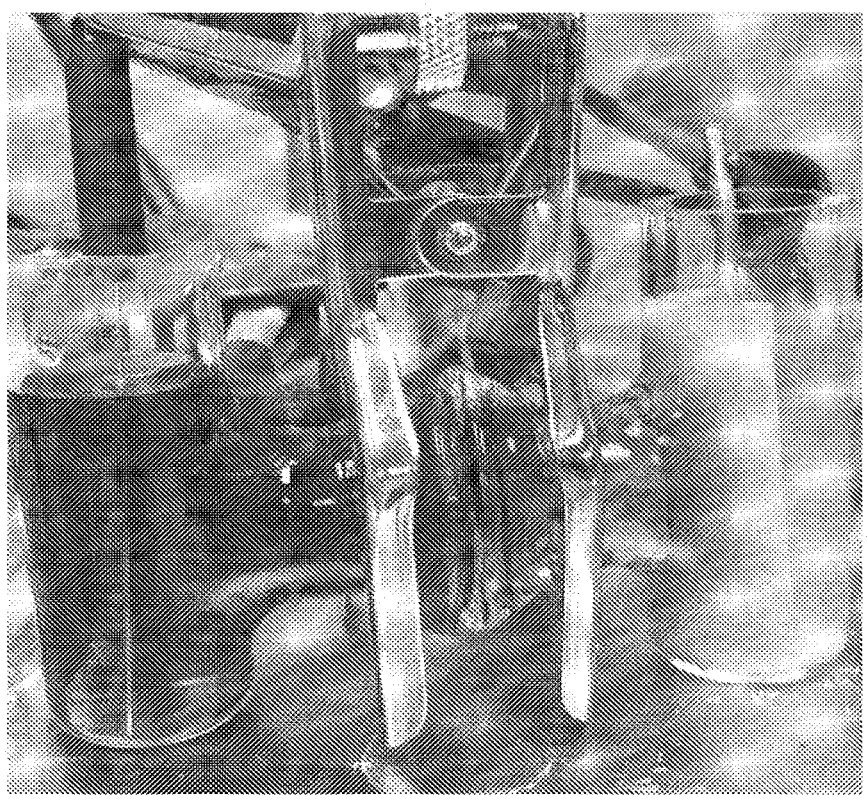
FIG. 10 is, in accordance with certain embodiments, a photograph of the reactor of FIG. 3A after a chemical compound (nickel carbonate, in this instance) has been added.

FIGS. 3A, 10, and 3B show an example in which an H-cell reactor is used in the above described manner. In this exemplary embodiment, $NiCO_3$ is used as the input carbonate, and $Ni(OH)_2$ is produced as the product hydroxide. In this exemplary embodiment, a universal pH indicator is added to illustrate the pH gradient produced by the electrolysis cell, prior to addition of the nickel carbonate (FIG. 3A). After addition of the nickel carbonate to the anode chamber, in such an exemplary embodiment, nickel hydroxide is precipitated in the middle of the H-cell where the dissolved nickel ions have reacted with $OH^-$ species (FIG. 3B).

Figure 4A:
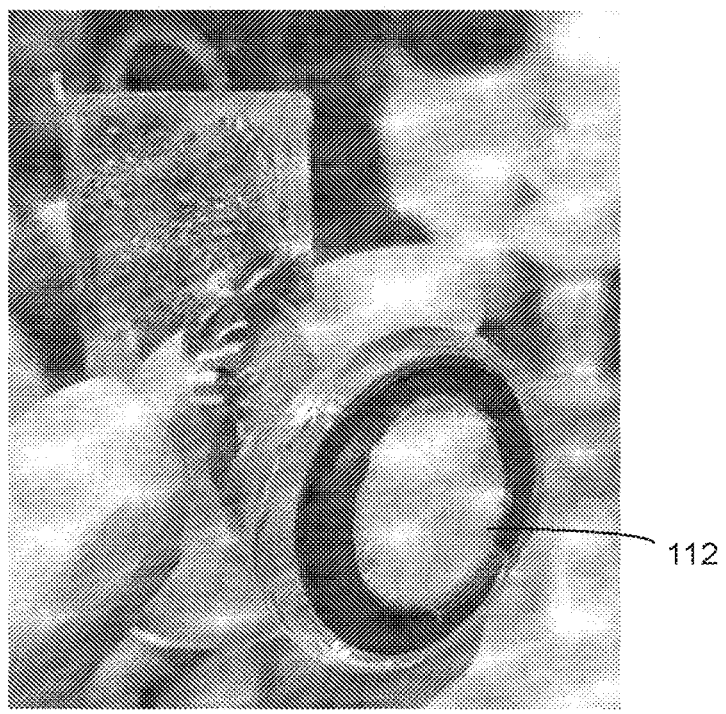
FIG. 4A is, in accordance with certain embodiments, a photograph of the precipitate (calcium hydroxide, in this instance) formed in an electrochemical cell from the chemical compound (calcium carbonate, in this instance).
Figure 4B:
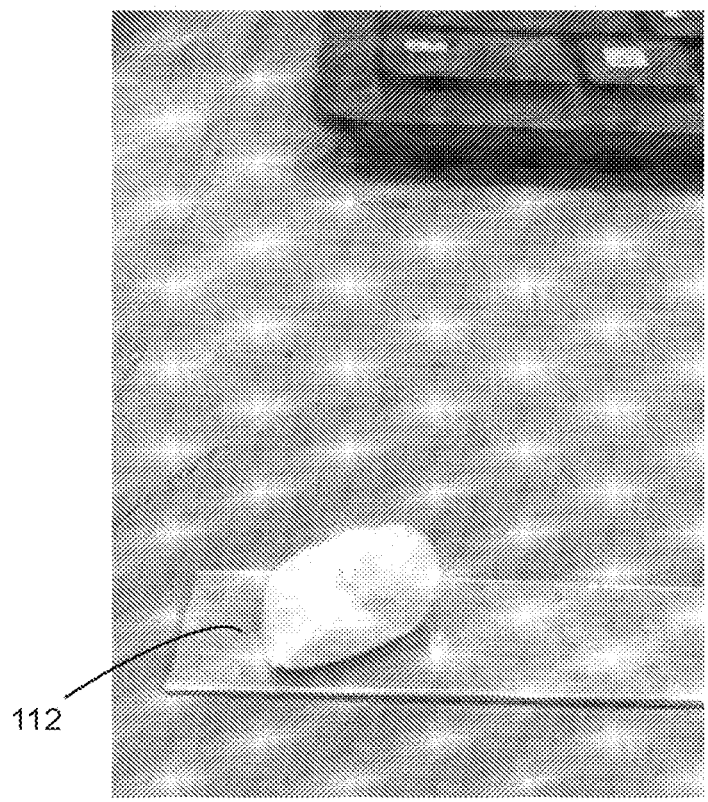
FIG. 4B is, in accordance with certain embodiments, a photograph of the precipitate (calcium hydroxide, in this instance) from FIG. 4A after it has been collected and mixed in a 3:1 mole ratio with $SiO_2$ and water to form a non-hydraulic cement.
Figure 4C:
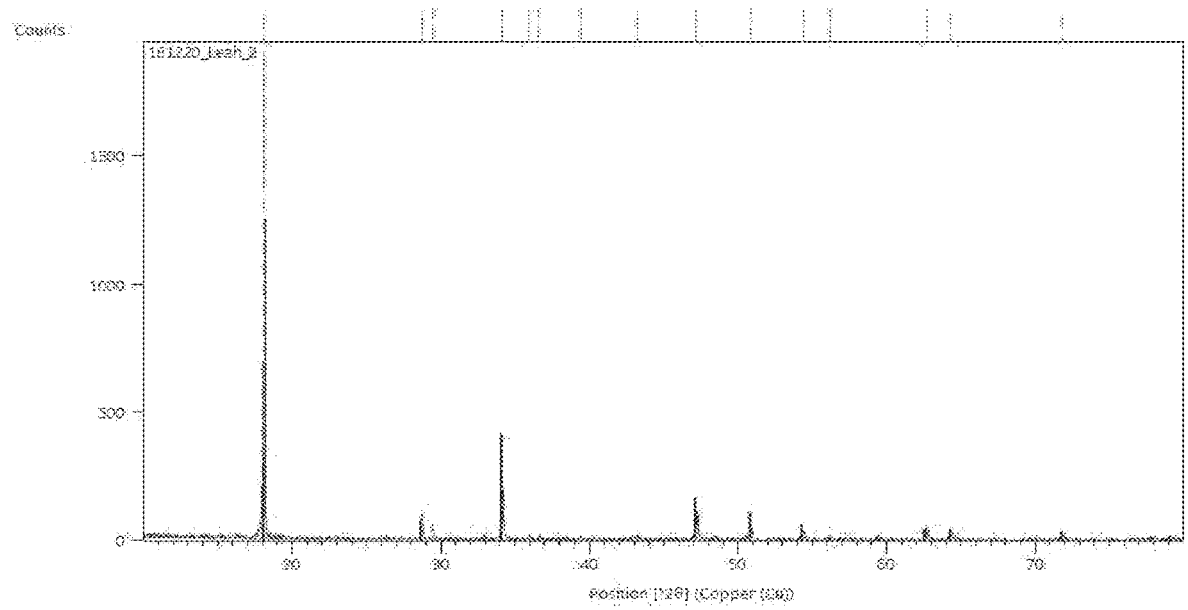
FIG. 4C is, in accordance with certain embodiments, an x-ray diffraction (XRD) pattern of the hydroxide precipitate (calcium hydroxide, in this instance) of FIG. 4A.

FIGS. 4A-4C show an example whereby the reactor of the invention is used to produce $Ca(OH)_2$ from $CaCO_3$. Here also, in this exemplary embodiment, the precipitate has formed in the middle of the H-cell. The precipitate has been confirmed to be, in exemplary embodiments, $Ca(OH)_2$ by X-ray diffraction.

In some embodiments, the hydrogen and/or oxygen gas produced by the electrochemical reactor is beneficially used or sold. In some embodiments, the hydrogen and oxygen are reacted in a fuel cell to produce electric power. In some embodiments, the hydrogen is combusted as a fuel or as a component of a fuel for the purpose of heating a reactor or kiln or furnace.

In some embodiments, the electric power to carry out said electrolytically-driven chemical reactor is produced from renewable resources, including but not limited to solar energy, wind energy, or hydroelectric power.

Figure 11:
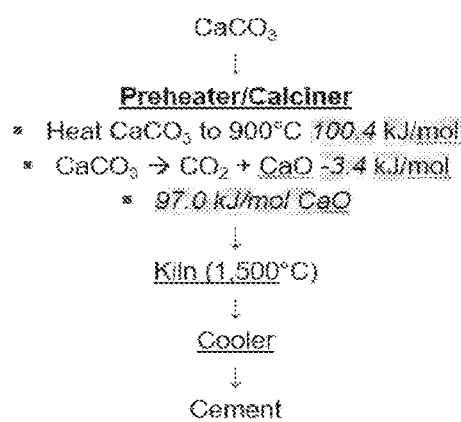
FIG. 11 is, in accordance with certain embodiments, a flow chart comparing a cement production process described herein with a conventional cement production using thermal energy only.
Figure 11:
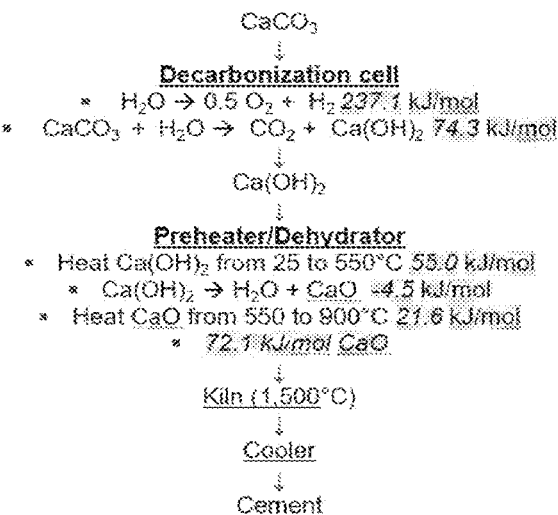

In one embodiment, said electrochemically-driven chemical reactor is used to decarbonize $CaCO_3$ and produce $Ca(OH)_2$ as a precursor for the production of cement, including Portland cement. FIG. 11 gives an example of a cement production process utilizing certain embodiments of the invention, in comparison to conventional cement production using thermal energy only. It is useful to compare both the total energy consumption, and to consider the form of the energy consumed and its carbon intensity. For simplicity, it is assumed that the high temperature heat treatment that reacts CaO with aluminosilicates and other components to form Portland cement is identical for the two processes. The energy consumption to bring CaO produced by thermal calcination of $CaCO_3$, and by electrochemical decarbonization followed by thermal dehydration of $Ca(OH)_2$, to the same starting temperature of 900 C has been considered. The energy per mole input to heat the reactant or product to a given temperature has been calculated from its heat capacity. The energy per mole to carry out the decomposition reactions has been given as the standard free energy of reaction (i.e., gas partial pressures are 1 atm).

Comparing, in this example, the energy per mole for thermal calcination of $CaCO_3$ with that for thermal dehydration of $Ca(OH)_2$, the latter has a 25% lower minimum energy requirement of 72.1 kJ/mole vs 97.0 kJ/mole. In this example, the electrochemical process also includes the decarbonation reaction in which $CaCO_3$ is converted to $Ca(OH)_2$ with a standard free energy of 74.3 kJ/mole; this is an additional energy consumption for the electrochemical process. However, this exemplary process, as well as the electrolysis reaction, can be powered by electricity from low or zero-carbon renewable resources at nearly zero marginal cost of electricity.

The electrolysis reaction necessary to operate the reactor, in this exemplary process, requires 237.1 kJ/mole; however, this energy firstly can be generated by low carbon sources as well, and secondly, yields hydrogen and oxygen that can be used remotely as a value-added product, or can be used to power the cement production process, for example by using a fuel cell to provide electrical power, or through a combustion process to provide reaction heat. The energy produced may be used to operate the electrolyser, or to heat the high temperature kiln.

In some embodiments, the calcium hydroxide, also known as slaked lime, and/or calcium oxide, which is reacted with water to produce slaked lime, is collected from the reactor and used in applications including but not limited to paper making, flue gas treatment carbon capture, plaster mixes and masonry (including Pozzolan cement), soil stabilization, pH adjustment, water treatment, waste treatment, and sugar refining. The following are non-limiting examples of uses of calcium hydroxide (also known as slake lime) and/or calcium oxide (also known as lime).

1. Metallurgical Uses a) Ferrous Metals

In some embodiments, slaked lime and/or lime produced by the reactors, systems, and/or methods disclosed herein is used in the making of iron and/or steel. For example, in the making of iron and/or steel, lime can be used as a flux, to form slag that prevents the iron and/or steel from oxidizing, and to remove impurities such as silica, phosphates, manganese and sulfur. In some cases, slaked lime (dry, or as a slurry) is used in the making of iron and/or steel as a lubricant for drawing wires or rods through dies, as a coating on casting molds to prevent sticking, and/or as a coating on steel products to prevent corrosion. In some instances, lime or slaked lime is also used to neutralize acidic wastes.

b) Non-Ferrous Metals

In some embodiments, slaked lime and/or lime produced by the reactors, systems, and/or methods disclosed herein is used in the making of nonferrous metals including, but not limited to, copper, mercury, silver, gold, zinc, nickel, lead, aluminum, uranium, magnesium and/or calcium. Lime may be used, in some cases, as a fluxing agent, to remove impurities (such as silica, alumina, phosphates, carbonates, sulfur, sulfates) from ores. For example, lime and slaked lime can be used in the flotation or recovery of non-ferrous ores. In certain cases, lime acts as a settling aid, to maintain proper alkalinity, and/or to remove impurities (such as sulfur and/or silicon). In some instances, in the smelting and refining of copper, zinc, lead and/or other non-ferrous ores, slaked lime is used to neutralize sulfurous gases and/or to prevent the formation of sulfuric acid. In certain instances, lime and/or slaked lime is also used as a coating on metals to prevent the reaction with sulfurous species. In certain cases, in the production of aluminum, lime and/or slaked lime is used to remove impurities (such as silica and/or carbonate) from bauxite ore, and/or is used to regulate pH. In some instances, lime is used to maintain alkaline pH for the dissolution of gold, silver, and/or nickel in cyanide extraction. In the production of zinc, lime is used as a reducing agent in certain cases. In some cases, in the production of metallic calcium and/or magnesium, magnesium and/or calcium oxides are reduced at high temperatures to form magnesium and/or calcium metal.

2. Construction a) Masonry (Other Than Portland Cement)

In some embodiments, slaked lime and/or lime produced by the reactors, systems, and/or methods disclosed herein is used for making masonry mortars, plasters, stuccos, whitewashes, grouts, bricks, boards, and/or non-Portland cements. In these applications, in certain embodiments, lime and/or slaked lime may be mixed with other additives and exposed to carbon dioxide to produce calcium carbonate, lime and/or slaked lime may be reacted with other additives (such as aluminosilicates) to form a cementitious material, and/or lime and/or slaked lime may be used as a source of calcium. In the instance of mortars, plasters, stuccos and whitewashes, in some cases, lime and/or slaked lime is mixed with additives and/or aggregates (such as sand) to form a paste/slurry that hardens as water evaporates and as the lime and/or slaked lime reacts with atmospheric carbon dioxide to form calcium carbonate. In the case of hydraulic pozzolan cements, in certain cases, lime and/or slaked lime is reacted with aluminates, silicates, and/or other pozzolanic materials (e.g., pulverized fuel ash, volcanic ash, blast furnace slag, and/or calcined clay), to form a water-based paste/slurry that hardens as insoluble calcium aluminosilicates are formed. In the case of other hydraulic cements, in some instances, lime and/or slaked lime is reacted at high temperature with sources of silica, alumina, and/or other additives such that cementitious compounds are formed, including dicalcium silicate, calcium aluminates, tricalcium silicate, and/or mono calcium silicate. In some cases, sandlime bricks are made by reacting slaked lime with a source of silica (e.g., sand, crushed siliceous stone, and/or flint) and/or other additives at temperatures required to form calcium silicates and/or calcium silicate hydrates. In some cases, lightweight concrete (e.g., aircrete) is made by reacting lime and/or slaked lime with reactive silica, aluminum powder, water, and/or other additives; the reaction between slaked lime and silicates/aluminates causes calcium silicates/aluminates and/or calcium silicate hydrates to form, while the reaction between water, slaked lime and aluminum causes hydrogen bubbles to form within the hardening paste. Whitewash is a white coating made from a suspension of slaked lime, which hardens and sets as slaked lime reacts with carbon dioxide from the atmosphere. Calcium silicate boards, concrete, and other cast calcium silicate products are formed, in some cases, when calcium silicate-forming materials (e.g., lime, slaked lime, silica, and/or cement) and additives (e.g., cellulose fiber and/or fire retardants) and water are mixed together, cast or pressed into shape. In some cases, high temperatures are used to react the lime, slaked lime, and/or silica, and/or to hydrate the cement.

b) Soil Stabilization

In some embodiments, slaked lime and/or lime produced by the reactors, systems, and/or methods disclosed herein is used to stabilize, harden, and/or dry soils. For example, lime and/or slaked lime may be applied to loose or fine-grained soils before the construction of roads, runways, and/or railway tracks, and/or to stabilize embankments and/or slopes. In some cases, when lime is applied to clay soils a pozzolanic reaction may occur between the clay and the lime to produce calcium silicate hydrates, and/or calcium aluminate hydrates, which strengthen and/or harden the soil. In certain instances, lime and/or slaked lime applied to soils may also react with carbon dioxide to produce solid calcium carbonate, which may also strengthen and/or harden soil. In some cases, lime may also be used to dry wet soils at construction sites, as lime reacts readily with water to form slaked lime.

c) Asphalt Additive and Asphalt Recycling

In some embodiments, slaked lime and/or lime produced by the reactors, systems, and/or methods disclosed herein is used to make and/or recycle asphalt. For example, in some cases, slaked lime is added to hot mix asphalt as a mineral filler and/or antioxidant, and/or to increase resistance to water stripping. In certain instances, slaked lime can react with aluminosilicates and/or carbon dioxide to create a solid product that improves the bond between the binder and aggregate in asphalt. As a mineral filler, in some instances, lime may increase the viscosity of the binder, the stiffness of the asphalt, the tensile strength of the asphalt, and/or the compressive strength of the asphalt. As a hydraulic road binder, in certain cases, lime may reduce moisture sensitivity and/or stripping, stiffen the binder so that it resists rutting, and/or improve toughness and/or resistance to fracture at low temperature. In some instances, lime and/or slaked lime added to recycled asphalt results in greater early strength and/or resistance to moisture damage.

3. Waste Treatment, Water Treatment, Gas Treatment
a) Gas Treatment

In some embodiments, slaked lime and/or lime produced by the reactors, systems, and/or methods disclosed herein is used for the removal of acid gases (such as hydrogen chloride, sulfur dioxide, sulfur trioxide, and/or hydrogen fluoride) and/or carbon dioxide from a gas mixture (e.g. flue gas, atmospheric air, air in storage rooms, and/or air in closed breathing environments such as submarines). For example, in some cases, lime and/or slaked lime is exposed to flue gas, causing the reaction of lime and/or slaked lime with components of the flue gas (such as acid gases, including hydrogen chloride, sulfur dioxide and/or carbon dioxide), resulting in the formation of non-gaseous calcium compounds (such as calcium chloride, calcium sulfite, and/or calcium carbonate). In certain embodiments, exposure of gas to slaked lime is done by spraying slaked lime solutions and/or slurries onto gas, and/or by reacting gas streams with dry lime and/or slaked lime. In certain embodiments, the gas stream containing acid gas or gases is first reacted with a solution of alkali metal hydroxides (e.g. sodium hydroxide and/or potassium hydroxide), to form a soluble intermediate species (such as potassium carbonate), which is subsequently reacted with lime and/or slaked lime to produce a solid calcium species (such as calcium carbonate) and regenerate the original alkali metal hydroxide solution. In some embodiments, the calcium carbonate formed from the reaction of lime and/or slaked lime with carbon dioxide or alkali carbonate is returned to the reactors, systems, and/or methods disclosed herein, so that the lime and/or slaked lime can be regenerated and/or so that the carbon dioxide can be sequestered.

b) Non-Gaseous Waste Treatment

In some embodiments, slaked lime and/or lime produced by the reactors, systems, and/or methods disclosed herein is used to treat wastes such as biological wastes, industrial wastes, wastewaters, and/or sludges. In some cases, lime and/or slaked lime may be applied to the waste to create an alkaline environment, which serves to neutralize acid waste, inhibit pathogens, deter flies or rodents, control odors, prevent leaching, and/or stabilize and/or precipitate pollutants (such as heavy metals, chrome, copper, and/or suspended/dissolved solids) and/or dissolved ions that cause scaling (calcium and/or magnesium ions). In certain instances, lime may be used to de-water oily wastes. In some cases, slaked lime may be used to precipitate certain species, such as phosphates, nitrates, and/or sulfurous compounds, and/or prevent leaching. In certain instances, lime and/or slaked lime may be used to hasten the decomposition of organic matter, by maintaining alkaline conditions that favor hydrolysis.

c) Water Treatment

In some embodiments, slaked lime and/or lime produced by the reactors, systems, and/or methods disclosed herein is used to treat water. For instance, lime and/or slaked lime may be used, in some cases, to create an alkaline environment, which serves to disinfect, remove suspended/colloidal material, reduce hardness, adjust pH, precipitate ions contributing to water hardness, precipitate dissolved metals (such as iron, aluminum, manganese, barium, cadmium, chromium, lead, copper, and/or nickel), and/or precipitate other ions (such as fluoride, sulfate, sulfite, phosphate, and/or nitrate).

4. Agriculture and Food
Agriculture

In some embodiments, slaked lime and/or lime produced by the reactors, systems, and/or methods disclosed herein is used for agriculture. For example, lime and/or slaked lime may be used alone, or as an additive in fertilizer, to adjust the pH of the soil and/or of the fertilizer mixture to give optimum growing conditions and/or improve crop yield, in some cases.

Sugar

In some embodiments, slaked lime and/or lime produced by the reactors, systems, and/or methods disclosed herein is used to refine sugar. For example, in some cases, lime and/or slaked lime is used to raise the pH of raw sugar juice, destroy enzymes in the raw sugar juice, and/or react with inorganic and/or organic species to form precipitates. Excess calcium may be precipitated with carbon dioxide, in certain instances. In certain cases, the precipitated calcium carbonate that results may be returned to the reactors, systems, and/or methods disclosed herein, to regenerate slaked lime.

Leather

In some embodiments, slaked lime and/or lime produced by the reactors, systems, and/or methods disclosed herein is used to make leather and/or parchment. In the leather making process, lime is used, in some cases, to remove hair and/or keratin from hides, split fibers, and/or remove fat.

Glue, Gelatin

In some embodiments, slaked lime and/or lime produced by the reactors, systems, and/or methods disclosed herein is used to make glue and/or gelatin. In the process of making glue and/or gelatin, in some cases, animal bones and/or hides are soaked in slaked lime, causing collagen and other proteins to hydrolyze, forming a mixture of protein fragments of different molecular weights.

Dairy Products

In some embodiments, slaked lime and/or lime produced by the reactors, systems, and/or methods disclosed herein is used to make dairy products. In some cases, slaked lime is used to neutralize acidity of cream before pasteurization. In certain cases, slaked lime is used to precipitate calcium caseinate from acidic solutions of casein. In some instances, slaked lime is added to fermented skim milk to produce calcium lactate.

Fruit Industry

In some embodiments, slaked lime and/or lime produced by the reactors, systems, and/or methods disclosed herein is used in the fruit industry. For example, slaked lime and/or lime is used, in some cases, to remove carbon dioxide from air in fruit storage. In some instances, slaked lime is used to neutralize waste citric acid and to raise the pH of fruit juices.

Insecticides/Fungicides

In some embodiments, slaked lime and/or lime produced by the reactors, systems, and/or methods disclosed herein is used as an additive in fungicides and/or insecticides. For example, slaked lime may be mixed with coper sulfate to form tetracupric sulfate, a pesticide. In some cases, lime may also be used as a carrier for other kinds of pesticides, as it forms a film on foliage as it carbonates, retaining the insecticide on the leaves. In some instances, slaked lime is used to control infestations of starfish on oyster beds.

Food Additive

In some embodiments, slaked lime and/or lime produced by the reactors, systems, and/or methods disclosed herein is used as a food additive. In some cases, lime and/or slaked lime may be used as an acidity regulator, as a pickling agent, to remove cellulose (e.g. from kernels such as maize), and/or to precipitate certain anions (such as carbonates) from brines.

5. Chemicals

In some embodiments, slaked lime and/or lime produced by the reactors, systems, and/or methods disclosed herein is used to make chemicals. For example, lime and/or slaked lime may be used as a source of calcium and/or magnesium, an alkali, a desiccant, causticizing agent, saponifying agent, bonding agent, flocculant and/or precipitant, fluxing agent, glass-forming product, degrader of organic matter, lubricant, filler, and/or hydrolyzing agent, among other things.

a) Inorganic Calcium Compounds

Precipitated Calcium Carbonate

In some embodiments, slaked lime and/or lime produced by the reactors, systems, and/or methods disclosed herein is used to make precipitated calcium carbonate. In some instances, a solution and/or slurry of slaked lime, and/or a solution of calcium ions, is reacted with carbon dioxide, and/or an alkali carbonate, so that a precipitate of calcium carbonate and/or magnesium carbonate forms. In certain instances, the precipitated alkali metal carbonate may be used as a filler, to reduce shrinkage, improve adhesion, increase density, modify rheology and/or to whiten/brighten plastics (such as PVC and latex), rubber, paper, paints, inks, cosmetics, and/or other coatings. Precipitated carbonates, in some cases, may be used as flame retarders or dusting powder. In certain cases, precipitated calcium carbonate may be used as an alkalizer, for agriculture, as an antiseptic agent, flour additive, brewing additive, digestive aid, and/or additive for bituminous products), an abrasive (in cleaners, detergents, polishes and/or toothpastes), a dispersant in pesticides, and/or a desiccant.

Calcium Hypochlorite

In some embodiments, slaked lime and/or lime produced by the reactors, systems, and/or methods disclosed herein is used to make calcium hypochlorite, a bleach, by reacting chlorine with lime and/or slaked lime.

Calcium Carbide

In some embodiments, slaked lime and/or lime produced by the reactors, systems, and/or methods disclosed herein is used to make calcium carbide, a precursor to acetylene, by reacting lime with carbonaceous matter (e.g. coke) at high temperature.

Calcium Phosphates

In some embodiments, slaked lime and/or lime produced by the reactors, systems, and/or methods disclosed herein is used to make calcium phosphates (monocalcium phosphate, dicalcium phosphate, and/or tricalcium phosphate) by reacting phosphoric acid with slaked lime, and/or aqueous calcium ions, in the appropriate ratios. In some cases, monocalcium phosphate may be used as an additive in self-rising flour, mineral enrichment foods, as a stabilizer for milk products and/or as a feedstuff additive. In some instances, dicalcium phosphate dihydrate is used in toothpastes, as a mild abrasive, for mineral enrichment of foodstuffs, as a pelletizing aid and/or as a thickening agent. In certain instances, tricalcium phosphate is used in toothpastes, and/or as an anti-caking agent in foodstuffs and/or fertilizers.

Calcium Bromide

In some embodiments, slaked lime and/or lime produced by the reactors, systems, and/or methods disclosed herein is used to make calcium bromide. This is done, in some cases, by reacting lime and/or slaked lime with hydrobromic acid and/or bromine and a reducing agent (e.g. formic acid and/or formaldehyde).

Calcium Hexacyanoferrate

In some embodiments, slaked lime and/or lime produced by the reactors, systems, and/or methods disclosed herein is used to make calcium hexacyanoferrate, by reacting lime and/or slaked lime with hydrogen cyanide in an aqueous solution of ferrous chloride. Calcium hexacyanoferrate can then be converted to the alkali metal salt, or hexacyanoferrates. These are used as pigments and anti-caking agents.

Calcium Silicon

In some embodiments, slaked lime and/or lime produced by the reactors, systems, and/or methods disclosed herein is used to make calcium silicon, by reacting lime, quartz and/or carbonaceous material at high temperatures. In some cases, calcium silicon is used as a de-oxidizer, as a de-sulfurizer, and/or to modify non-metallic inclusions in ferrous metals.

Calcium Dichromate

In some embodiments, slaked lime and/or lime produced by the reactors, systems, and/or methods disclosed herein is used to make calcium dichromate, by roasting chromate ores with lime.

Calcium Tungstate

In some embodiments, slaked lime and/or lime produced by the reactors, systems, and/or methods disclosed herein is used to make calcium tungstate, by reacting lime and/or slaked lime with sodium tungstate, to be used in the production of ferrotungsten and/or phosphors for items such as lasers, fluorescent lamps and/or oscilloscopes.

b) Organic Calcium Compounds

Calcium Citrate

In some embodiments, slaked lime and/or lime produced by the reactors, systems, and/or methods disclosed herein is used to make calcium citrate, by reacting lime and/or slaked lime with citric acid. In some cases, the calcium citrate may be reacted with sulfuric acid to regenerate pure citric acid.

Calcium Soaps

In some embodiments, slaked lime and/or lime produced by the reactors, systems, and/or methods disclosed herein is used to make calcium soaps, by reacting slaked lime with aliphatic acids, wax acids, unsaturated carboxylic acids (e.g. oleic acid, linoleic acid, ethylhexanoate acids), napthenic acids, and/or resin acids. In some cases, calcium soaps are used as lubricants, stabilizers, mold-release agents, waterproofing agents, coatings, and/or additives in printing inks.

Calcium Lactate

In some embodiments, slaked lime and/or lime produced by the reactors, systems, and/or methods disclosed herein is used to make calcium lactate, by reacting slaked lime with lactic acid. In certain instances, the lactic acid may be reacted in a second step with sulfuric acid to produce pure lactic acid. In some instances, these chemicals act as coagulants and foaming agents. In some cases, calcium lactate is used as a source of calcium in pharmaceutical agents and/or foodstuffs, and/or as a buffer.

Calcium Tartarate

In some embodiments, slaked lime and/or lime produced by the reactors, systems, and/or methods disclosed herein is used to make calcium tartrate, by reacting slaked lime with alkali bitartarates. In some cases, the calcium bitartarate may be reacted in a second step with sulfuric acid to produce pure tartaric acid. In certain instances, tartaric acid is used in foodstuffs, pharmaceutical preparations, and/or as an additive in plaster and/or metal polish.

c) Inorganic Chemicals

Aluminum Oxide

In some embodiments, slaked lime and/or lime produced by the reactors, systems, and/or methods disclosed herein is used to make aluminum oxide. Lime is used to precipitate impurities (e.g., silicates, carbonates, and/or phosphates) from processed bauxite ore in the preparation of aluminum oxide.

Alkali Carbonates and Bicarbonates

In some embodiments, slaked lime and/or lime produced by the reactors, systems, and/or methods disclosed herein is used to make alkali carbonates and/or bicarbonates from alkali chlorides in the ammonia-soda process. In this process, in some cases, lime and/or slaked lime is reacted with ammonium chloride (and/or ammonium chlorides, such as isopropylammonium chloride) to regenerate ammonia (and/or amines, such as isopropyl amine) after the reaction of ammonia (and/or the amine) with an alkali chloride. In some cases, the resulting calcium chloride can be reacted with the alkaline stream from the reactors, systems, and/or methods disclosed herein, to regenerate the slaked lime.

Strontium Carbonate

In some embodiments, slaked lime and/or lime produced by the reactors, systems, and/or methods disclosed herein is used to make strontium carbonate. In some instances, lime and/or slaked lime is used to re-generate ammonia from ammonium sulfate, which forms after the ammonia has been carbonated and reacted with strontium sulfate.

Calcium Zirconate

In some embodiments, slaked lime and/or lime produced by the reactors, systems, and/or methods disclosed herein is used to make calcium zirconate. In some cases, lime and/or slaked lime reacts with zircon, $ZrSiO_4$, to produce a calcium silicate and zirconate, which is further purified.

Alkali Hydroxides

In some embodiments, slaked lime and/or lime produced by the reactors, systems, and/or methods disclosed herein is used to make alkali hydroxides from alkali carbonates, in a process often called causticizing or re-causticizing. In some cases, slaked lime is reacted with alkali carbonates to produce alkali hydroxides and calcium carbonate. The process of causticizing alkali carbonates is a feature of several other processes, in some instances, including the purification of bauxite ore, the processing of carbolic oil, and the Kraft liquor cycle (in which "green liquor", containing sodium carbonate, reacts with slaked lime to form "white liquor", containing sodium hydroxide).

Magnesium Hydroxide

In some embodiments, slaked lime and/or lime produced by the reactors, systems, and/or methods disclosed herein is used to make magnesium hydroxide. In some cases, the addition of slaked lime to solutions containing magnesium ions (e.g. seawater and/or brine solutions) causes magnesium hydroxide to precipitate from solution.

d) Organic Chemicals

Alkene Oxides.

In some embodiments, slaked lime and/or lime produced by the reactors, systems, and/or methods disclosed herein is used to make alkene oxides. In some instances, lime is used to saponify or dehydrochlorinate propylene and/or butene chlorohydrins to produce the corresponding oxides. The oxides may then be converted to the glycols by acidic hydrolysis, in some instances.

Diacetone Alcohol.

In some embodiments, slaked lime and/or lime produced by the reactors, systems, and/or methods disclosed herein is used to make diacetone alcohol. In some cases, slaked lime is used as an alkaline catalyst to promote the self-condensation of acetone to form diacetone alcohol, which is used as a solvent for resins, and/or as in intermediate in the production of mesityl oxide, methyl isobutyl ketone and/or hexylene glycol.

Hydroxypivalic Acid Neopentyl Glycol Ester, Pentaerythritol.

In some embodiments, slaked lime and/or lime produced by the reactors, systems, and/or methods disclosed herein is used as a basic catalyst to make hydroxypivalic acid neopentyl glycol ester, and/or pentaerythritol.

Anthraquinone Dyes and Intermediates.

In some embodiments, slaked lime and/or lime produced by the reactors, systems, and/or methods disclosed herein is used as a basic reagent, to replace a sulfonic acid group with a hydroxide, in the making of anthraquinone dyes and/or intermediates.

Trichloroethylene

In some embodiments, slaked lime and/or lime produced by the reactors, systems, and/or methods disclosed herein is used to remove a chlorine from tetrachloroethane to form trichloroethylene.

6. Miscellaneous Uses

Silica, silicon Carbide and Zirconia Refractories.

In some embodiments, slaked lime and/or lime produced by the reactors, systems, and/or methods disclosed herein is used as a binder, bonding and/or stabilizing agent in the fabrication of silica, silicon carbide and/or zirconia refractories.

Lime Glass.

In some embodiments, slaked lime and/or lime produced by the reactors, systems, and/or methods disclosed herein is used as a source of lime in the fabrication of soda-lime glass. In some instances, lime and/or slaked lime is heated to high temperatures with other raw materials, including silica, sodium carbonate and/or additives such as alumina and/or magnesium oxide. In some instances, the molten mixture forms a glass upon cooling.

Whiteware Pottery and Vitreous Enamels.

In some embodiments, slaked lime and/or lime produced by the reactors, systems, and/or methods disclosed herein is used to make whiteware pottery and/or vitreous enamels. In certain cases, slaked lime is blended with clays to act as a flux, a glass-former, to help bind the materials, and/or to increase the whiteness of the final product.

Lubricant for Casting and Drawing.

In some embodiments, slaked lime and/or lime produced by the reactors, systems, and/or methods disclosed herein is used as a lubricant for casting and/or drawing of materials (such as iron, aluminum, copper, steel and/or noble metals). In some instances, calcium-based lubricants can be used at high temperature to prevent the metal from sticking to the mold. In certain cases, lubricants can be calcium soaps, blends of lime and other materials (including silicilic acid, aluminia, carbon and/or fluxing agents such as fluorospar and/or alkali oxides). Slaked lime is used as a lubricant carrier, in some cases. In certain instances, the slaked lime bonds to the surface of the wire, increases surface roughness and/or improves adhesion of the drawing compound.

Drilling Muds.

In some embodiments, slaked lime and/or lime produced by the reactors, systems, and/or methods disclosed herein is used in drilling mud formulations to maintain high alkalinity and/or to keep clay in a non-plastic state. Drilling mud may, in some cases, be pumped through a hollow drill tube when drilling through rock for oil and gas. In certain instances, the drilling mud carries fragments of rock produced by the drill bit to the surface.

Oil Additives and Lubricating Greases.

In some embodiments, slaked lime and/or lime produced by the reactors, systems, and/or methods disclosed herein is used as an oil additive and/or lubricating grease. In some instances, lime is reacted with alkyl phenates and/or organic sulfonates to make calcium soaps, which are blended with other additives to make oil additives and/or lubricating greases. In some cases, the lime-based additives prevent sludge build-up and to reduce acidity from products of combustion, especially at high temperature.

Pulp and Paper

In some embodiments, slaked lime and/or lime produced by the reactors, systems, and/or methods disclosed herein is used in the pulp and/or paper industry. For example, slaked lime is used in the Kraft process to re-causticize the sodium carbonate into sodium hydroxide. In some cases, the calcium carbonate that forms from this reaction can be returned to the reactors, systems and/or methods disclosed herein to regenerate the slaked lime. In certain instances, slaked lime can also be used as a source of alkali in the sulfite process of pulping, to prepare the liquor. In certain cases, slaked lime is added to a solution of sulfurous acid to form a bisulfite salt. The mixture of sulfurous acid and bisulfite is used, in some cases, to digest the pulp. Slaked lime can also be used to precipitate calcium lignosulfonates from spent sulfite liquor, in certain instances.

Aquariums

In some embodiments, slaked lime and/or lime produced by the reactors, systems, and/or methods disclosed herein is used as a source of calcium and/or alkalinity for marine aquariums and/or reef growth.

A Method of Storing Heat

In some embodiments, slaked lime and/or lime produced by the reactors, systems, and/or methods disclosed herein is used for thermochemical energy storage (e.g. for a self-heating food container and/or for solar heat storage).

Fire Retardant

In some embodiments, calcium and/or magnesium hydroxide produced by the reactors, systems, and/or methods disclosed herein is used as a fire retardant, an additive to cable insulation, and/or insulation of plastics.

Antimicrobial Agent

In some embodiments, slaked lime and/or lime produced by the reactors, systems, and/or methods disclosed herein is used as an antimicrobial agent. For example, in some instances, lime and/or slaked lime is used to treat disease contaminated areas, such as walls, floors, bedding, and/or animal houses.

The following examples are intended to illustrate certain embodiments of the present invention, but do not exemplify the full scope of the invention.

Example 1

Cement production is currently the largest single industrial emitter of $CO_2$, accounting for 8% (2.8 Gtons/year) of global $CO_2$ emissions in 2015. Deep decarbonization of cement manufacturing will require remediation of both the $CO_2$ emissions due to the decomposition of $CaCO_3$ to CaO, and that due to combustion of fossil fuels (primarily coal) in the calcining (~900° C.) and sintering (~1,450° C.) processes. This example demonstrates an electrochemical process that used neutral water electrolysis to produce a pH gradient in which $CaCO_3$ was decarbonated at low pH and $Ca(OH)_2$ was precipitated at neutral to high pH, concurrently producing a high purity $O_2/CO_2$ gas mixture (1:2 molar ratio at demonstrated stoichiometric operation) at the anode and $H_2$ at the cathode. The solid $Ca(OH)_2$ product readily decomposed and reacted with $SiO_2$ to form alite, the majority cementitious phase in Portland cement. This electrochemical calcination approach produced concentrated gas streams from which the $CO_2$ may be readily separated and sequestered, the $H_2$ and/or $O_2$ may be used to generate electric power via fuel cells or combustors, the $O_2$ may be used as a component of oxyfuel in the cement kiln to further lower $CO_2$ and $NO_x$ emissions, or the output gases may be used for other value-added processes including liquid fuel production. Analysis shows that in a scenario where the hydrogen produced by the reactor is combusted to heat the high temperature kiln, the electrochemical cement process can be powered solely by renewable electricity.

Cement is the most widely produced man-made material by volume, and the largest single industrial producer of carbon dioxide, currently emitting about 8% of all anthropogenic greenhouse gas emissions. Deep decarbonization of our energy system cannot be accomplished without addressing such industrial sources. This example demonstrates an electrochemically-based process that decomposed the key $CO_2$-emitting component of Portland cement, $CaCO_3$, to a $Ca(OH)_2$ precursor suitable for cement synthesis while simultaneously producing concentrated $CO_2$, $H_2$, and $O_2$ gas streams amenable to capture, power generation, oxyfuel combustion or liquid fuel synthesis. The proposed electrochemical synthesis approach can use renewable electricity and work synergistically with other developing sustainable technologies.

Deep decarbonization of today's energy system will require addressing not only the energy generation (24% of global greenhouse gas emissions) and transportation (14% of global greenhouse gas emissions) sectors, but also difficult-to-decarbonize sectors such as large industry, which today is responsible for about 21% of global greenhouse gas emissions. Industry uses fossil fuels for heat, to drive chemical reactions, and as reducing agents, but may be incentivized to become less reliant on fossil fuel if: 1) electrical alternatives become available, and 2) the cost and reliability of renewable electricity continues to improve. This example demonstrates an ambient temperature electrochemically-based process that decarbonated $CaCO_3$, precipitated solid $Ca(OH)_2$ from which desired calcium silicates are synthesized, and produced concentrated gas streams of $H_2$ and $O_2+CO_2$ that are amenable to $CO_2$ capture and sequestration, and/or used in other value-added processes (FIG. 12).

Figure 12:
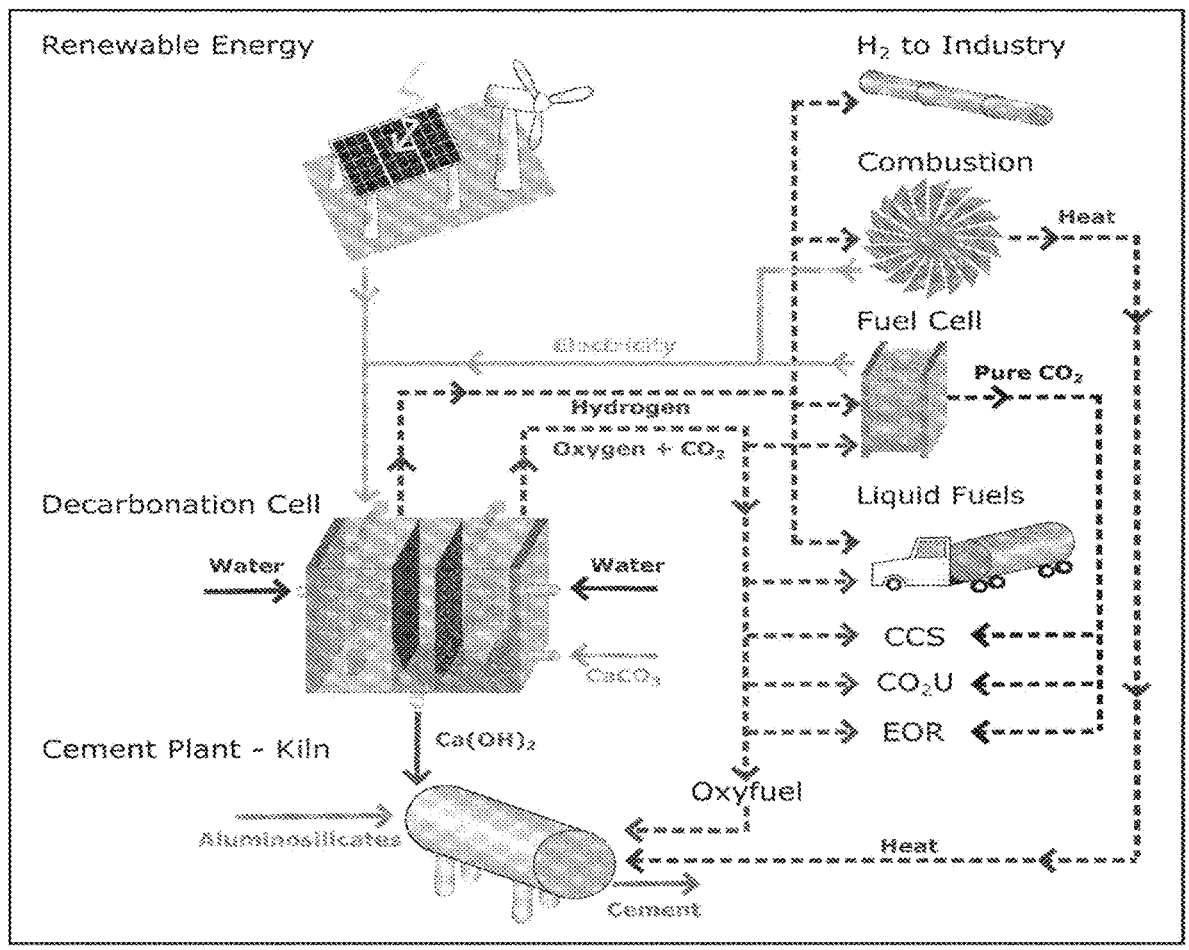
FIG. 12 is, in accordance with certain embodiments, a schematic for a low emission, electrochemically-based cement plant.

FIG. 12 is, in accordance with certain embodiments, a schematic for a low emission, electrochemically-based cement plant. An electrochemical decarbonation cell powered by renewable electricity converts $CaCO_3$ to $Ca(OH)_2$ used in cement synthesis. The decarbonation cell (see FIG. 13) uses the natural pH gradient produced by neutral-water electrolysis to dissolve $CaCO_3$ at the acidic anode and precipitate $Ca(OH)_2$ where pH≥6. Simultaneously, $H_2$ is generated at the cathode and $O_2/CO_2$ are generated at the anode. These gas streams can serve several alternative roles in a sustainable production system. $CO_2$ can be directly captured from the inherently concentrated stream (CCS). Electricity or heat can be generated from the $H_2$ and $O_2$ via fuel cells or combustors. The $O_2/CO_2$ oxy-fuel can be recirculated to the kiln for cleaner combustion in the cement sintering cycle. $CO_2$ reuse and utilization ($CO_2U$) concepts can be employed, such as use in enhanced oil recovery (EOR) or production of liquid fuels.

Cement (specifically Portland cement), is the most widely produced man-made material in the world, produced at a rate of 4 billion metric tons per year. The cement industry is the largest industrial source of greenhouse gases (excluding agriculture; steelmaking follows closely), accountable today for 8% of global greenhouse gas emissions. About one-half of the $CO_2$ emitted in cement manufacturing originates from the use of $CaCO_3$ (generally, limestone) as a key component, with the balance mainly being emitted through combustion of fossil fuels in the cement kiln. The demand for cement is growing as the world's population increases and becomes more urban, and as emerging economies develop infrastructure. By 2060, the number of buildings on Earth is expected to double; this is equal to building a New York City equivalent each 34 days for the next 40 years. Since the production of each kg of cement emits nearly one kg of $CO_2$, approximately 4 Gtons of $CO_2$ per year will be released from this new infrastructure, highlighting the urgency of decarbonizing cement production.

Currently, the flue gas from cement plants is too impure for economical carbon capture through amine scrubbing; use of alternative fuels (such as used tires) does not alleviate the primary emissions from $CaCO_3$; and supplementary cementitious materials likewise can only dilute to some extent the carbon impact of Portland cement, and may simultaneously compromise its physical properties. These methods have not been widely adopted to date. Another set of approaches is focused around using a $CO_2$ source to produce a carbonate-enriched cement or concrete product. In contrast with the above approaches, electrochemically-based approaches in accordance with certain embodiments have the potential to alleviate both the chemical and energy-related sources of $CO_2$, to take advantage of the emergence of low-cost renewable electricity, and to produce accepted, globally-adopted cement products. In some embodiments, the processes disclosed herein can work synergistically with other scientific and technological tools of a sustainable energy system, including low-cost renewable electricity from wind and solar, water-splitting and fuel creation, and chemical and electrical energy storage.

Figure 13:
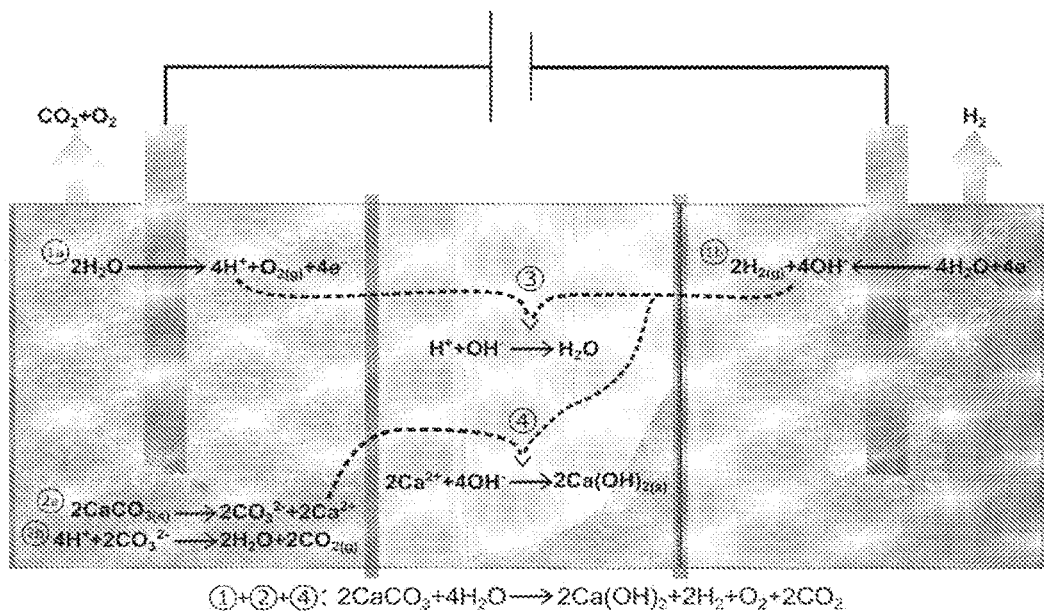
FIG. 13 is, in accordance with certain embodiments, a schematic of an electrolyzer-based decarbonation cell.

In this example, the reactor was based on an electrolysis cell in which inherent pH gradients were used to carry out $CaCO_3$ decarbonation and $Ca(OH)_2$ precipitation and collection (FIG. 13). The $Ca(OH)_2$ produced in this manner, which requires less energy to dehydrate CaO than is required to calcine $CaCO_3$, is readily reacted with $SiO_2$ to produce alite, the major active phase (50-70% by weight) in Portland cement. Near-stoichiometric operation of a laboratory scale reactor, where every two protons electrolytically produced at the oxygen-generating anode decarbonated one $CaCO_3$ formula unit, was demonstrated. In some embodiments, there are several pathways by which this electrochemical decarbonation reactor can be integrated into a low- or zero-carbon emission cement plant (FIG. 12), including powering by renewable electricity and using the gases produced in any of several alternative functions such as: 1) direct capture and sequestration of the inherently concentrated $CO_2$ stream; 2) generation of electricity or heat from the $H_2$ (and optionally the $O_2$) via fuel cells or combustors; 3) providing oxy-fuel for cleaner combustion in the cement sintering cycle; and 4) liquid fuel production. A first-order technoeconomic analysis of the energy consumption and fuel cost of such a process as a function of the cost of renewable electricity is presented.

FIG. 13 is, in accordance with certain embodiments, a schematic of the electrolyzer-based decarbonation cell used in the present example. Reactions 1a and 1b are the oxygen evolution and hydrogen evolution half-cell reactions respectively, under near-neutral pH. Reactions 2a and 2b represent the decomposition of calcium carbonate and release of $CO_2$. Reaction 3 is the normal formation of water from its component ions. In Reaction 4, the hydroxide ions in Reaction 3 instead go towards the formation of calcium hydroxide, and the protons protonate carbonate ions (Reaction 2b). The overall reaction in which $CaCO_3$ was converted to $Ca(OH)_2$ with the attendant release of hydrogen, oxygen and carbon dioxide is shown at the bottom. At maximum yield, the stoichiometry of the reaction has every four protons generated by OER (Reaction 1a) converting two $CaCO_3$ to $Ca(OH)_2$, with the gaseous species being produced in the ratios shown in the bottom reaction: Two moles of hydrogen are produced at the cathode for each mole of oxygen and two moles of carbon dioxide at the anode.

The decarbonation cell used in this example simultaneously functioned as an electrolyzer as well as chemical reactor to convert solid $CaCO_3$ to solid $Ca(OH)_2$, illustrated schematically in FIG. 13 and demonstrated experimentally in FIGS. 14A-J. An electrolyzer operating with near-neutral water had the following anode and cathode half-cell reactions:

$$2H_2O \rightarrow O_2 + 4H^+ + 4e^- \quad (1)$$

$$2H_2O + 2e^- \rightarrow H_2 + 2OH^- \quad (2)$$

At steady-state, the electrolyzer produced a pH gradient that was readily visualized upon addition of universal pH indicator to an operating H-cell, as shown in FIGS. 14A-14J. In such an electrolyzer, $H^+$ and $OH^-$ will normally recombine to form water, as illustrated by reaction ③ in FIG. 13. However, the present reactor replaced reaction ③ with a decarbonation reaction. When $CaCO_3$ was added to the acidic solution produced in the vicinity of the anode during electrolysis, chemical decarbonation occurred via the following sequence of reactions:

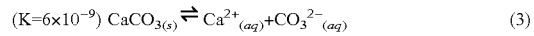
$$(K=6\times10^{-9})\ CaCO_{3(s)} \rightleftharpoons Ca^{2+}_{(aq)} + CO_3^{2-}_{(aq)} \quad (3)$$

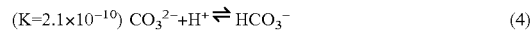
$$(K=2.1\times10^{-10})\ CO_3^{2-} + H^+ \rightleftharpoons HCO_3^- \quad (4)$$

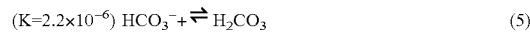
$$(K=2.2\times10^{-6})\ HCO_3^- + H^+ \rightleftharpoons H_2CO_3 \quad (5)$$

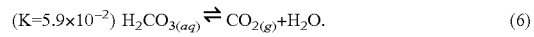
$$(K=5.9\times10^{-2})\ H_2CO_{3(aq)} \rightleftharpoons CO_{2(g)} + H_2O. \quad (6)$$

Dissolved $Ca^{2+}$ (eq. 3), which naturally diffused down its concentration gradient towards higher pH, was then precipitated from solution as $Ca(OH)_2$ upon reaction with $OH^-$ (reaction ④ in FIG. 13); this reaction is favored below pH 6. The sum of the electrochemical and chemical reactions that occurred in the cell is:

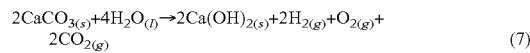
$$2CaCO_{3(s)} + 4H_2O_{(l)} \rightarrow 2Ca(OH)_{2(s)} + 2H_{2(g)} + O_{2(g)} + 2CO_{2(g)} \quad (7)$$

As used herein, stoichiometric operation of this reactor is the condition where every two moles of protons produced during electrolysis (Eq. 1) convert one mole of $CaCO_3$ to one mole of $Ca(OH)_2$ as shown in Eq. 7; this represents the maximum possible yield or coulombic efficiency. At stoichiometric operation, the ratio of gases produced is also given by Eq. 7: Each mole of $Ca(OH)_2$ produced results in the generation of one mole of $H_2$ at the cathode, and a 1:2 molar ratio of $O_2:CO_2$ at the anode.

In this example, the $CO_2$ was liberated as a gaseous product to be captured and sequestered, or used in other processes, and the $Ca(OH)_2$ was precipitated for use in cement production. $Ca(OH)_2$ is an important component not only in cement production, but also in the manufacture of refined sugar, pulp and paper, potash, for wastewater remediation, and as a fluxing agent in steel refining. In those industries, the $Ca(OH)_2$ is typically produced by slaking of CaO obtained by calcination of $CaCO_3$; however, in some embodiments, $Ca(OH)_2$ could be produced directly for these applications using decarbonation reactors disclosed herein, while enabling direct $CO_2$ capture. A series of laboratory H-cell reactors were constructed to test the proposed scheme. FIGS. 14A-21E show timelapse images of a reactor assembled with platinum electrodes and using an electrolyte consisting of 1M $NaNO_3$ in distilled water, to which a few drops of universal pH indicator were added. The color scale correlating color to pH is shown at the bottom of the figure. The anode chamber contained solid $CaCO_3$ powder, and in contrast to the cell in FIGS. 14F-14J, no porous separator was used between the chambers. In FIG. 14A, the yellow tint showed that the electrolyte was initially at pH-6 everywhere except immediately above the bed of $CaCO_3$ powder, where the purple tint showed that partial dissolution of the carbonate raised the pH to ~10. FIGS. 14B-14E show the cell at different time intervals after electrolysis commenced under potentiostatic conditions where the cell voltage was 2.5 V and current was ~6 mA. The color gradients showed that over time, a steeper pH gradient reaching more extreme pH values in each chamber developed, consistent with the expected half-cell reactions (Eq. 1 and 2). However, close examination of the solution within the cross-tube showed a distinct stratification, with the acidic (pink) solution above and the alkaline (purple) solution below, which was attributed to a density difference between the two solutions. In this cell configuration, $Ca(OH)_2$ was observed to precipitate across the length of the cell including directly on the platinum wire cathode, which it eventually passivated. Passivation led to a sharp drop in cell current after a few hours of operation.

FIGS. 14A-14J are timelapse images of decarbonation H-cells using platinum electrodes and 1M $NaNO_3$ in deionized water as electrolyte, in accordance with certain embodiments. Each cell contained a few drops of pH indicator dye, for which the color scale is shown at bottom. FIGS. 14A-E show a cell containing $CaCO_3$ powder in the anode (left) chamber and with no porous separator between the chambers. During electrolysis at a fixed 2.5V cell voltage (~6 mA current), the developing color gradient was consistent with the expected half-cell reactions (see FIG. 13) producing an acidic solution at the anode (left) and alkaline solution at the cathode (right). Close examination of the cross-tube showed a stratification of the solutions (which, without wishing to be bound by theory, is believed to occur through density-driven convection), with the acidic (pink) solution above and the alkaline (purple) solution below. FIGS. 14F-I show a decarbonation cell in which porous fiber separators were used at both chambers to restrict convection. In addition, the $CaCO_3$ powder source was contained within a removable cup so that its weight loss (after drying) could be measured. Note the absence of stratification. FIG. 14J shows $Ca(OH)_2$ that precipitated in the cross-tube after 12 hours of electrolysis. A high cell voltage of 9 V was used in this example to accelerate the reaction.

FIGS. 14F-14I show the same cell design, but with a porous paper separator placed at the intersection of each chamber with the cross-tube in order to limit convection. In addition, the $CaCO_3$ powder source in this cell was contained within a removable cup so that the dissolution of $CaCO_3$ as a function of time could be measured by removing and weighing the remaining powder (after drying). Note the lack of stratification; in the absence of convective mixing the cells could be operated for >12 h without $Ca(OH)_2$ passivation of the cathode. In this cell, the alkaline solution diffused as a uniform front across the cell, and at steady-state operation the pH within the cross-tube was high enough that $Ca(OH)_2$ precipitation occurred predominantly between the separators, where it was readily collected for analysis. Note also that in this configuration the pH around the anode was far less acidic (i.e., no pink tint was observed), and in fact was close to the yellow color indicating pH~6. 6 is approximately the pH at which $HCO_3^-$ and $CO_2$ (aq) are in equilibrium. This observation suggested that essentially all the protons produced in the oxygen evolution reaction (Eq. 1) were consumed by reaction with the carbonate ion (Eq. 4), which was later confirmed through independent measurements discussed in more detail below. In addition, the composition of the output gases was confirmed by gas chromatography.

Figure 15A:
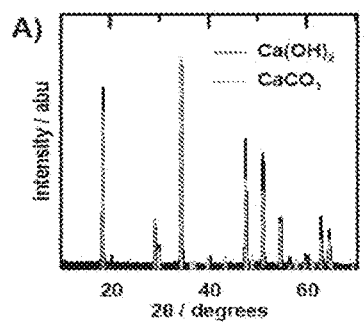
FIGS. 15A-15F show $Ca(OH)_2$ powder produced by a decarbonation reactor, in accordance with certain embodiments.

Using the cell design in FIGS. 14F-14I, significant amounts of white precipitate was collected on the porous paper separator directly in front of the cathode, as shown in FIG. 14J. Upon drying, the precipitate was confirmed using powder X-ray diffraction (XRD) to be predominantly $Ca(OH)_2$ with a small amount of $CaCO_3$ (6%, based on Rietveld refinement), as shown in FIG. 15A. Brunauer-Emmett-Teller (BET) analysis showed that the precipitate had a specific surface area of 0.8 $m^2/g$. Without wishing to be bound by theory, it is believed that the impurity $CaCO_3$ may have formed upon exposure of the $Ca(OH)_2$ to air when preparing the fine-powder samples for XRD, or when some of the soluble $HCO_3^-$ deprotonated on contact with $OH^-$ to reform $CaCO_3$. Scanning electron microscopy (SEM) showed that the $Ca(OH)_2$ particles were crystallized with three different characteristic length scales. The largest, isolated, crystallites, shown in FIG. 15B, have dimensions of tens of micrometers, and show a hexagonal prism morphology characteristic of $Ca(OH)_2$. Next in size scale were aggregates of much finer crystallites having a few micrometer dimensions, shown in FIGS. 15C and 15D, but of similar hexagonal-prism morphology. Lastly there existed precipitates with a rounded nodule morphology, which at higher magnification revealed submicrometer scale crystallites, shown in FIGS. 15E and 15E. Without wishing to be bound by theory, the appearance of three different morphologies of $Ca(OH)_2$ precipitates is believed to suggest that nucleation and growth conditions vary widely within the reactor. However, essentially all of the particles produced fell below the <90 μm specification typical for raw mixes in cement production. Composition analysis by energy-dispersive X-ray analysis showed no impurities above background levels in the $Ca(OH)_2$ except for trace amounts of Na, likely resulting from the Na salt used in the reactor electrolyte. Thus, the approach used in the present example was capable of producing fine, high purity $Ca(OH)_2$ particulates.

Figure 15B:
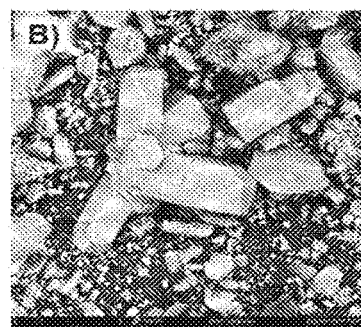
Figure 15C:
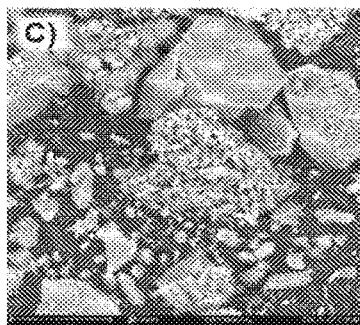
Figure 15D:
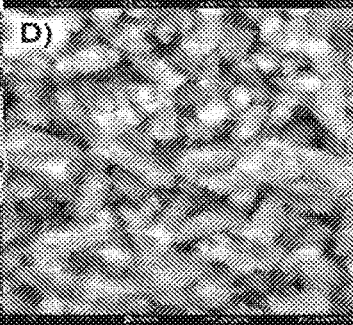
Figure 15E:
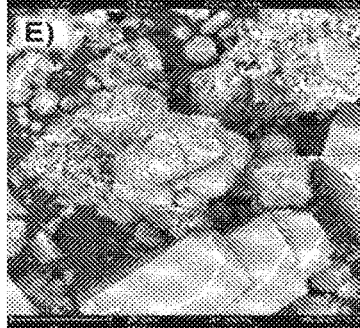
Figure 15F:
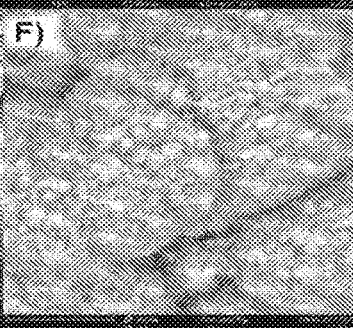

FIGS. 15A-15F show $Ca(OH)_2$ powder produced by the decarbonation reactor, in accordance with certain embodiments. FIG. 15A shows powder X-ray diffraction pattern from a typical sample, which Rietveld refinement showed to consist of 94% $Ca(OH)_2$ and 6% $CaCO_3$. FIGS. 15B-F are SEM images showing that the powder contained $Ca(OH)_2$ crystallites of three characteristic length scales. FIG. 15B shows that the largest $Ca(OH)_2$ crystallites had tens of micrometers dimensions and a hexagonal-prism morphology characteristic of this compound. FIG. 15C shows that aggregates of smaller $Ca(OH)_2$ crystallites, shown at higher magnification in FIG. 15D, had similar hexagonal-prism morphology but were of micrometer dimensions. FIG. 15E shows $Ca(OH)_2$ with rounded nodule morphology, which at higher magnification, FIG. 15F, showed submicrometer-scale crystallites.

A series of experiments was conducted to characterize the coulombic efficiency of the reactor compared to the stoichiometric limit. In each experiment, an H-cell reactor was assembled with fresh electrolyte, using 1M of either $NaClO_4$ or $NaNO_3$ salt, and the same starting amount of $CaCO_3$ powder. The reactor was operated under potentiostatic conditions (3.5 V) for times from 1 to 14 hours, after which the $CaCO_3$-containing cup was removed from the reactor, dried, and weighed to obtain the amount of $CaCO_3$ lost to chemical dissolution. Results from 13 experiments are plotted in FIG.

Figure 16:
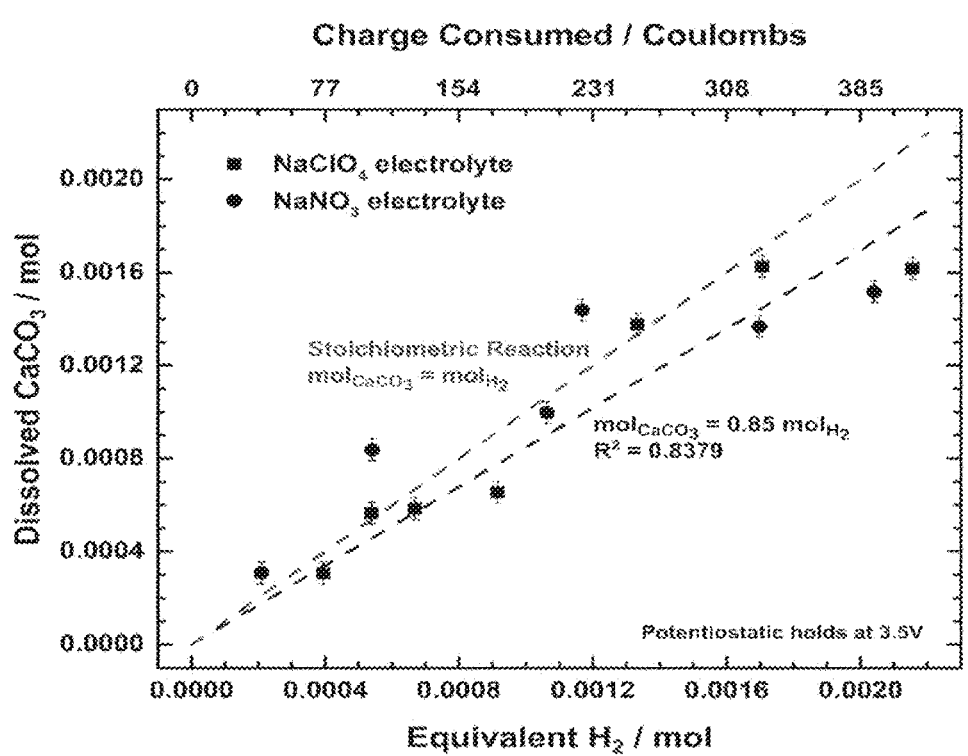
FIG. 16 shows the coulombic efficiency of a decarbonation reactor, in accordance with certain embodiments, as measured from thirteen experiments each starting with a freshly assembled H-cell of the type in FIG. 13.

16 as the moles of dissolved $CaCO_3$ against the coulombs passed (upper abscissa), obtained by integrating the current over the duration of the experiment, and the $H_2$ gas equivalent (lower abscissa), calculated assuming that the rate of electrolysis is equal to the cell current (i.e., no side reactions). The red dashed line in FIG. 16 represents the stoichiometric reaction wherein every two protons produced at the anode in the OER reaction protonates one carbonate ion. The error bars for each data point correspond to cumulative weighing error based on the precision of the scale. A least-squares fit through all of the data points yielded a ratio of chemical reaction rate to electrolysis rate of 0.85, relative to a maximum value of 1. This demonstrated that the approach used in the present example had a high coulombic efficiency, even using an unoptimized lab-scale reactor. For both electrolytes the longest-time data (far right data points) showed a fall-off in efficiency, which other experiments suggest is due to passivation of the cathode with $Ca(OH)_2$ at long reactor run times. Note that some of the data points were above the line of maximum theoretical efficiency. Without wishing to be bound by theory, it is believed that this deviation is due to some inadvertent loss of $CaCO_3$ during removal of the $CaCO_3$-containing cup from the reactor. The amount of $Ca(OH)_2$ produced in these experiments was not directly measured due to difficulties recovering all of the $Ca(OH)_2$ precipitated in the cells (e.g., from the cell walls) and efficiently removing all of the precipitate on the paper separator. Even so, the present efficiency was close to the thermal efficiency of a conventional cement precalciner, which decarbonates about 90% of the incoming $CaCO_3$.

FIG. 16 shows the coulombic efficiency of the decarbonation reactor, in accordance with certain embodiments, as measured from thirteen experiments each starting with a freshly assembled H-cell of the type in FIG. 13. The mass of dissolved $CaCO_3$, measured from the mass loss of the $CaCO_3$ power source in the reactor, was plotted against the total charge passed through the system (top abscissa) and the equivalent moles of hydrogen produced at the cathode (lower abscissa), calculated assuming all current went towards electrolysis. The red dashed line represents the stoichiometric reaction giving maximum conversion efficiency on a charge basis, and the black dashed line represents a least-squares fit to the experimental data, the slope of which corresponds to ~85% coulombic efficiency.

Reactors can be designed, in accordance with certain embodiments, in which there is greater control over convection and chemical gradients, and in which the precipitated $Ca(OH)_2$ is collected more efficiently and continuously. For example, by analogy with the electrolytic manganese dioxide (EMD) process, in some embodiments, the precipitate may be allowed to continue building up on the surface of the electrode until it reaches a thickness that causes it to fracture and fall off, the precipitate being collected as or after it settles. In the instance of plate-electrode or H-cell configuration reactors, in some embodiments, a liquid electrolyte stream flowing between the electrodes may convect the precipitate to a filter or flow-based or centrifugal separator to separate the precipitate, the liquid then being recirculated to the reactor to repeat the operation. In a concentric-electrode reactor design in which one of the electrodes is a central post or inner cylinder, and the second electrode is an outer cylinder, in some embodiments, axial flow of electrolyte between the electrodes may be used to convect the precipitate to a point of collection, such as by filtering or flow- or centrifugal-separation. In such flow-based precipitation methods, the convection of liquid may be performed actively, such as by pumping of the liquid, or passively, using gradients in temperature or in the density of the electrolyte. In some embodiments, said gradients in temperature or in the density of the electrolyte are produced by the operation of the reactor itself.

Figure 17A:
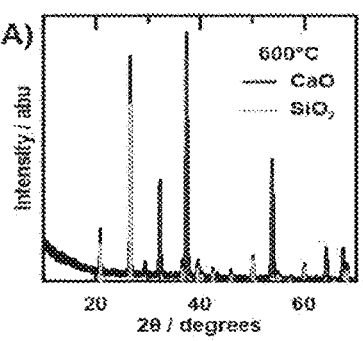
FIGS. 17A-17F show synthesis of alite, $3CaO\text{---}SiO_2$, using $Ca(OH)_2$ produced in a decarbonation reactor, in accordance with certain embodiments.
Figure 17B:
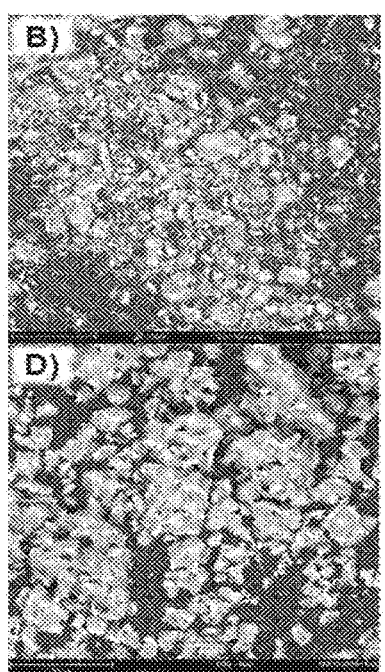

Having demonstrated the efficacy of the proposed decarbonation reactor, the suitability of its solid $Ca(OH)_2$ product as a precursor to Portland cement was then evaluated. The most important and abundant mineral in Portland cement, constituting 50-70% by weight, is alite, $3CaO \cdot SiO_2$. Mixtures of the $Ca(OH)_2$ and a fine $SiO_2$ powder were prepared, as well as a control sample using purchased $CaCO_3$ powder mixed with the same $SiO_2$, in the 3:1 molar ratio corresponding to alite. These mixed-powder samples were then subjected to heat treatment over a wide range of temperatures. FIGS. 17A and 17B show the XRD pattern and SEM image of the $Ca(OH)_2+SiO_2$ mixture after heating to 600° C. for 2 h in air. Unlike $CaCO_3$, which does not decompose until 898° C. (at 1 atm $P_{CO2}$), $Ca(OH)_2$ has a thermodynamic decomposition temperature of 512° C. (at 1 atm $P_{H2O}$) and, in the present example, had already decomposed to CaO upon firing at 600° C., although the CaO had not yet reacted with $SiO_2$ to form alite. After heating for 2 h at 1,500° C., a typical cement kiln temperature, the mixture had reacted to form the low-temperature T1 polymorph of alite (ICSD: 4331), as shown by the XRD pattern in FIG. 16C. The polymorphism of alite is known to depend on the nature and amount of impurities in the raw material as well as the cooling rate from kiln temperature. While the high temperature M1 and M2 polymorphs are more commonly obtained in commercial processes, the T1 polymorph is considered just as cementitious. FIG. 17D shows that the alite particles produced from the precursors disclosed in the present example were less than 30 µm in size, which is within the range desired for commercial Portland cements. FIGS. 17E and 17F show calcium and silicon composition maps, from which the compositional homogeneity of the alite was evident. FIGS. 18A and 18B show the XRD pattern and SEM image of the corresponding $CaCO_3$ and $SiO_2$ mixture after heating to 600° C. for 2 h in air, and FIGS. 18C and 18D show the results after heating to 800° C. for 2 h in air. At 600° C., no significant decomposition had occurred, whereas at 800° C., the $CaCO_3$ had decomposed to CaO but reaction to alite had not commenced. After heating to 1500° C. for 2 h, FIGS. 18E and 18F, the XRD shows that the alite phase had formed. However, there remained some unreacted CaO, 6% according to Rietveld refinement of the XRD spectra. The SEM image in FIG. 18F, when compared to FIG. 17D, shows that the $Ca(OH)_2$ and $CaCO_3$ derived alites ultimately reached similar particle morphologies and sizes. These results show that the electrochemically produced $Ca(OH)_2$ from the decarbonation reactor was a suitable precursor for synthesizing the main hydrating calcium silicate phase in Portland cement. Moreover, due to the fine precipitate morphology (compared to, for example, ground limestone) and its >300° C. lower decomposition temperature, the electrochemically produced $Ca(OH)_2$ from the decarbonation reactor disclosed herein appeared to have improved reactivity compared to $CaCO_3$, which could translate to reduced firing times and/or temperatures that lower energy consumption in the high temperature reaction step.

Figure 17C:
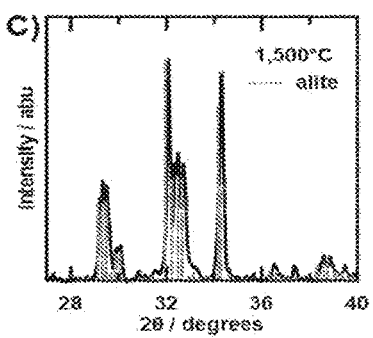
Figure 17D:
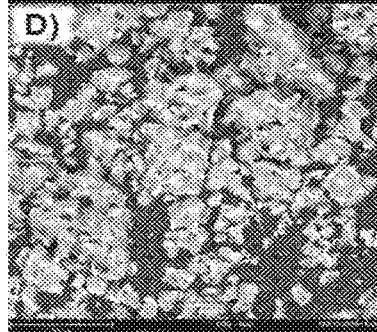
Figure 17E:
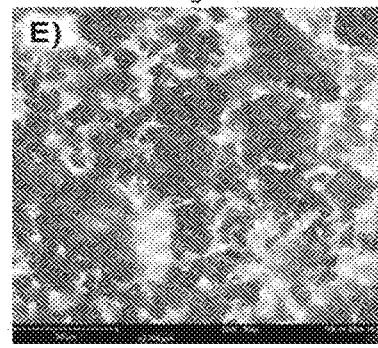
Figure 17F:
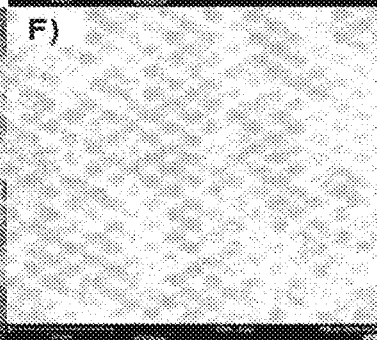

FIGS. 17A-17E show synthesis of alite, $3CaO-SiO_2$, using $Ca(OH)_2$ produced in the decarbonation reactor, in accordance with certain embodiments. FIG. 17A is an x-ray diffraction pattern; and FIG. 17B is an SEM image of a mixture of $Ca(OH)_2$ and $SiO_2$ after heating to 600 C for 2 h in air. The $Ca(OH)_2$ had decomposed to CaO, but had not yet reacted with the SiO$_2$ to form the alite phase. After firing at 1500 C for 2 h, FIG. 17C shows the X-ray diffraction pattern showed single-phase alite, the morphology of which is shown in the SEM image in FIG. 17D. Composition maps in FIG. 17E and FIG. 17F of calcium and silicon, respectively, show a uniform distribution of both elements.

FIGS. 18A-E show synthesis of alite using CaCO$_3$ and SiO$_2$. After heating to 600 C for 2 h in air, FIG. 18A shows the X-ray diffraction pattern, and FIG. 18B shows the SEM image, which showed that unlike the mixture made with Ca(OH)$_2$, FIG. 17A, here the CaCO$_3$ had not yet decomposed to CaO. After heating to 800 C for 2 h in air, the X-ray diffraction pattern in FIG. 18C showed that the CaCO$_3$ had decomposed to CaO but had not yet reacted with SiO$_2$ to form the alite phase. FIG. 18D shows an SEM image of this CaO and SiO$_2$ powder mixture. After firing to 1500 C for 2 h in air, the X-ray diffraction pattern, FIG. 18E, showed a mixture of alite with some residual CaO. FIG. 18F shows an SEM image of this incompletely reacted mixture.

In addition to producing a reactive Ca(OH)$_2$ suitable for cement synthesis, the electrolysis-based decarbonation reactor disclosed in the present example produced concentrated gas streams of H$_2$ at the cathode, and O$_2$ and CO$_2$ (in a 1:2 molar ratio when operating at high coulombic efficiency) at the anode. These gases are important components in a wide range of sustainable technologies that are currently being pursued worldwide, which opens up several possible synergies between cement production and these technologies.

In some embodiments, the O$_2$/CO$_2$ stream from decarbonation reactors in accordance with certain embodiments can simplify and make more efficient these processes. Post-combustion capture refers to technologies that capture CO$_2$ from the kiln exhaust, such as calcium looping, amine scrubbing, and membrane filtration. Oxy-fuel combustion, or oxygen-enhanced combustion, refers to the burning of fossil fuels (here, primarily coal) in oxygen instead of air. Oxy-combustion firstly results in improved fuel efficiency, since the nitrogen content of air does not have to be heated. Secondly, the absence of nitrogen permits higher flame temperatures without emitting nitrous oxides (NO$_x$), which have a global warming potential 298 times that of CO$_2$ on a per-mass basis and also contribute to smog, acid rain and ozone depletion. Thirdly, the flue gas from oxy-fuel combustion has a higher concentration of CO$_2$ and fewer NO$_x$ impurities, making carbon capture more efficient. In some embodiments, in a cement plant using approaches in accordance with certain embodiments, the O$_2$ and CO$_2$ gas mixture produced by the reactor could be used as oxy-fuel in the high temperature kiln to lower energy consumption and NO$_x$ emissions.

The concentration of CO$_2$ in the flue gas from conventional cement kilns is ~25%. The gas stream from the decarbonation cells disclosed herein increased the concentration of CO$_2$ up to 67%, which would in principle make amine scrubbing more efficient. In some embodiments, a benefit of certain processes disclosed herein is the ability to avoid expensive CCS processes like amine scrubbing altogether. Since, in some embodiments, in certain processes disclosed herein the CO$_2$ is delivered in a highly concentrated form mixed only with O$_2$ and some H$_2$O vapor, direct capture out of the reactor, using the same simple compression processes now used for post-combustion capture of purified and concentrated CO$_2$, could be used.

The hydrogen gas produced at the cathode in certain decarbonation cells disclosed herein, in some embodiments, has value that could be realized in several ways. Hydrogen as a feedstock is important to major industries such as ammonia and fertilizer production, oil and gas refining, and process metallurgy, and is considered a key component of developing technologies that could decarbonize heavy-duty transportation, aviation, and heating. In some embodiments, hydrogen from the decarbonation cell could be supplied as a value-added product to such industries. In some embodiments, the gas streams could also be used in CO$_2$ utilization processes that produce liquid fuels, such as those that also use the hydrogen and produce alcohols.

In some embodiments, the hydrogen could also be looped back to support the cement process (FIG. 12). The hydrogen could be directly combusted to provide heat or electric power back to the cement operation, in certain cases. Or, the H$_2$ and O$_2$/CO$_2$ gas streams could supply a fuel cell that generates on-site electricity to power the electrochemical reactor or other plant operations such as grinding, mixing, and handling, in some instances. In some embodiments, by using an SOFC, which has the highest electrical efficiency of all fuel cell types (60-80%), the deleterious effects of the CO$_2$ on proton exchange membrane (PEM) fuel cells can be averted, and typical SOFC operating temperatures of 500-1,000° C. could be readily maintained using heat from the cement kiln (which typically operates at 1,450-1,500° C.). Simultaneously, oxygen could be removed from the O$_2$/CO$_2$ gas stream, further simplifying sequestration of the purified CO$_2$, in some cases.

In accordance with certain embodiments, the CO$_2$ stream produced from the decarbonation cell may also have value in applications that up-cycle captured CO$_2$, an area of growing interest. CO$_2$ can be used to enhance oil recovery (OER) and to make chemicals such as urea, salicylic acid, methanol, carbonates, synthetic fuel (via the Fischer-Tropsch process), and synthetic natural gas (via the Sabatier reaction).

In some embodiments, an electrochemically-based cement manufacturing process can be operated purely with renewable electricity. In certain embodiments, the least capital-intensive way to use the output gases of the decarbonation reactor may be through combustion to heat the cement kiln. The energy flows in this configuration were analyzed; details are given in the SI. Assuming a decarbonation reactor operating with 85% coulombic efficiency, an electrolyzer operating at 60-75% efficiency, and combustion of the resulting H$_2$ and O$_2$ to heat the sintering kiln with 60-80% efficiency, the input electrical energy required to make one kg of cement is 5.2-7.1 MJ. This assumes no energy benefit from the substitution of Ca(OH)$_2$ for CaCO$_3$ in the high temperature sintering process nor other auxiliary benefits. (For example, in some embodiments, the capital and energy cost of preparing cement "raw meal," such as grinding limestone to a particle size small enough for efficient reaction in the high temperature sintering kiln, may be reduced in the electrochemical plant where this function is replaced by chemical dissolution.) In some cases, at 80% efficient combustion of the H$_2$ and O$_2$ produced from the decarbonation cell, the thermal energy produced slightly exceeds that required for sintering. In the case where combustion is 60% efficient, 90% of the thermal energy required for sintering can be supplied from the electrolyzer gases (i.e., ~0.5 MJ/kg of supplemental energy is required), in certain instances. In some embodiments, this energy deficit, as well as electric power for supporting operations, could be made up with an excess of electrolyzer capacity above that strictly needed for decarbonation. Since sintering is the most energy-intensive process in cement production, this analysis indicates that, in some embodiments, a renewables-powered electrochemical cement process would not require large amounts of supplemental energy, if any.

The cost of the electrochemically-based process depends on the configuration, of which numerous possible configurations are discussed above. In some cases, the lifetime cost and economic return for a complete system or any of its subunits depends on capital cost, efficiency, and durability, as well as the value of the cement and gaseous byproducts. In some cases, the lifetime cost of the decarbonation reactor will depend on its specific design and performance. However, the energy cost of an electrochemical process in accordance with certain embodiments was compared with that of its coal-fired counterpart. The 5.2-7.1 MJ/kg cement estimated for the electrochemical process exceeded the energy required for the conventional cement process in the average US kiln, which is 4.6 MJ/kg. At a coal price of 61 US$/tonne (for bituminous coal), the energy cost for the conventional process is ~28 US$/tonne cement, which is 25% of the average US cement selling price of $113/metric ton. The corresponding cost for the electrochemical process naturally depends on the price of electricity, and could in some instances be zero or even negative if obtained from renewable resources. However, for electricity costs of 0.02, 0.04 and 0.06 US$/kWh, and assuming an energy requirement for the electrochemical process of 6 MJ/kg, which is in the middle of the estimated range, the energy cost is 35, 60 and 100 US$/tonne cement, respectively. This suggests that, in the absence of other considerations, the electrochemical process would be cost-competitive with conventional plants (~28 US$/tonne cement) only if electricity is available at <0.02 US$/kWh. By comparison, the price of wind electricity is now at or slightly below 0.02 US$/kWh across much of the US interior.

However, this cost comparison neglects the cost of carbon capture and sequestration, which for amine scrubbing of conventional cement flue gas has been estimated to be on the order of 91 US$/tonne. In the electrochemical sequence modeled above, where electrolytic $H_2$ is combusted to heat the kiln, the cost of directly capturing $CO_2$ from the $O_2/CO_2$ stream exhibiting the decarbonation reactor should be less than 40 US$/tonne. This would swing net energy costs in favor of the electrochemical process, in an environment where policies require carbon remediation, and where low-cost renewable electricity is available.

Finally, the water intensity of an electrolyzer-based process in accordance with certain embodiments was considered. Each kg of cement made using a decarbonation cell in accordance with certain embodiments would require 0.4 kg of water; this means that the average US kiln, producing 1,800 tons of cement/day, would require ~760 tons of water per day. However, in some cases, half of this water would be recovered upon the dehydration of $Ca(OH)_2$. In certain instances, if $H_2$ was used to fuel the kiln, the other half of the water could be condensed from the flue gas. In principle, in some embodiments, all of the water used for electrolysis could be recycled.

This example demonstrated an electrochemically-based cement synthesis process in which $CaCO_3$ was decarbonated and $Ca(OH)_2$ was precipitated in the pH gradient produced by a neutral-water electrolyzer, while concentrated gas streams of $H_2$ and $O_2/CO_2$ were simultaneously produced. The fine powder $Ca(OH)_2$ was used to synthesis phase-pure alite, the majority cementitious phase in ordinary Portland cement. In some embodiments, the concentrated gas streams from this process may be used synergistically with other processes under development for sustainable industrial technologies. Amongst several alternatives, in some embodiments, the $CO_2$ may be directly captured and sequestered; the $H_2$ and/or $O_2$ may be used to generate electric power via fuel cells or combustors; the $O_2$ may be used as a component of oxy-fuel to further lower $CO_2$ and $NO_x$ emissions from the cement kiln; or the output gases may be used to synthesize value-added products such as liquid fuels. The laboratory-scale prototype decarbonation reactors of the present example were shown to be capable of operating with near-theoretical coulombic efficiency, wherein every two protons produced at the anode during electrolysis dissolved one $CaCO_3$ formula unit. Under such conditions, the electrolytic hydrogen produced, if combusted, could supply most or all of the thermal energy required in high temperature sintering of cement. This example demonstrates a pathway to cost-competitive emissionless cement manufacturing wherein all energy is supplied by renewable electricity.

Materials and Methods

Decarbonation Cells.

Custom-designed H-cells were fabricated by James Glass, Inc. (Hanover, MA). The electrolyte was 1 M $NaClO_4$ or $NaNO_3$ (Sigma-Aldrich, ≥98%) dissolved in deionized water. These electrolytes were chosen because their calcium salts are soluble, and because they do not decompose at high voltage. Both electrodes were made from platinum: a rod at the cathode, and a wire at the anode (BASi, MW-1032). Platinum was chosen because it has a high catalytic activity for hydrogen and oxygen evolution in both acid and base. Alternative low-cost electrode materials might include Ni, Cu or stainless steel for the cathode (pH 10), and Al, Sn, Pb for the cathode (pH 6). $CaCO_3$ powder (Sigma-Aldrich, ≥99%) was added to the anode compartment. Filter paper (VWR, 28310-015, particle retention 5 μm) was used as the porous separator. Potentiostatic experiments were conducted using a Bio-Logic Science Instruments (Seyssinet-Pariset, France) VMP3 potentiostat. All tests were done at room temperature.

XRD Characterization

XRD patterns were collected using a PANalytical (Almelo, Netherlands) X'Pert PRO XRPD, using Cu radiation and a vertical circle theta:theta goniometer with a radius of 240 mm. The default configuration of this instrument is in Bragg-Brentano geometry with a high-speed high-resolution X'Celerator position sensitive detector, using the Open Eulerian Cradle (OEC) sample stage. XRD data was analyzed using Highscore, version 4.7.

SEM Characterization

SEM imaging and compositional analysis of the samples was conducted using a Phenom XL instrument equipped with an energy-dispersive X-ray detector (nanoScience Instruments, Phoenix, AZ), operating at 10 kV accelerating voltage for imaging and 15 kV for EDS analysis.

BET Characterization

A Quantachrome Instruments NOVA 4000E (Anton Paar QuantaTech, Boynton Beach, Florida) was used to perform multipoint BET analysis of powder specific surface areas.

Alite Synthesis

Electrochemically precipitated $Ca(OH)_2$ or $CaCO_3$ (Sigma-Aldrich, ≥99%) was mixed with $SiO_2$ (99.5%, 2 μm, Alfa Aesar) in a 3:1 mole ratio. The powders were mixed into a slurry with ethanol then dried. The resulting well-mixed powders were pressed into pellets. The pellets were placed in platinum crucibles and heated at 2° C. per minute to 1,500° C. in a muffle furnace (Thermolyne F46120-CM). The temperature was held at 1,500° C. for two hours, then the pellets were furnace cooled by turning off the power. The resulting powders were confirmed to be alite by XRD.

Example 2

This example describes the formation of solid nickel hydroxide ($Ni(OH)_2$) in a spatially varying pH gradient within an electrochemical cell from nickel carbonate ($NiCO_3$).

The electrochemical cell depicted in FIG. 3A was used. The electrochemical cell was an H-cell containing cathode 104, anode 105, and a solution containing an electrolyte, with cathode 104 and anode 105 at least partially submerged in the solution. Cathode 104 and anode 105 were both platinum rods and the electrolyte was 0.5 M $Na_2SO_4$. The electrochemical cell was run at room temperature with 5 Volts. Two pieces of filter paper were used as two separate membranes selectively permeable to ions (membrane 110a and membrane 110b), forming separate chamber 113 between them. Several drops of universal indicator were placed in the solution. The solution surrounding anode 105 was pink, indicating a pH around 4, while the solution surrounding cathode 104 was purple, indicating a pH around 10. This spatially varying pH gradient is formed because of the electrolysis of water, which involves a hydrogen evolution reaction at the cathode (resulting in production of hydroxide ions and, thus, an alkaline pH at the cathode) and an oxygen evolution reaction at the anode (resulting in production of protons and, thus, an acidic pH at the anode).

Nickel carbonate was then added to the solution surrounding anode 105. One hour after the nickel carbonate was added, the bottom of the solution surrounding anode 105 was green, from the nickel carbonate, while the top of the solution surrounding anode 105 remained pink, indicating a pH around 4. The color of the solution surrounding cathode 104 appeared unchanged. Ten hours after the nickel carbonate was added, the nickel carbonate was depleted and the solution surrounding anode 105 was green, indicating a pH around 7, while the solution surrounding cathode 104 was blue, indicating a pH around 9, as shown in FIG. 3B. At ten hours, precipitate 112 (nickel hydroxide, in this instance) was observed in separate chamber 113 between membranes selectively permeable to ions (membrane 110a and membrane 110b).

The nickel carbonate was dissolved in the acidic region of the anode, resulting in the production of carbon dioxide and nickel ions. The nickel ion diffused towards the alkaline region of the cathode, where it reacted with the hydroxide ions to form nickel hydroxide—the observed precipitate. Hydrogen gas was also liberated from the cathode, while oxygen gas and carbon dioxide gas were liberated from the anode.

Example 3

This example describes the formation of solid calcium hydroxide ($Ca(OH)_2$) in a spatially varying pH gradient within an electrochemical cell from calcium carbonate ($CaCO_3$).

An electrochemical cell was set up and run like that in Example 2, except that the electrolyte was 1 M $NaClO_4$ and the electrochemical cell was run with a constant voltage of 3.5 Volts. The electrochemical cell was run overnight and precipitate 112 was formed, as shown in FIG. 4A. Precipitate 112 was collected, analyzed by x-ray diffraction (XRD) (which confirmed that precipitate 112 was $Ca(OH)_2$), as shown in FIG. 4C, and mixed in a 3:1 mole ratio with $SiO_2$ and water to form a non-hydraulic cement as shown in FIG. 4B.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

Additional Exemplary Concepts

Certain embodiments are related to systems. In one aspect, a system comprises: an electrochemical reactor comprising: a first outlet configured to discharge $Ca(OH)_2$ and/or lime; and a second outlet configured to discharge $CO_2$; and a unit, downstream of the electrochemical reactor, configured to receive the $Ca(OH)_2$, the lime, and/or a reaction product of the $Ca(OH)_2$ and/or the lime [Concept 1].

In some embodiments of Concept 1, the system further comprises a vessel configured to collect $CO_2$ discharged from the second outlet [Concept 2]. In some embodiments of Concept 1, the discharged $CO_2$ is to be sequestered, used in a liquid fuel, used in oxyfuel, used in enhanced oil recovery, used to produce dry ice, and/or used as an ingredient in a beverage [Concept 3].

In some embodiments of any one of Concepts 1-3, the unit is a kiln configured to heat the $Ca(OH)_2$, the lime, and/or a reaction product of the $Ca(OH)_2$ and/or the lime as part of a cement-making process [Concept 4]. In some embodiments of any one of Concepts 1-3, the unit is part of one or more of the following: a ferrous metal making process; a nonferrous metal making process; a masonry process; a soil stabilization process; an asphalt making and/or recycling process; a process for removal of acid gas and/or carbon dioxide; a waste-treating process; a water-treating process; an agricultural process; a sugar-refining process; a leather making process; a glue and/or gelatin making process; a process for making dairy products; a fruit industry process; a process for making fungicides and/or insecticides; a food-making process; a chemical-making process (e.g., a process to make calcium carbonate, calcium hypochlorite, calcium carbide, calcium phosphates, calcium bromide, calcium hexacyanoferrate, calcium silicon, calcium dichromate, calcium tungstate, calcium citrate, calcium soaps, calcium lactate, calcium tartrate, aluminum oxide, alkali carbonates, alkali bicarbonates, strontium carbonate, calcium zirconate, alkali hydroxides, magnesium hydroxide, alkene oxides, diacetone alcohol, hydroxypivalic acid neopentyl glycol ester, pentaerythritol, anthraquinone dyes, anthraquinone intermediates, and/or trichloroethylene); a process to make refractories; a process to make lime glass; a process to make whiteware pottery and/or vitreous enamels; a process for casting and/or drawing of materials; a process for making drilling muds; a process for making oil additives and/or lubricating grease; a paper making process; a process for growing and/or maintaining an aquarium and/or reef; a process for storing heat; a process for making fire retardants and/or insulators; a process for making antimicrobial agents; a flue gas treatment carbon capture process; and/or a plaster mix process [Concept 5].

In some embodiments of any one of Concepts 1-5, the second outlet and/or a third outlet is configured to discharge $O_2$ that is to be used as oxyfuel, used in a CCS application, and/or used in enhanced oil recovery [Concept 6]. In some embodiments of any one of Concepts 1-6, the second outlet and/or a fourth outlet is configured to discharge $H_2$ that is to be used as a fuel (e.g., in a fuel cell, or to heat the system) [Concept 7].

In one aspect, a system comprises: an electrochemical reactor comprising: a first outlet configured to discharge $Ca(OH)_2$ and/or lime; and a second outlet configured to discharge $O_2$ that is to be sequestered, used as oxyfuel, used in a CCS application, and/or used in enhanced oil recovery; and a unit, downstream of the electrochemical reactor, configured to receive the $Ca(OH)_2$, the lime, and/or a reaction product of the $Ca(OH)_2$ and/or the lime [Concept 8].

In some embodiments of Concept 8, the unit is a kiln configured to heat the $Ca(OH)_2$, the lime, and/or a reaction product of the $Ca(OH)_2$ and/or the lime as part of a cement-making process [Concept 9]. In some embodiments of Concept 8, the unit is part of one or more of the following: a ferrous metal making process; a nonferrous metal making process; a masonry process; a soil stabilization process; an asphalt making and/or recycling process; a process for removal of acid gas and/or carbon dioxide; a waste-treating process; a water-treating process; an agricultural process; a sugar-refining process; a leather making process; a glue and/or gelatin making process; a process for making dairy products; a fruit industry process; a process for making fungicides and/or insecticides; a food-making process; a chemical-making process (e.g., a process to make calcium carbonate, calcium hypochlorite, calcium carbide, calcium phosphates, calcium bromide, calcium hexacyanoferrate, calcium silicon, calcium dichromate, calcium tungstate, calcium citrate, calcium soaps, calcium lactate, calcium tartrate, aluminum oxide, alkali carbonates, alkali bicarbonates, strontium carbonate, calcium zirconate, alkali hydroxides, magnesium hydroxide, alkene oxides, diacetone alcohol, hydroxypivalic acid neopentyl glycol ester, pentaerythritol, anthraquinone dyes, anthraquinone intermediates, and/or trichloroethylene); a process to make refractories; a process to make lime glass; a process to make whiteware pottery and/or vitreous enamels; a process for casting and/or drawing of materials; a process for making drilling muds; a process for making oil additives and/or lubricating grease; a paper making process; a process for growing and/or maintaining an aquarium and/or reef; a process for storing heat; a process for making fire retardants and/or insulators; a process for making antimicrobial agents; a flue gas treatment carbon capture process; and/or a plaster mix process [Concept 10]. In some embodiments of any one of Concepts 8-10, the second outlet and/or a third outlet is configured to discharge $H_2$ that is to be used as a fuel (e.g., in a fuel cell, or to heat the system) [Concept 11].

In some embodiments, a system comprises: an electrochemical reactor comprising: a first outlet configured to discharge $Ca(OH)_2$ and/or lime; and a second outlet configured to discharge $H_2$ that is to be sequestered and/or used as a fuel (e.g., in a fuel cell and/or to heat the system); and a unit, downstream of the electrochemical reactor, configured to receive the $Ca(OH)_2$, the lime, and/or a reaction product of the $Ca(OH)_2$ and/or the lime [Concept 12].

In some embodiments of Concept 12, the unit is a kiln configured to heat the $Ca(OH)_2$, the lime, and/or a reaction product of the $Ca(OH)_2$ and/or the lime as part of a cement-making process [Concept 13]. In some embodiments of Concept 12, the unit is part of one or more of the following: a ferrous metal making process; a nonferrous metal making process; a masonry process; a soil stabilization process; an asphalt making and/or recycling process; a process for removal of acid gas and/or carbon dioxide; a waste-treating process; a water-treating process; an agricultural process; a sugar-refining process; a leather making process; a glue and/or gelatin making process; a process for making dairy products; a fruit industry process; a process for making fungicides and/or insecticides; a food-making process; a chemical-making process (e.g., a process to make calcium carbonate, calcium hypochlorite, calcium carbide, calcium phosphates, calcium bromide, calcium hexacyanoferrate, calcium silicon, calcium dichromate, calcium tungstate, calcium citrate, calcium soaps, calcium lactate, calcium tartrate, aluminum oxide, alkali carbonates, alkali bicarbonates, strontium carbonate, calcium zirconate, alkali hydroxides, magnesium hydroxide, alkene oxides, diacetone alcohol, hydroxypivalic acid neopentyl glycol ester, pentaerythritol, anthraquinone dyes, anthraquinone intermediates, and/or trichloroethylene); a process to make refractories; a process to make lime glass; a process to make whiteware pottery and/or vitreous enamels; a process for casting and/or drawing of materials; a process for making drilling muds; a process for making oil additives and/or lubricating grease; a paper making process; a process for growing and/or maintaining an aquarium and/or reef; a process for storing heat; a process for making fire retardants and/or insulators; a process for making antimicrobial agents; a flue gas treatment carbon capture process; and/or a plaster mix process [Concept 14].

In some embodiments of any one of Concepts 1-14, the system is powered at least in part by renewable electricity (e.g., solar energy and/or wind energy) [Concept 15]. In some embodiments of any one of Concepts 1-15, at least a portion of $CO_2$, $O_2$, and/or $H_2$ discharged from the system is fed into a kiln [Concept 16]. In some embodiments of any one of Concepts 1-16, the system has net-zero carbon emissions [Concept 17]. In some embodiments of any one of Concepts 1-17, the electrochemical reactor is configured to receive $CaCO_3$ [Concept 18].

Certain embodiments are related to methods. In one aspect, method comprises: producing $Ca(OH)_2$ and/or lime in an electrochemical reactor; producing $CO_2$ in the electrochemical reactor; transporting the $Ca(OH)_2$, lime, and/or a reaction product of the $Ca(OH)_2$ and/or lime to a process downstream of the electrochemical reactor [Concept 19].

In some embodiments of Concept 19, the method further comprises collecting the $CO_2$ from the electrochemical reactor in a vessel [Concept 20]. In some embodiments of Concept 19, the $CO_2$ is to be sequestered, used in a liquid fuel, used in oxyfuel, used in enhanced oil recovery, used to produce dry ice, and/or used as an ingredient in a beverage [Concept 21]. In some embodiments of any one of Concepts 19-21, the transporting comprises transporting the $Ca(OH)_2$, lime, and/or the reaction product of the $Ca(OH)_2$ and/or lime to a kiln, and the method further comprises heating the $Ca(OH)_2$, lime, and/or the reaction product of the $Ca(OH)_2$ and/or lime in the kiln as part of a cement-making process [Concept 22].

In some embodiments of any one of Concepts 19-21, the transporting comprises processing the $Ca(OH)_2$, lime, and/or the reaction product of the $Ca(OH)_2$ and/or lime in one or more of the following: a ferrous metal making process; a nonferrous metal making process; a masonry process; a soil stabilization process; an asphalt making and/or recycling process; a process for removal of acid gas and/or carbon dioxide; a waste-treating process; a water-treating process; an agricultural process; a sugar-refining process; a leather making process; a glue and/or gelatin making process; a process for making dairy products; a fruit industry process; a process for making fungicides and/or insecticides; a food-making process; a chemical-making process (e.g., a process to make calcium carbonate, calcium hypochlorite, calcium carbide, calcium phosphates, calcium bromide, calcium hexacyanoferrate, calcium silicon, calcium dichromate, calcium tungstate, calcium citrate, calcium soaps, calcium lactate, calcium tartrate, aluminum oxide, alkali carbonates, alkali bicarbonates, strontium carbonate, calcium zirconate, alkali hydroxides, magnesium hydroxide, alkene oxides, diacetone alcohol, hydroxypivalic acid neopentyl glycol ester, pentaerythritol, anthraquinone dyes, anthraquinone intermediates, and/or trichloroethylene); a process to make refractories; a process to make lime glass; a process to make whiteware pottery and/or vitreous enamels; a process for casting and/or drawing of materials; a process for making drilling muds; a process for making oil additives and/or lubricating grease; a paper making process; a process for growing and/or maintaining an aquarium and/or reef; a process for storing heat; a process for making fire retardants and/or insulators; a process for making antimicrobial agents; a flue gas treatment carbon capture process; and/or a plaster mix process [Concept 23].

In some embodiments of any one of Concepts 19-23, wherein the method further comprises producing $O_2$ in the electrochemical reactor, wherein the $O_2$ is to be used as oxyfuel, used in a CCS application, and/or used in enhanced oil recovery [Concept 24]. In some embodiments of any one of Concepts 19-24, the method further comprises producing $H_2$ in the electrochemical reactor, wherein the $H_2$ is to be used as a fuel (e.g., in a fuel cell, or to heat the system) [Concept 25].

In some embodiments, a method comprises: producing $Ca(OH)_2$ and/or lime in an electrochemical reactor; producing $O_2$ in the electrochemical reactor, wherein the $O_2$ is to be sequestered, used as oxyfuel, used in a CCS application, and/or used in enhanced oil recovery; transporting the $Ca(OH)_2$, lime, and/or a reaction product of the $Ca(OH)_2$ and/or lime to a process downstream of the electrochemical reactor [Concept 26].

In some embodiments of Concept 26, the transporting comprises transporting the $Ca(OH)_2$, lime, and/or the reaction product of the $Ca(OH)_2$ and/or lime to a kiln, and the method further comprises heating the $Ca(OH)_2$, lime, and/or the reaction product of the $Ca(OH)_2$ and/or lime in the kiln as part of a cement-making process [Concept 27]. In some embodiments of Concept 26, the transporting comprises processing the $Ca(OH)_2$, lime, and/or the reaction product of the $Ca(OH)_2$ and/or lime in one or more of the following: a ferrous metal making process; a nonferrous metal making process; a masonry process; a soil stabilization process; an asphalt making and/or recycling process; a process for removal of acid gas and/or carbon dioxide; a waste-treating process; a water-treating process; an agricultural process; a sugar-refining process; a leather making process; a glue and/or gelatin making process; a process for making dairy products; a fruit industry process; a process for making fungicides and/or insecticides; a food-making process; a chemical-making process (e.g., a process to make calcium carbonate, calcium hypochlorite, calcium carbide, calcium phosphates, calcium bromide, calcium hexacyanoferrate, calcium silicon, calcium dichromate, calcium tungstate, calcium citrate, calcium soaps, calcium lactate, calcium tartrate, aluminum oxide, alkali carbonates, alkali bicarbonates, strontium carbonate, calcium zirconate, alkali hydroxides, magnesium hydroxide, alkene oxides, diacetone alcohol, hydroxypivalic acid neopentyl glycol ester, pentaerythritol, anthraquinone dyes, anthraquinone intermediates, and/or trichloroethylene); a process to make refractories; a process to make lime glass; a process to make whiteware pottery and/or vitreous enamels; a process for casting and/or drawing of materials; a process for making drilling muds; a process for making oil additives and/or lubricating grease; a paper making process; a process for growing and/or maintaining an aquarium and/or reef; a process for storing heat; a process for making fire retardants and/or insulators; a process for making antimicrobial agents; a flue gas treatment carbon capture process; and/or a plaster mix process [Concept 28]. In some embodiments of any one of Concepts 26-28, the method further comprises produced $H_2$ in the electrochemical reactor, wherein the $H_2$ is to be used as a fuel (e.g., in a fuel cell, or to heat the system) [Concept 29].

In some embodiments, a method comprises: producing $Ca(OH)_2$ and/or lime in an electrochemical reactor; producing $H_2$ in the electrochemical reactor, wherein the $H_2$ is to be sequestered and/or used as a fuel (e.g., in a fuel cell and/or to heat the system); transporting the $Ca(OH)_2$, lime, and/or a reaction product of the $Ca(OH)_2$ and/or lime to a process downstream of the electrochemical reactor [Concept 30].

In some embodiments of Concept 30, the transporting comprises transporting the $Ca(OH)_2$, lime, and/or the reaction product of the $Ca(OH)_2$ and/or lime to a kiln, and the method further comprises heating the $Ca(OH)_2$, lime, and/or the reaction product of the $Ca(OH)_2$ and/or lime in the kiln as part of a cement-making process [Concept 31]. In some embodiments of Concept 30, the transporting comprises processing the $Ca(OH)_2$, lime, and/or the reaction product of the $Ca(OH)_2$ and/or lime in one or more of the following: a ferrous metal making process; a nonferrous metal making process; a masonry process; a soil stabilization process; an asphalt making and/or recycling process; a process for removal of acid gas and/or carbon dioxide; a waste-treating process; a water-treating process; an agricultural process; a sugar-refining process; a leather making process; a glue and/or gelatin making process; a process for making dairy products; a fruit industry process; a process for making fungicides and/or insecticides; a food-making process; a chemical-making process (e.g., a process to make calcium carbonate, calcium hypochlorite, calcium carbide, calcium phosphates, calcium bromide, calcium hexacyanoferrate, calcium silicon, calcium dichromate, calcium tungstate, calcium citrate, calcium soaps, calcium lactate, calcium tartrate, aluminum oxide, alkali carbonates, alkali bicarbonates, strontium carbonate, calcium zirconate, alkali hydroxides, magnesium hydroxide, alkene oxides, diacetone alcohol, hydroxypivalic acid neopentyl glycol ester, pentaerythritol, anthraquinone dyes, anthraquinone intermediates, and/or trichloroethylene); a process to make refractories; a process to make lime glass; a process to make whiteware pottery and/or vitreous enamels; a process for casting and/or drawing of materials; a process for making drilling muds; a process for making oil additives and/or lubricating grease; a paper making process; a process for growing and/or maintaining an aquarium and/or reef; a process for storing heat; a process for making fire retardants and/or insulators; a process for making antimicrobial agents; a flue gas treatment carbon capture process; and/or a plaster mix process [Concept 32].

In some embodiments of any one of Concepts 19-32, the method is powered at least in part by renewable electricity (e.g., solar energy and/or wind energy) [Concept 33]. In some embodiments of any one of Concepts 19-33, at least a portion of $CO_2$, $O_2$, and/or $H_2$ produced in the electrochemical cell is fed into a kiln [Concept 34]. In some embodiments of any one of Concepts 19-34, the method has net-zero carbon emissions [Concept 35]. In some embodiments of any one of Concepts 19-35, the method further comprises placing $CaCO_3$ in the electrochemical reactor.

U.S. Provisional Patent Application No. 62/793,294, filed Jan. 16, 2019; U.S. Provisional Patent Application No. 62/800,220, filed Feb. 1, 2019; and U.S. Provisional Patent Application No. 62/818,604, filed Mar. 14, 2019 are each hereby incorporated by reference in their entireties for all purposes.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, unless indicated to the contrary, all percentages disclosed herein that refer to relative amounts are weight percentages.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:
   producing an acid and a base via electrolysis;
   dissolving a material comprising calcium using the acid to produce ions comprising calcium in a region of a reactor with a pH of 6 or less;
   precipitating solid calcium hydroxide from the ions comprising calcium using the base in a region of a reactor with a pH of 10 or higher; and
   utilizing the calcium hydroxide in a downstream process to form a cement.

2. The method of claim 1, wherein the cement comprises Pozzolan cement.

3. The method of claim 1, wherein utilizing the calcium hydroxide in a downstream process to form a cement comprises mixing the solid calcium hydroxide with an aluminate, a silicate, and/or a pozzolanic material.

4. The method of claim 3, wherein utilizing the calcium hydroxide in a downstream process to form a cement comprises mixing the solid calcium hydroxide with the silicate.

5. The method of claim 3, wherein utilizing the calcium hydroxide in a downstream process to form a cement comprises mixing the solid calcium hydroxide with the pozzolanic material.

6. The method of claim 1, further comprising producing a byproduct different from the calcium hydroxide.

7. The method of claim 6, further comprising collecting the byproduct.

8. The method of claim 1, further comprising collecting the precipitate.

9. The method of claim 1, wherein utilizing the calcium hydroxide in a downstream process to form a cement comprises converting the calcium hydroxide into calcium oxide.

10. The method of claim 1, further comprising mixing the cement with water and an additive to form a concrete.

11. A method, comprising:
producing an acid and a base via electrolysis;
dissolving a material comprising calcium using the acid to produce ions comprising calcium, wherein dissolving the material in the acid is in a region of a reactor with a pH of 6 or less;
precipitating solid calcium hydroxide from the ions comprising calcium using the base in a region of a reactor with a pH of 10 or higher; and
mixing the solid calcium hydroxide and/or a downstream product thereof with a pozzolanic material to form a cement.

12. The method of claim 11, wherein the cement comprises Pozzolan cement.

13. The method of claim 11, wherein forming the cement comprises mixing the calcium hydroxide and/or the downstream product thereof with an aluminate, a silicate, and/or a second pozzolanic material.

14. The method of claim 13, wherein forming the cement comprises mixing the solid calcium hydroxide and/or the downstream product thereof with the silicate.

15. The method of claim 13, wherein forming the cement comprises mixing the solid calcium hydroxide and/or the downstream product thereof with the aluminate.

16. The method of claim 11, further comprising producing a byproduct different from the calcium hydroxide.

17. The method of claim 16, further comprising collecting the byproduct.

18. The method of claim 11, further comprising collecting the precipitate.

19. The method of claim 11, wherein the downstream product comprises calcium oxide, and wherein the method comprises mixing the calcium oxide with the pozzolanic material to form the cement.

20. The method of claim 11, further comprising mixing the cement with water and an additive to form a concrete.

\* \* \* \* \*